United States Patent [19]
Sanderson et al.

[11] Patent Number: 4,985,145
[45] Date of Patent: Jan. 15, 1991

[54] SEMIPERMEABLE MEMBRANES

[75] Inventors: Ronald D. Sanderson, Stellenbosch; Norman A. Dowler, Belville; Albert J. Van Reenen, Stellenbosch, all of South Africa

[73] Assignee: Water Research Commission, Transvaal Province, South Africa

[21] Appl. No.: 304,910

[22] Filed: Jan. 30, 1989

Related U.S. Application Data

[62] Division of Ser. No. 53,333, May 22, 1987, abandoned.

[30] Foreign Application Priority Data

May 30, 1986 [ZA] South Africa ................... 86/4070

[51] Int. Cl.$^5$ .................... B01D 13/00; B01D 13/04
[52] U.S. Cl. ...................... 210/321.75; 210/321.84; 264/48
[58] Field of Search ........... 210/321.6, 321.64, 321.75, 210/321.84, 500.1, 500.22, 500.27, 500.28, 500.33, 500.35, 500.4, 490, 653; 264/41, 41.5, 45.5, 46.4, 48

[56] References Cited

U.S. PATENT DOCUMENTS 3,556,305  1/1971  Shorr ................................ 210/490
3,926,799  12/1975  Thomas et al. .................... 210/653

OTHER PUBLICATIONS

"Hyperfiltration Studies. IV. Salt Rejection by Dynamically Formed Hydrous Oxide Membranes", by Marcinkowsky et al., Journal of the American Chemical Society/88:24/Dec. 20, 1966, pp 5744 to 5746.
"Hyperfiltration Studies. VI. Salt Rejection by Dynamically Formed Polyelectrolyte Membranes" by Kraus et al. Desalination, 1 (1966) pp. 225 to 230.
"Hyperfiltration Studies X. Hyperfiltration with Dynamically-Formed Membranes" by Kraus et al., Desalination, 2 (1967) pp. 243 to 266.
"Hyper Filtration. XXI. Dynamically-Formed Hydrous Zr(IV) Oxide-Polyacrylate Membranes: by Johnson et al., J. Electroanal. Chem. 37 (1972), pp. 267 to "281.
"Reverse Osmosis with Dynamically-Formed Membranes from Water-Soluble Polymers" by Igawa et al., Journal of Applied Polymer Science, vol. 22, (1978), pp. 1607 to 1618.
"Dynamic Polyacrylamide Membranes in the Reverse Osmosis" by Antoniou et al., Desalination, 32 (1980) pp. 47 to 55.
"Desalination by the Use of Dynamically-Formed PVA Membrane" by Ying et al., Elsevier Science Publishers B. V. Amsterdam 1983.
"Properties of Dynamically-Formed Polyblend Membranes" by H. G. Spencer, Desalination, 49 (1984), pp. 193 to 201.

Primary Examiner—Frank Sever
Attorney, Agent, or Firm—Dressler, Goldsmith, Shore, Sutker & Milnamow

[57] ABSTRACT

A method of preparing a semi-permeable membrane suitable for reverse osmosis includes contacting a porous artifact with an hydrated metal oxide, to form an hydrated metal oxie coated artifact. Thereafter the hydrated metal oxide coated artifact is contacted with at least one polyelectrolyte selected from the group listed in claim 1, thereby to form a polyelectrolyte layer in or on the hydrated metal oxide layer.

4 Claims, 35 Drawing Sheets

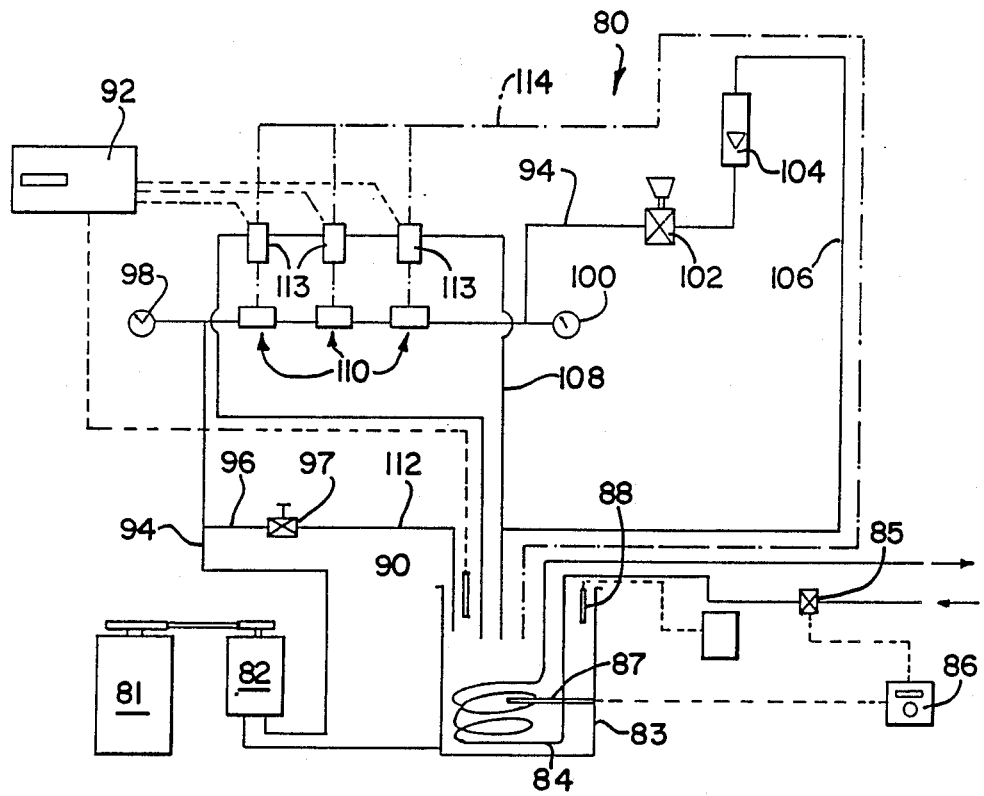
FIG 4
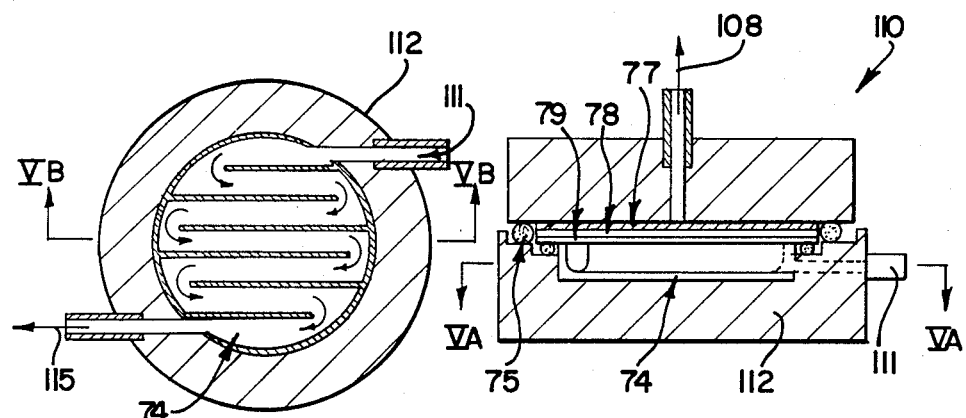
FIG 5A
FIG 5B

SEMIPERMEABLE MEMBRANES

This application is a division of application Ser. No. 053,333, filed May 22, 1985.

This invention relates to semipermeable membranes. It relates in particular to a method of preparing a semipermeable membrane.

Reverse osmosis is a pressure-driven membrane permeation process for separating a relatively pure solvent form a less pure solution. The solution is contacted with one surface of a semi-permeable membrane at a pressure greater than the osmotic pressure of the solution, and relatively pure solvent passes through the membrane.

According to the invention, these is provided a method of preparing a semi-permeable membrane suitable for reverse osmosis, which includes contacting a porous artifact with an hydrated metal oxide, to form a hydrated metal oxide coated artifact; and thereafter contacting the hydrated metal oxide coated artifact with at least one polyelectrolyte selected from the group consisting in (i) poly ($CH_2$=$C(Y_1)(COOH)$) wherein $Y_1$ is —CH—, halogen, —$OCH_3$, —$CH_2COOH$ or —OH;

(ii) poly ($CH_2$=$C(Y_2)(COOH)$)—co—$CH_2$=$C(Y_3)(Y_4)$) wherein
   (a) when $Y_2$ is —H and $Y_4$ is —COOH, $Y_3$ is —$CH_3$, —$CH_2$ COOH, -halogen or —OH;
   (b) when $Y_2$ is —H and $Y_3$ is —H, $Y_4$ is —$OCH_3$, —$OC(O)CH_3$ or —OH;
   (c) when $Y_2$ is -halogen and $Y_4$ is —COOH, $Y_3$ is 13 $CH_3$, —$CH_2$ COOH, —$OCH_3$ or —OH;
   (d) when $Y_2$ is -halogen and $Y_3$ is —H, $Y_4$ is —$OCH_3$, —$OC(O)CH_3$ or —OH;
   (e) when $Y_2$ is —$OCH_3$ and $Y_4$ is —COOH, $Y_3$ is —$CH_3$, —$CH_2COOH$ or —OH;
   (f) when $Y_2$ is —$OCH_3$ and $Y_3$ is —H, $Y_4$ is —$OC(O)CH_3$, —OH or —$OCH_3$;
   (g) when $Y_2$ is —OH and $Y_4$ is —COOH, $Y_3$ is —$CH_3$ or —$CH_2COOH$;
   (h) when $Y_1$ is —OH and $Y_3$ is —H, $Y_4$ is —$OCH_3$, —$OC(O)CH_3$ or —OH;

(iii) poly $CH_2$=$C(Y_5)(COOH)$—co—$CH_2$=$C(Y_6)(COOH)$—co—$CH_2$=$C(Y_7)(COOH)$ wherein $Y_5$ is —H, $Y_6$ is -halogen or —OH and $Y_7$ is —$CH_3$;

(iv) poly ($CH_2$=CH COOH)—co—($CH_2$=CH—OH)—co—($CH_2$=CH—$(Y_8)$) wherein
   $Y_8$ is —O—C(O)—$(Y_9)$, $Y_9$ is —$CH_3$ or $+CH_2+_n$ $CH_3$, n=1 to 3
   or $Y_8$ is —C(O)—O—$(Y_{10})$, $Y_{10}$ is —$CH_3$ or $+CH_{2+n}$ $CH_3$, n=1 to 3
   or $Y_8$ is —C(O)—$CH_3$
   or $Y_8$ is —O—$CH_3$;

(v) poly —$C(X_1)(COOH)$—CH(COOH)— wherein $X_1$ is —H, —$OCH_3$ or —OH;

(vi) poly —CH($COOX_2$)—C(X)($COOX_3$-)-alt-$CH_2$—CH($X_4$)— wherein $X_1$ is as defined above, $X_2$ and $X_3$ are each —H, an alkyl group, a cycloaliphatic group, a phenyl, a substituted phenyl group, a polyether or a polyglycol chain of molecular mass 200 to 5000, and $X_4$ is $CH_3$ C(O)O—, —OH, or —C(O)$NH_2$;

(vii) poly—CH($COOX_2$)—C($X_1COOX_3$)—co—CH$_2$—C($X_5$)($X_5$)($X_6$)—wherein $X_1$, $X_2$ and $X_3$ are as defined above, and $X_6$ is —$OCH_3$ when $X_5$ is —H or $X_6$ is —COOH when $X_5$ is —$CH_2COOH$;

(viii) the alkali metal salts or partial salts of the above polyacids;

thereby to form a polyelectrolyte layer in or on the hydrated metal oxide layer.

Hence, the coated artifact has a side coated and/or a plurality of pores filled with the hydrated metal oxide. The metal of the hydrated metal oxide may be selected from the group consisting in zirconium, aluminum and iron.

The polyelectrolyte may have a molecular mass of 20 000 to 500 000 and may be selected from the group consisting in:

(1) poly (methacrylic acid)
(2) poly (2-chloro acrylic acid)
(3) poly (itaconic acid)
(4) poly (2-hydroxy acrylic acid)
(5) poly (2-methoxy acrylic acid)
(6) poly (acrylic acid-co-methacrylic acid)
(7) poly (acrylic acid-co-itaconic acid)
(8) poly (acrylic acid-co-2-chloro acrylic acid)
(9) poly (acrylic acid-co-2-hydroxy acrylic acid)
(10) poly (acrylic acid-co-vinyl acetate)
(11) poly (2-chloro acrylic acid-co-methacrylic acid)
(12) poly (2-chloro acrylic acid-co-vinyl acetate
(13) poly (2-hydroxy acrylic acid-co-methacrylic acid)
(14) poly (2-hydroxy acrylic acid-co-vinyl acetate)
(15) poly (acrylic acid-co-2-methoxy acrylic acid)
(16) poly (acrylic acid-co-methyl vinyl ether)
(17) poly (2-chloro acrylic acid-co-itaconic acid)
(18) poly (2-chloro acrylic acid-co-2-methoxy acrylic acid)
(19) poly (2-chloro acrylic acid-co-2-hydroxy acrylic acid)
(20) poly (2-chloro acrylic acid-co-methyl vinyl ether)
(21) poly (2-chloro acrylic acid-co-vinyl alcohol)
(22) poly (2-methoxy acrylic acid-co-methacrylic acid)
(23) poly (2-methoxy acrylic acid-co-itaconic acid)
(24) poly (2-methoxy acrylic acid-co-2-hydroxy acrylic acid)
(25) poly (2methoxy acrylic acid-co-methyl vinyl ether)
(26) poly (2-methoxy acrylic acid-co-vinyl acetate)
(27) poly (2-methoxy acrylic acid-co-vinyl alcohol)
(28) poly (2-hydroxy acrylic acid-co-itaconic acid)
(29) poly (2-hydroxy acrylic acid-co-vinyl methyl ether)
(30) poly (2-hydroxy acrylic acid-co-vinyl alcohol)
(31) poly (acrylic acid-co-2-chloro acrylic acid-co-methacrylic acid)
(32) poly (acrylic acid-co-2-hydroxy acrylic acid-co-methacrylic acid)
(33) poly (maleic acid)
(34) poly (maleic acid-alt-acrylic acid)
(35) poly (maleic acid-co-itaconic acid)
(36) poly (maleic acid-alt-vinyl acetate)
(37) poly (maleic acid-alt-vinyl alcohol)
(38) poly (maleic acid-alt-acrylamide)
(39) poly (maleic acid-alt-methyl vinyl ether)
(40) the maleate half esters formed by reacting copolymer (34), ie poly(maleic acid-alt-acrylic acid), with the following alcohols or polyols;
   (i) methanol, ethanol and other n-alkyl alcohols
   (ii) cyclohexanol
   (iii) phenol
   (iv) poly (ethylene glycol)
   (v) poly (propylene glycol)
   (vi) poly (butylene glycol)

(41) poly(acrylic acid-co-vinyl alcohol)
(42) poly(acrylic acid-co-vinyl alcohol-co-vinyl acetate)
(43) poly(acrylic acid-co-vinyl alcohol-co-vinyl ethanoate)
(44) poly(acrylic acid-co-vinyl alcohol-co-vinyl propionate)
(45) poly(acrylic acid-co-vinyl alcohol-co-vinyl butyrate)
(46) poly(acrylic acid-co-vinyl alcohol-co-vinyl acrylate)
(47) poly(acrylic acid-co-vinyl alcohol-co-ethyl acrylate)
(48) poly(acrylic acid-co-vinyl alcohol-co-propyl acrylate)
(49) poly(acrylic acid-co-vinyl alcohol-co-butyl acrylate)
(50) poly(acrylic acid-co-vinyl alcohol-co-vinyl methyl ether)
(51) poly(acrylic acid-co-vinyl alcohol-co-vinyl methyl ketone)

The artifact may comprise a porous membrane or a porous tube. When it is a porous member, the porous membrane may comprise a microporous filter sheet, a woven or non-woven fabric or a porous metal membrane. When it is a porous tube, the porous tube may comprise a porous metal tube, a porous carbon tube, a porous ceramic tube, a woven or non-woven fabric tube, or the like. Such an artifact, ie whether it is in the form of a membrane or a tube, will hereinafter for brevity be referred to as a membrane, unless otherwise indicated.

Hence, by means of the method of the present invention, a dual layer or composite is formed.

The method may include dynamically forming the composite membrane by contacting the porous membrane in situ with an aqueous solution of a salt of the hydrated metal, and thereafter contacting the hydrous metal-coated membrane thus formed with the polyelectrolyte by circulating a solution comprising the polyelectrolyte in a suitable solvent past and through the membrane.

BRIEF DESCRIPTION OF THE DRAWINGS

FIG. 4 shows membrane coating and evaluation equipment.

FIGS. 5a and 5b show plan and elevation views of tortuous path desalination cells.

The invention will now be described with reference to the following non-limiting examples:

EXAMPLE 1

1.1 Synthesis Equipment

Figure 1:
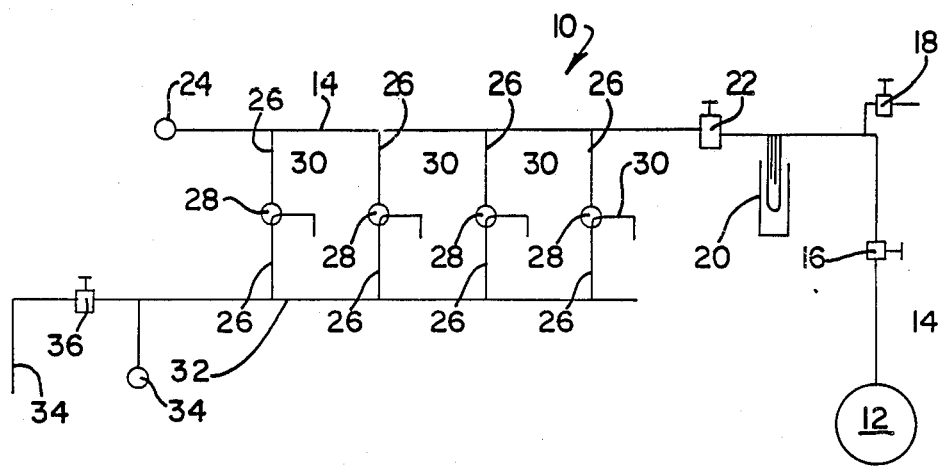
FIG. 1 shows a vacuum line of the invention.

A vacuum line was set up as indicated in FIG. 1. Hence, in FIG. 1, reference numeral 10 generally indicates a vacuum line. The vacuum line 10 comprises a vacuum pump 12, a flow line 14 leading from the vacuum line 12, a stop-cock 16 in the flow line 14, a bleed valve 18 leading from the flow line 14 downstream of the stop-cock 16, a water trap 20 located in the flow line between the bleed valve 18 and a further stop-cock 22, and a vacuum gauge 24 at the end of the flow line 14. From the flow line 14 leads a plurality of flow lines 26 each provided with a two-way valve or tap 28. Each of the valves 28 has a connecting conduit 30 adapted for connection to a reaction vessel (not shown). The conduits 26 all lead into a common flow line 32 to which is connected a pressure gauge 34. Into the flow line 32, at point 34, can be bled in an inert gas, such as argon, for flushing out the system, and a stop-cock 36 is also provided in the flow line 32.

The vacuum line 10 hence utilizes the two-way valves 28 to facilitate the alternate use of high vacuum to de-gas reaction mixtures in reaction vessels connected to the conduits 30, and inert gas to flush out the system.

Figure 2:
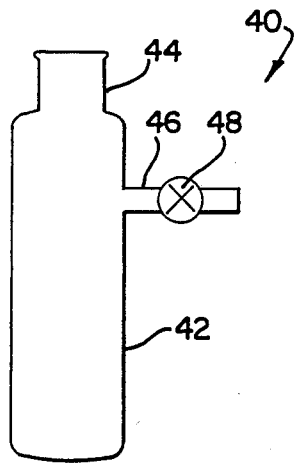
FIG. 2 shows one of the reaction vessels for practicing the invention.

FIG. 2 shows, schematically, one of the reaction vessels for connecting to the conduits 30 of the vacuum line of FIG. 1. In FIG. 2, reference numeral 40 generally indicates a reaction vessel which comprises a glass container 42 having a neck portion 44 providing a filler opening. A nozzle 46 extends radially from the container 42 and is provided with stop-cock 48. The nozzle 46 is connected to the conduits 30 of the vacuum line 10 of FIG. 1.

Figure 3:
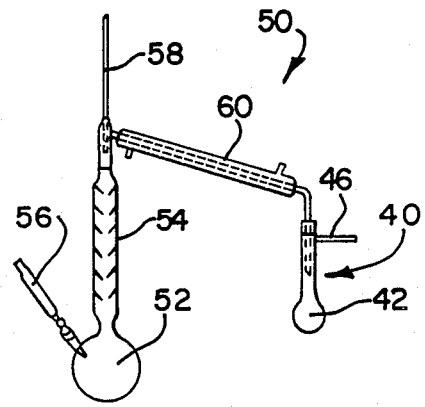
FIGS. 3, 6 and 7 show distillation equipment for practicing the invention.

FIG. 3 shows, schematically, distillation equipment used. In FIG. 3, reference numeral 50 generally indicates the distillation equipment. The equipment 50 includes a round-bottomed flask 52, a vigreaux column 54 extending upwardly from the round-bottomed flask 52, and a dropping funnel 56 leading into the round-bottomed flask 52. A thermometer 58 extends into the top of the vigreaux column and a condenser 60 extends outwardly, downwardly from the top end of the vigreaux column. At the downstream end of the condenser 60 there is provided a monomer trap, ie one of the reaction vessels or traps 40 of FIG. 2.

1.2 Evaluation and Characterization Equipment

Gel-permeation chromatography ('GPC') was done with a Waters (trade name) 150° C. instrument connected to a Waters Data Module (trade name). The column used for the GPC work, which is aqueous in nature, was 1 Millipore (trade name) E-500 column. Dilute solution viscometry was done with an Ubbelohde (trade name) viscometer. All viscometry was done in a water-bath at 313° K. Temperature control was achieved by using a circulator. pH Titrations were effected with a Metrohm (trade name) automatic titrator. Membrane coating and evaluation equipment, as indicated in FIG. 4, was also used. Hence, in FIG. 4, reference numeral 80 generally indicates membrane coating and evaluation equipment.

The equipment 80 includes a motor 81 operatively connected to a pump 82. The suction side of the pump is operatively connected to a vessel 83, for containing a solution. Inside the vessel 83 there is located a cooling coil 84 which is fitted with a cut-off valve 85 electrically connected via a temperature control means 86 to a temperature sensing means 87 protruding into the vessel 83. pH Measurement means 88 also is located inside the vessel 83, as is an electrode 90 which is electrically connected to a conductivity meter 92.

To the discharge side of the pump 82 there is connected a conduit 94. A by-pass line 96 leads from the conduit 94 back to the vessel 83, and is provided with a shut-off valve 97. The conduit 94 is provided with a pressure gauge 98 and then passes sequentially through three tortuous path desalination test cells 110. Downstream of the cells 110 there is provided with another pressure gauge 100. Downstream of the pressure gauge 100 there is provided a back-pressure valve 102 and a flow meter 104. A conduit 106 leads from the flow meter 104 back into the vessel 83.

Referring to FIGS. 5A and 5B, one of the tortuous path desalination test cells 110, using circular flat sheet membranes, and which was used to form and evaluate the dual layer membranes, is described in more detail. The cell 110 comprises a stainless steel body 112 with inlet and outlet connections 111, 115 respectively, which are connected to the conduit 94. Located within the cell 110 are acrylic inserts 74 providing a tortuous flow path, against which is contacted the membrane 79 backed up with filter paper discs 78 and stainless steel mesh discs 77. The upper and lower sections of the cell are bolted together and leakage around the edges of the membranes is prevented by rubber O-rings 75. Permeate passing through the membrane 79 is discharged through a permeate outlet 108 and is returned to the vessel 83 via conductivity flow cells 113 and a conduit 114 (see FIG. 4).

In use, water containing a low concentration of the salt is pumped at a set rate past three flat-sheet membranes 79 in the cells 110 at a relatively high pressure of 6MPa. Permeate passes through the membranes 79, through the cells 113 where the conductivity is measured, and back, via the flow line 114, to the feed tank 83 where it is mixed with the water which by-passed, via the flow line 112, the cells 110. In this way, the feed concentration was kept constant.

1.3 Monomers Used

The following monomers were used:

(i) 2-Propenoic acid, AR grade from FLUKA (trade name), distilled immediately before use.
(ii) 2-Methyl-2-propenoic acid, AR grade from FLUKA, distilled immediately before use.
(iii) Methylene butanedioic acid, AR grade from FLUKA, used as received.
(vi) Ethylene sulfonic acid, AR grade from FLUKA, used as received.
(v) Ethenyl acetate, AR grade from FLUKA, distilled immediately before use.
(vi) 2-Chloro-2-propenoic acid, prepared and purified according to the method as described in sub-paragraph 1.4.

1.4 2-Chloro-2-propenoic Acid : Preparation

This monomer was synthesised. A method, as described in an article by C. S. MARVEL, J. DEC, H. F. COOKE and J. C. COWAN in J. Am. Chem. Soc., Vol. 62, page 3469 (1940), and which includes the alkaline hydrolysis of methyl-2,3-dichloro propionate, was used for the synthesis. Methyl-2,3-dichloropropionate (20.0 g, $1.24 \times 10^{-1}$ moles) was added dropwise to a mixture of distilled, deionized water (150,0 ml) and barium hydroxide octahydrate (70.0 g, $2.22 \times 10^{-1}$ moles) in water (20.0 ml). The reaction mixture was stirred at room temperature for 2 hours, then acidified with conc. $H_2SO_4$ (10.0 g; $1.02 \times 10^{-1}$ moles) in water (20 ml).

The resulting product was extracted five times with diethyl ether (50 ml per extraction), and the extract dried overnight over anhydrous magnesium sulphate. The solution was then decanted and evaporated to dryness at room temperature under reduced pressure. The 2-chloro-2-propenoic acid was purified by several recrystallisations from petroleum ether (30°–60° C. b.p.) and then dried at room temperature under reduced pressure. The formation of the 2-chloro-2-propenoic acid was confirmed by a melting point analysis and carbon 13 and proton - NMR Spectra.

The yield was 5.17 g, or 38.50%.

1.5 Polymerizations

1.5.1 Pre-reaction Sequence

All reactions were carried out in reaction vessels of the type described in 1.1 and shown in FIG. 2.

The reaction vessel 40 was covered with stainless steel gauze (not shown) to safeguard against pressure build-up. After the ingredients had been added, the vessel was sealed by means of a rubber sealing cap (not shown) inserted in the neck portion 44, the stop-cock 48 on the vessel was closed and the vessel immersed in a freezing mixture of ice and water or in cold isopropanol. Degassing and flushing with the vacuum line of FIG. 1 were carried out on all reaction mixtures in order to remove all traces of oxygen from the system. The vessel was attached to the vacuum line 10 via the side arm 46.

The degassing and flushing was effected as follows:

The stop-cock 48 on the reaction vessel was opened. The two-way tap 28 on the vacuum line was then switched to the vacuum side, subjecting the reaction mixture to vacuum. This caused the dissolved gases, including oxygen to be evacuated and the two-way tap 28 was left in this position until bubbling of the reaction mixture stopped. The two-way tap 28 was then switched to the position which allowed the argon gas, supplied to the gas side of the vacuum line (see FIG. 1), to fill the reaction vessel. The two-way tap was then switched to the vacuum side again in order to remove all the argon and other gas remaining in the reaction mixture. This was done five times.

1.5.2 Homopolymerizations

1.5.2.1 2-Propenoic Acid (Acrylic Acid)

Two mixtures containing, respectively (1) freshly distilled 2-propenoic acid (16.4 g, $2.78 \times 10^{-1}$ moles), toluene (35.0 ml) ethyl benzene (65.0 ml) and $\alpha\alpha'$ azo bis isobutyro nitrile (AIBN) ($2.70 \times 10^{-1}$ g, $1.60 \times 10^{-3}$ moles); and (2) freshly distilled 2-propenoic acid (16.4 g, $2.78 \times 10^{-1}$ moles), toluene (35.0 ml), ethyl benzene (65.0 ml) and AIBN ($8.20 \times 10^{-1}$ g, $4.90 \times 10^{-3}$ moles), were degassed as described in 1.5.1. All mixtures hereinafter described were degassed in the same fashion.

The stirred reaction mixtures were then heated, with stirring, to and maintained at, 343° K for 1.5 hours. Thereafter the reactions were terminated by cooling the mixtures. During the reactions the polymers formed precipitated out. The polymers were washed five times with benzene and then dried at 313° K to constant mass under reduced pressure.

Yields: (1) 14.85 g or 88.48% powdery white polymer : PAA-1;

(2) 15.22 g or 90.68% of powdery white polymer : PAA-2.

The Universal Calibration method, using 0.5 M $Na_2SO_4$ as solvent was used to determine the molecular masses. These results are given in 1.6 hereunder. This method was also employed to determine the molecular masses of all subsequent polymers.

1.5.2.2 2-Methyl-2-Propenoic Acid (Methacrylic Acid)
Method (A)
Three mixtures containing:

(1) Freshly distilled 2-methyl-2-propenoic acid (10.0 g, $2.30 \times 10^{-1}$ moles), 1,4 dioxane (25.0 ml) and benzoyl peroxide ($9.00 \times 10^{-2}$ g, $3.70 \times 10^{-4}$ moles);
(2) Freshly distilled 2-methyl-2-propenoic acid (10.0 g, $2.30 \times 10^{-1}$ moles), 1.4 dioxane (25.0 ml) and benzoyl peroxide ($1.80 \times 10^{-1}$ g, $7.40 \times 10^{-4}$ moles); and
(3) Freshly distilled 2-methyl-2-propenoic acid (10.0 g, $2.30 \times 10^{-1}$ moles), 1,4 dioxane (25.0 ml) and benzoyl peroxide ($2.70 \times 10^{-1}$ g, $11.1 \times 10^{-4}$ moles)

were prepared.

The stirred reaction mixtures were heated to, and maintained at, 333° K for 0.75 h. After reaction, white viscous solutions formed. The three reaction mixtures were dissolved in excess methanol and the polymers thus formed then precipitated with diethyl ether. They were purified by being redissolved in methanol and reprecipitated with diethyl ether. This was done three times.

The polymers were then dried to constant mass under reduced pressure at ambient temperature.

Yields: (1) 9.42 g, or 94.2% of glassy polymer : PMAA-1;

(2) 9.97 g, or 99.7% of glassy polymer : PMAA-2;
(3) 9.98 g, or 99.8% of glassy polymer PMAA-3.
Method (B)
To freshly distilled 2-methyl-2-propenoic acid (10.0 g, $1.2 \times 10^{-1}$ moles) in 1,4-dioxane (25.0 ml), was added benzoyl peroxide ($9.00 \times 10^{-1}$ g, $3.70 \times 10^{-3}$ moles) as initiator, and degassed. The stirred reaction mixture was heated to and maintained at 333° K for 0.5 h. The reaction was stopped short of full conversion by rapid cooling and the addition of hydroquinone as radical scavenger. The polymer was isolated, purified and dried in the same way as described in Method A.

Yield: 3.80 g or 38.0% of glassy polymer : PMAA-4.
1.5.2.3 Ethylene Sulfonic Acid (Sodium Salt) (Vinyl Sulfonic Acid Sodium Salt)
Method (A)
Three mixtures containing:

(1) a 40% solution of sodium ethylene sulphonate (12.0 g, $9.20 \times 10^{-2}$ moles), $K_2S_2O_8$ ($8.70 \times 10^{-2}$ g, $3.21 \times 10^{-4}$ moles) and $NaHSO_3$ ($3.5 \times 10^{-2}$ g, $3.36 \times 10^{-4}$ moles);
(2) a 40% solution of sodium ethylene sulphonate (12.0 g, $9.2 \times 10^{-2}$ moles), $K_2S_2O_8$ ($1.30 \times 10^{-1}$ g, $4.81 \times 10^{-4}$ moles) and $NaHSO_3$ ($5.30 \times 10^{-2}$ g, $5.09 \times 10^{-4}$ moles); and
(3) a 40% solution of sodium ethylene sulphonate (12.0 g, $9.2 \times 10^{-2}$ moles), $K_2S_2O_8$ ($1.74 \times 10^{-1}$ g, $6.44 \times 10^{-4}$ moles) and $NaHSO_3$ ($7.00 \times 10^{-2}$ g, $6.73 \times 10^{-4}$ moles);

were prepared, and degassed.

The reaction mixtures were maintained at 277° K for 270 hours and shaken occasionally. The formed polymers were precipitated with methanol and purified by redissolving them in water and then reprecipitating them with methanol. This was done three times. The polymers were finally dried to constant mass under reduced pressure at ambient temperature.

Yield: (1) 7.66 g or 63.8% of strawcoloured polymer : PVSA-1;

(2) 9.60 g or 80.0% of strawcoloured polymer : PVSA-2;
(3) 11.20 g or 96.6% of strawcoloured polymer : PVSA-3.
Method (B)
To a 40% solution of ethylene sulphonic acid (sodium salt), (12.1 g, $9.20 \times 10^{-2}$ moles), $K_2S_2O_8$ ($4.00 \times 10^{-2}$ g, $1.48 \times 10^{-4}$ moles) and $NaHSO_3$ ($1.60 \times 10^{-2}$ g, $1.53 \times 10^{-4}$ moles) were added, and the mixture degassed. The stirred reaction mixture was maintained at 277° K for 200 hours, with occasional shaking. The polymer was isolated, purified and dried as described in Method (A).

Yield: 10.10 g or 83.5% of strawcoloured polymer : PVSA-4.
1.5.2.4 Methylene Butanedioic Acid (Itaconic Acid)
Method
Three mixtures containing:

(1) Methylene butanedioc acid (10.0 g, $7.70 \times 10^{-2}$ moles), distilled, deionized water (40.0 ml) concentrated HCl (1.5 ml) and $K_2S_2O_8$ ($5.00 \times 10^{-2}$ g, $2.10 \times 10^{-3}$ moles);
(2) Methylene butanedioic acid (10.0 g, $7.70 \times 10^{-2}$ moles), distilled, deionized water (40.0 ml) concentrated HCl (1.5 ml) and $K_2S_2O_8$ ($1.00 \times 10^{-1}$ g. $4.20 \times 10^{-3}$ moles); and
(3) Methylene butanedioic acid (10.0 g, $7.70 \times 10^{-2}$ moles), distilled, deionized water (40.0 ml) concentrated HCl (1.5 ml) and $K_2S_2O_8$ ($1.50 \times 10^{-1}$ g, $6.30 \times 10^{-3}$ moles)

were prepared, and degassed.

The stirred reaction mixtures were then heated to, and maintained at, 323° K for 6,7 hours. The reaction mixtures were poured into an excess of cold acetone. This caused the polymers to precipitate. The polymers were purified by dissolving them in water and reprecipitating in acetone. This was repeated three times. The polymers were dried to constant mass under reduced pressure at 323° K.

Yield: (1) 3.56 g or 35.6% of polymer: PIA 1;
(2) 5.12 g or 51.2% of polymer: PIA 2;
(3) 4.95 g or 49.5% of polymer: PIA 3. 1.5.2.5 2-Chloro-2-Propenoic Acid (2-Chloro Acrylic Acid)
Method A To a mixture of 2-chloro-2-propenoic acid (3.10 g, 2.90×10$^{-2}$ moles) and 1,4 dioxane (7.0 ml), benzoyl peroxide (7.50×10$^{-3}$ g, 3.10×10$^{-5}$ moles) was added as initiator. The mixture was degassed. The stirred reaction mixture was heated to, and maintained at, 353° K for 2.5 hours. The resulting viscous mixture was diluted with 1.4 dioxane and precipitated with diethylether. The polymer was purified by dissolving it in 1.4 dioxane and precipitating it with diethylether. This was done three times. The polymer was dried to constant mass at ambient temperature under reduced pressure.

Yield: 3.01 g or 97.1% of polymer : PCIAA-1.

Method B

To a mixture of 2-chloro-2-propenoic acid (2.65 g, 2.50×10$^{-2}$ moles) in 1,4 dioxane (10.0 ml), benzoyl peroxide (1.00×10$^{-2}$ g; 4.10×10$^{-5}$ moles) was added as initiator, and the mixture degassed. The stirred reaction mixture was heated to and maintained at 363° K for 2.5 hours. The product was isolated, purified and dried as described in Method (A).

Yield: 2.60 g or 98.1% of polymer : PCIAA-2.

Method (C)

To a mixture of 2-chloro-2-propenoic acid (2.20 g, 2.03×10$^{-2}$ moles) in 1.4 dioxane (6.0 ml), benzoyl peroxide (5.00×10$^{-3}$ g; 2.10×10$^{-5}$ moles) was added, and the mixture degassed. The stirred reaction mixture was heated to and maintained at 363° K for 2 hours. The product was isolated, purified and dried as described in Method (A).

Yield: 2.10 or 95.5% of polymer : PCIAA-3.

1.5.3 Copolymerizations 1.5.3.1 2-Propenoic Acid and Ethenyl Acetate (Acrylic Acid and Vinyl Acetate Method To a mixture of freshly distilled 2-propenoic acid (3.24 g, 4.50×10$^{-2}$ moles) and freshly distilled ethenyl acetate (1.95 g, 2.27×10$^{-2}$ moles) in 1,4 Dioxane (20.0 ml), benzoyl peroxide (5.5×10$^{-3}$ g, 2.27×10$^{-5}$ moles) was added, and the mixture degassed.

The stirred reaction mixture was heated to, and maintained at, 353° K for 5.5 hours. The polymer was isolated by diluting the reaction mixture with 1,4 dioxane and precipitating the polymer with methanol. The polymer was purified by redissolving it in 1,4 dioxane and reprecipitating it with methanol. This was done three times. The polymer was dried to constant mass under reduced pressure at 323° K.

Yield: 3.00 g or 58.4% of the copolymer : PAA/VAC-1.

1.5.3.2 2-Propenoic Acid and Methylene butanedioic Acid (Acrylic Acid and Itaconic Acid)

Method

Three mixtures containing:

(1) Freshly distilled 2-propenoic acid (5.24 g, 7.25×10$^{-2}$ moles), methylene succinic acid (5.00 g, 3.85×10$^{-2}$ moles), distilled, deionized water (25.0 ml) and K$_2$S$_2$O$_8$ (2.60×10$^{-2}$ g, 9.63×10$^{-5}$ moles);

(2) Freshly distilled 2-propenoic acid (5.25 g, 7.28×10$^{-2}$ moles), methylene succinic acid (5.00 g, 3.85×10$^{-2}$ moles), distilled deionized water (25.0 ml) and K$_2$S$_2$O$_8$ (5.00×10$^{-2}$ g, 1.85×10$^{-4}$ moles);

(3) Freshly distilled 2-propenoic acid (5.25 g, 7.28×10$^{-2}$ moles), methylene succinic acid (5.00 g, 3.85×10$^{-2}$ moles), distilled, deionized water (25.0 ml) and K$_2$S$_2$O$_8$ (7.80×10$^{-2}$ g, 2.89×10$^{-4}$ moles);

were prepared and degassed.

The stirred reaction mixtures were heated to, and maintained at, 313° K for 24 hours. The three polymers formed were isolated by slowly pouring the reaction mixtures into excess acetone, causing the polymers to precpitate. The polymers were purified by dissolving them in water and precipitating them in acetone. This was done three times. The polymers were dried to constant mass under reduced pressure at 313° K.

Yield: (1) 5.40 g or 52.7% of polymer : PAA/IA-1;
(2) 5.75 g or 56.1% of polymer : PAA/IA-2;
(3) 8.97 g or 87.6% of polymer PAA/IA-3.

1.5.3.3 2-Propenoic Acid and 2-Chloro-2-Propenoic Acid (Acrylic Acid and 2-Chloro Acrylic Acid)

Method (A)

To a mixture of freshly distilled 2-propenoic acid (2.15 g, 3.00×10$^{-2}$ moles) and 2-chloro-2-propenoic acid (2.10 g, 2.00×10$^{-2}$ moles) in 1,4 dioxane (15.0 ml), benzoyl peroxide (2.00×10$^{-2}$ g, 8.26×10$^{-4}$ moles) was added, and the mixtured degassed.

The stirred reaction mixture was heated to and maintained at 353° K for 5.5 hours. The formed polymer was isolated by precipitation with ether and purified by dissolving in 1,4 dioxane and precipitating it with ether. This was done three times. The polymer was dried to constant mass under reduced pressure at ambient temperature.

Yield: 4.20 g or 98.8% of polymer: PAA/CIAA-1.

Method (B)

To a mixture of freshly distilled 2-propenoic acid (2.15 g, 3.00×10$^{-2}$ moles) and 2-chloro-2-propenoic acid (2.00 g, 1.80×10$^{-2}$ moles) in 1,4 dioxane (10.0 ml), benzoyl peroxide (5.40×10$^{-3}$ g, 2.23×10$^{-5}$ moles) was added, and the mixture degassed. The reaction was then carried out according to Method (A).

1.5.3.4 2-Propenoic Acid and 2-Methyl-2-Propenoic Acid (Acrylic Acid and Methacrylic Acid Method To a mixture of freshly distilled 2-propenoic acid (2.50 g, 3.47×10$^{-2}$ moles) and freshly distilled 2-methyl-2-propenoic acid (2.98 g, 3.47×10$^{-2}$ moles) in 1,4 dioxane (150 ml), benzoyl peroxide (1.00×10$^{-2}$ g, 4.13×10$^{-5}$ moles) was added. The mixture was degassed. The stirred reaction mixture was heated to, and maintained at, 333° K for 1 hour. The formed copolymer was isolated by dissolving the reaction mixture in methanol and precipitating the polymer with ether. It was then purified by dissolving it in methanol and precipitating it with diethyl ether. This was done three times. The polymer was dried to constant mass under reduced pressure at a temperature of 313° K.

Yield: 5.21 g or 9.51% of copolymer : PAA/MAA-1.

1.5.3.5 2-Methyl-2-Propenoic Acid and 2-Chloro-2-Propenoic Acid (Methacrylic acid and 2-chloro Acrylic acid Method To a mixture of freshly distilled 2-methyl-2-propenoic acid (2.06 g, 2.4×10$^{-2}$ moles) and 2-chloro-2-propenoic acid (1.96 g, 1.80×10$^{-2}$ moles) in 1,4 dioxane (10.0 ml), benzoyl peroxide (3.84×10$^{-2}$ g, 1.58×10$^{-4}$ moles) was added, and the mixture degassed. The stirred reaction mixture was heated to, and maintained at, 353° K for 5 hours. The formed copolymer was isolated by precipitating it with diethylether after diluting the reaction mixture with dry 1,4 dioxane. It was then purified by dissolving it with 1,4 dioxane and precipitating with diethyl ether. The polymer was dried to constant mass under reduced pressure at a temperature.

Yield: 4.01 g or 99.0% of brittle white copolymer : PMAA/ClAA-1.

1.5.3.6 2 Propenoic acid and ethenyl alcohol (acrylic acid and vinyl alcohol To a mixture of freshly distilled 2-propenoic acid (45.0 g, 6.25 ×10$^{-1}$ moles) and ethenyl acetate (30g, 3.49×10$^{-1}$ moles) in 1,4 dioxane (150.0 ml) was added benzoyl peroxide (0.30 g; 1.23×10$^{-3}$ moles) and the mixture degassed.

The stirred reaction mixture was heated to, and maintained at 348° K for 10 minutes. The formed copolymer was isolated by precipitating it will diethylether.

Yield 7.5 g of 10% of Polymer PAA/VAC-2. This copolymer was then dissolved in an excess of 2N aqueous NaOH and heated and maintained at reflux temperature for 24 hours. The polymer was isolated by precipitating with methanol.

Yield: 7.1 g or 94.7% polymer PAA/VOH.

1.5.3.7 2-Chloro-2 propenoic acid and ethenyl acetate (2-chloro acrylic acid and vinyl acetate)

The preparation was identical to that described for polymer PAA/VAC-2 under point 1.5.3.6.

1.5.3.8 2-Hydroxy-2-propenoic acid and ethenyl acetate (2-hydroxy acrylic acid and vinyl acetate)

This polymer was prepared by treating a 3 g sample of the polymer described under point 1.5.3.7 in an excess of cold 2N NaOH for a period of 1 hour, thereby replacing the labile chlorine atoms with hydroxy groups. The polymer was isolated by precipitation with methanol.

Yield: 3.0 g or 100% of copolymer POHAA/VAC.

1.5.4 Terepolymers

1.5.4.1 2-Propenoic Acid and 2-Methyl-2-Propenoic Acid and 2-Chloro-2-Propenoic Acid (Acrylic Acid and Methacrylic Acid and 2-Chloro-acrylic acid)

Method

To a mixture of freshly distilled 2-propenoic acid (1.57 g, 2.10×10$^{-3}$ moles), freshly distilled 2-methyl-2-propenoic acid (1.54 g, 1.80×10$^{-2}$ moles) and 2-chloro-2-propenoic acid (1.50 g, 1.40×10$^{-2}$ moles), in 1,4 dioxane (15.0 ml) benzoyl peroxide (3.55×10$^{-2}$ g, 1.47×10$^{-4}$ moles) was added. This mixture was degassed. The stirred reaction mixture was heated to, and maintained at, 353° K. for 5 hours. The formed terpolymer was isolated by diluting the reaction mixture with dry 1,4 dioxane and precipitating it with diethyl ether. It was purified by dissolving the terpolymer in 1,4 dioxane and precipitating it with diethyl ether. This was done twice.

Yield: 4.56 g or 98.9% of terepolymer : TERP-1.

1.5.4.2 2-Propenoic acid and ethenyl alcohol and ethenyl acetate (acrylic acid and vinyl alcohol and vinyl acetate)

To a mixture of 2-propenoic acid (10.8 g, 1.5×10$^{-1}$ moles) and ethenyl acetate (73.1 g, 8.5×10$^{-1}$ moles) in 1,4-dioxane (150 ml) was added benzoyl peroxide (0.30 g, 1.23×10$^{-1}$ moles). The reaction mixture was degassed and then heated to, and maintained at 348° K for 20 minutes, while stirring. The polymer was isolated by precipitation with diethyl ether.

Yield: 5.8 g or 7.73% of polymer PAA/VAC-3.

The polymer was then dissolved in an excess of 2N aqueous NaOH and heated at reflux temperature for 1 hour. The resulting terpolymer formed due to partial hydrolysis of the ethenyl acetate component, was isolated by precipitation with methanol.

Yield: 5.10 g or 86.2% of terepolymer PAA/VOH/VAC.

1.6 Polymer Characterization

Molecular masses of the polymers were determined by means of the Universal Calibration Method ('UCM') employing dilute solution viscometry and gel permeation chromatography.

All viscometry was done in 0.5 M sodium sulphate as solvent. The 0.5 M sodium sulphate in deionized, distilled water was filtered twice through a Millipore HA (0.45 micron) filter, before the polymer was added.

All the polymer solutions were made up in 25 ml volumetric flasks. The concentration aimed as was 1.0% (M/V), ie about 0.25 g of polymer in 25 ml of $Na_2SO_4$. The mixtures were either agitated by means of a flask shaker, or placed in a sonic bath for 10 minutes to dissolve the polymer.

After solution was complete, 20 ml of the polymer solution was accurately pipetted into the viscometer. The viscometer was suspended in a water bath, temperature-controlled at 308° K. The flow rates of solvent and four concentrations of the polymer solution were measured until agreement to 0.05 s was obtained in three consecutive intrinsic viscosity readings.

A Waters 150C (trade name) gel permeation chromatograph was used, using one Millipore E.500 (trade name) column. The mobile phase was 0.5 M $Na_2SO_4$. The polymer solutions used were drawn from the volumetric flasks used to make up the solutions for viscometry. These were then diluted to 0.5% (M/V) into 4 ml vials used to hold samples in the instrument. The solutions were filtered into the vials through an aqueous membrane filter (Millipore HA), under pressure.

These vials (up to 16 at a time) were placed on a carousel and placed in the instrument. The required run time, flow rate, injection volume and detector sensitivity were programmed into the instrument, and all the necessary measurements were done by the instrument. The data were displayed as a graphic plot and print-out via a Waters data module.

The elution time for each polymer was noted and the procedure was repeated two more times to ensure that the elution time remained constant. To set up a calibration curve, a series of dextrans were used as primary standards. These dextrans had molecular masses of 12,500; 17,500; 40,000; 70,000 and 151,000. Two poly(acrylic acid) samples were used as secondary standards, after their molecular mass had been obtained through viscometry. These secondary standards had molecular masses of 75,300 and 148,000 respectively. A solution of each standard was made up in 0.5 M $Na_2SO_4$. The intrinsic viscosity of each of the standards were determined. Thereafter the retention times of these same solutions were determined by GPC.

Figure 8:
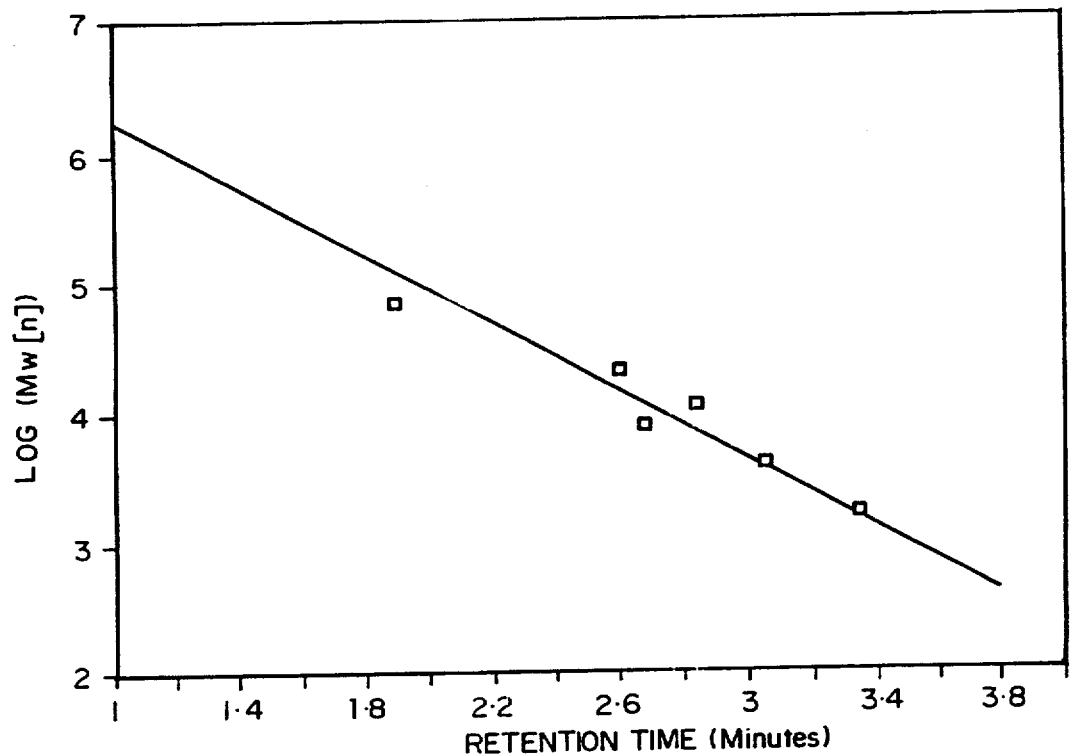
FIG. 8 is a calibration curve used for determining the molecular mass of synthesized polyelectrolytes prepared in accordance with this invention.
Figure 9:
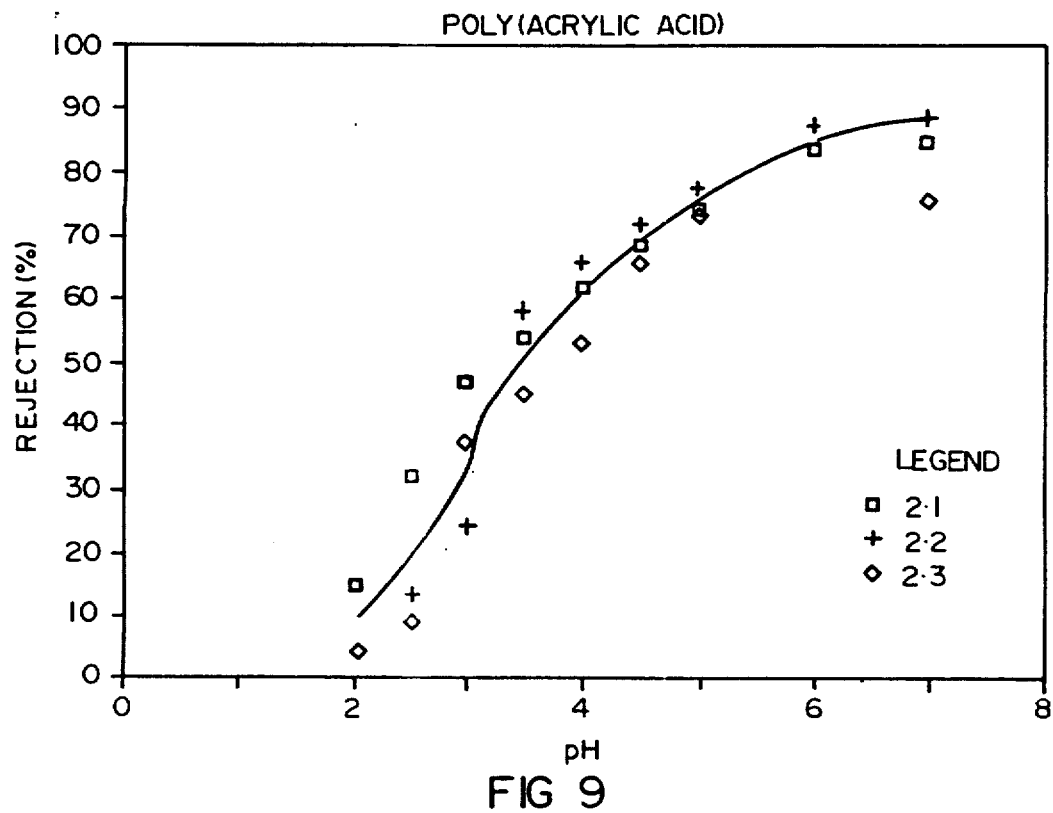
FIGS. 9 to 28, inclusive are plots of rejection versus pH and of flux versus pH during the formation of some membranes in accordance with this invention.
Figure 10:
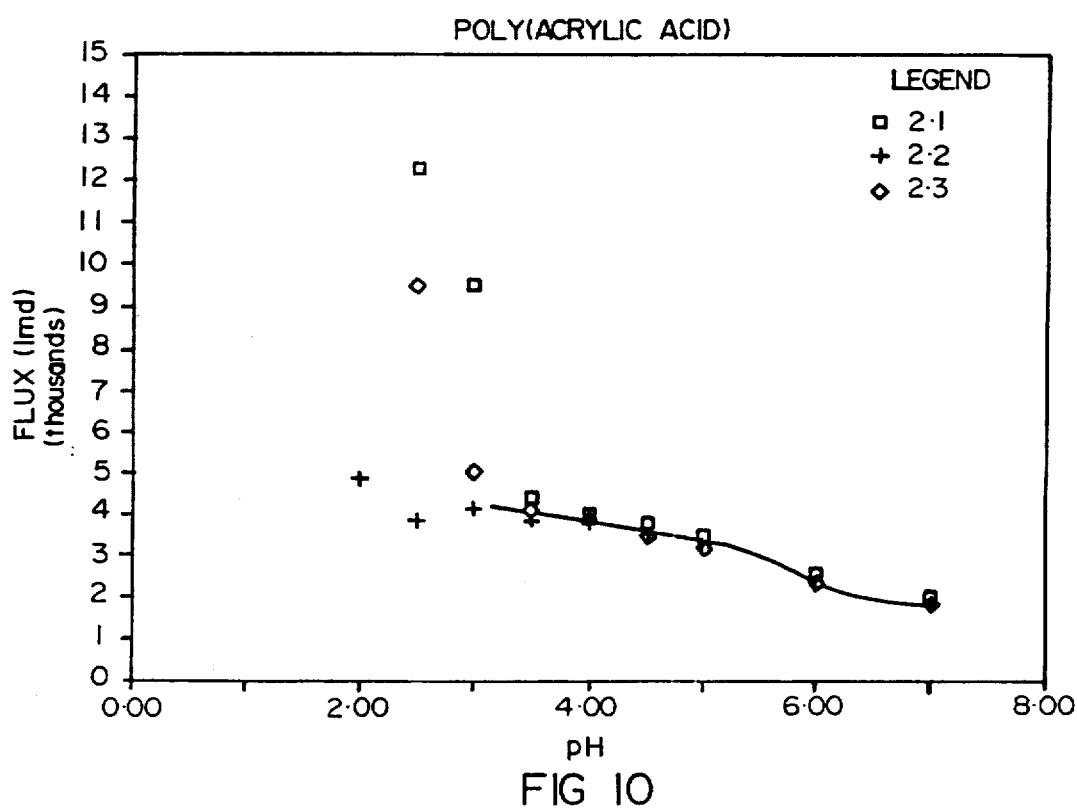
Figure 11:
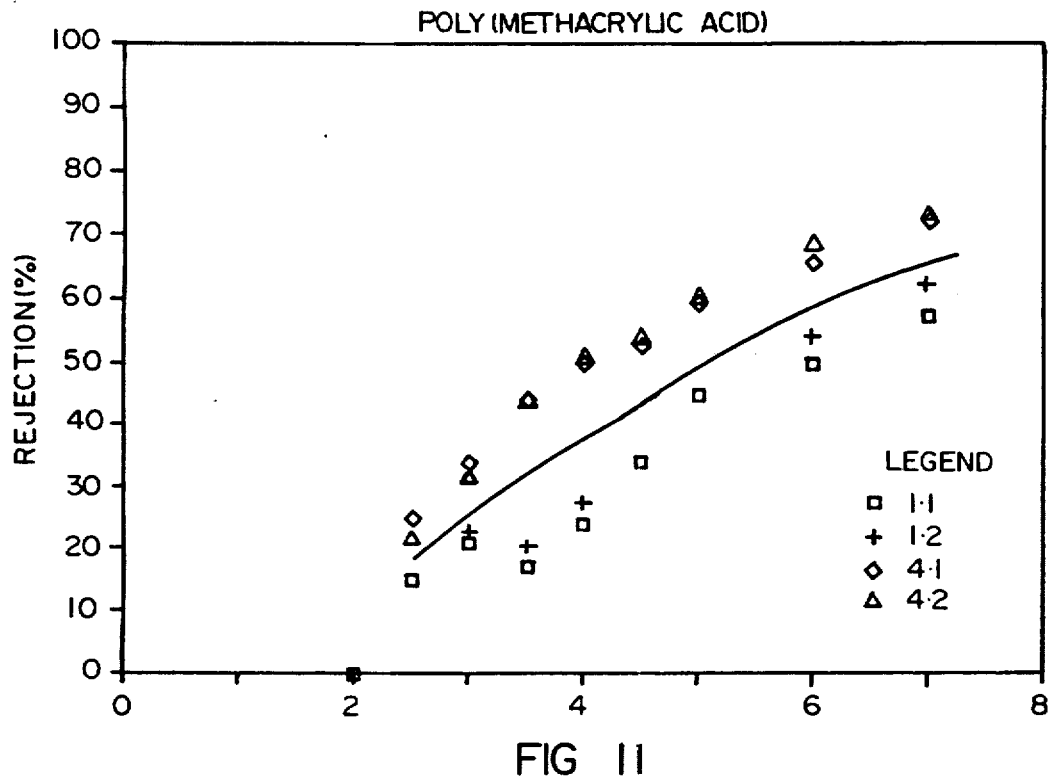
Figure 12:
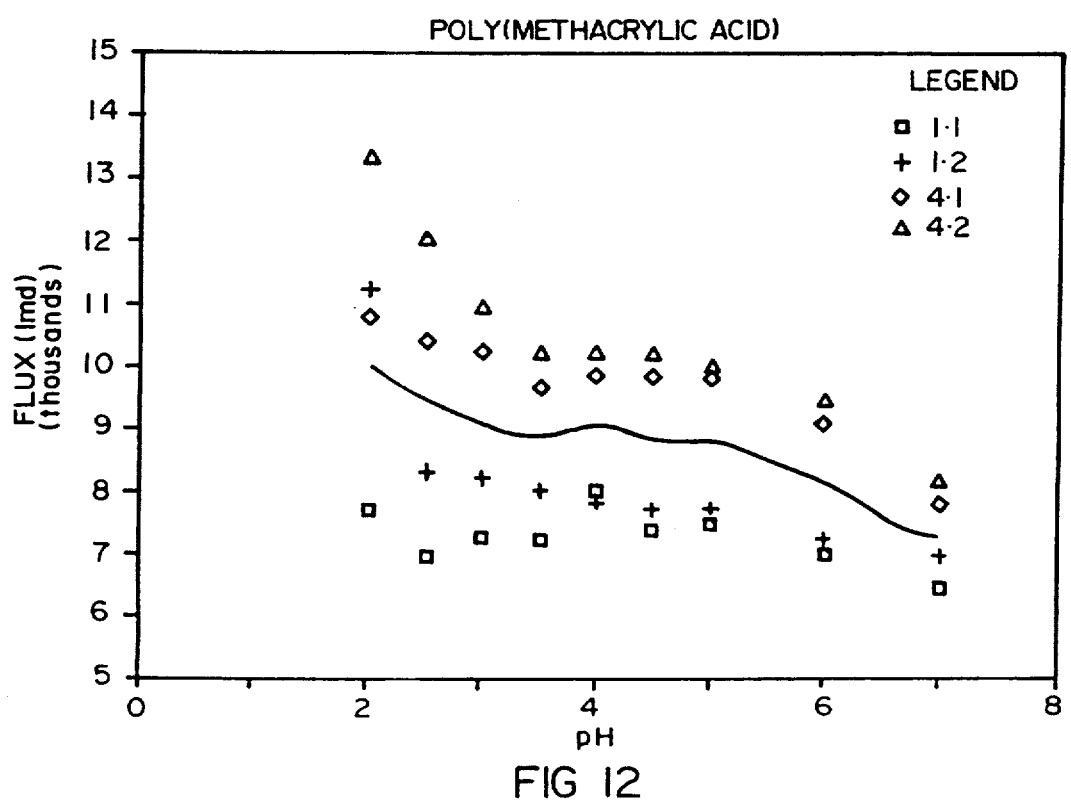
Figure 13:
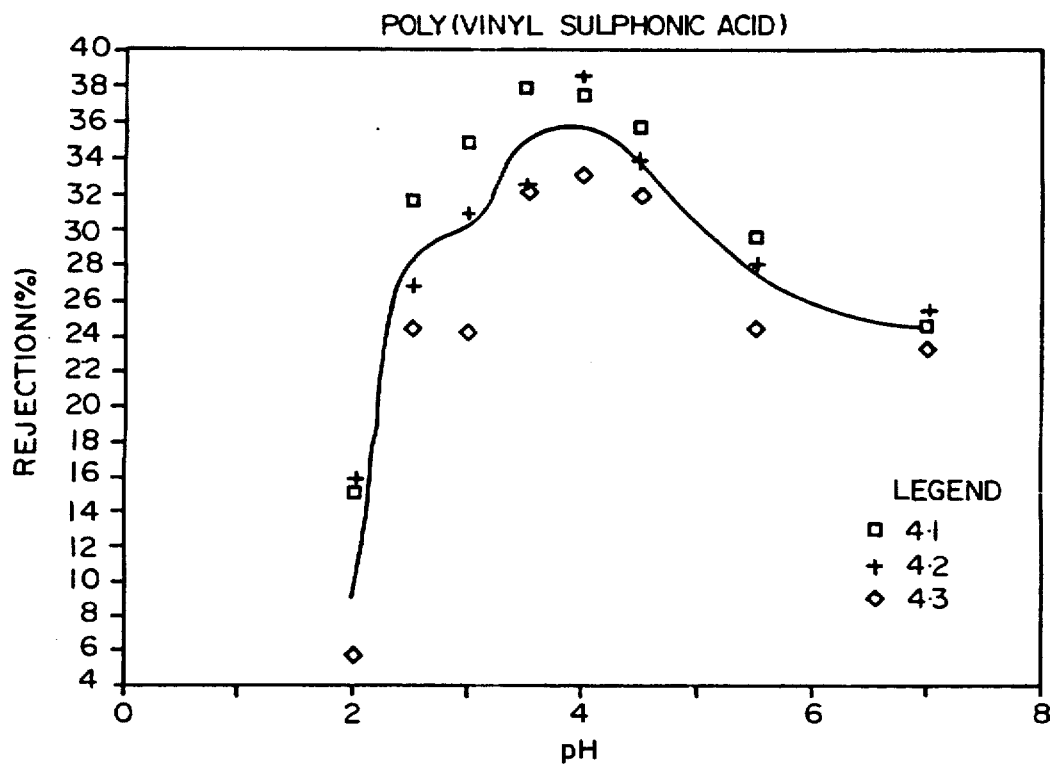
Figure 14:
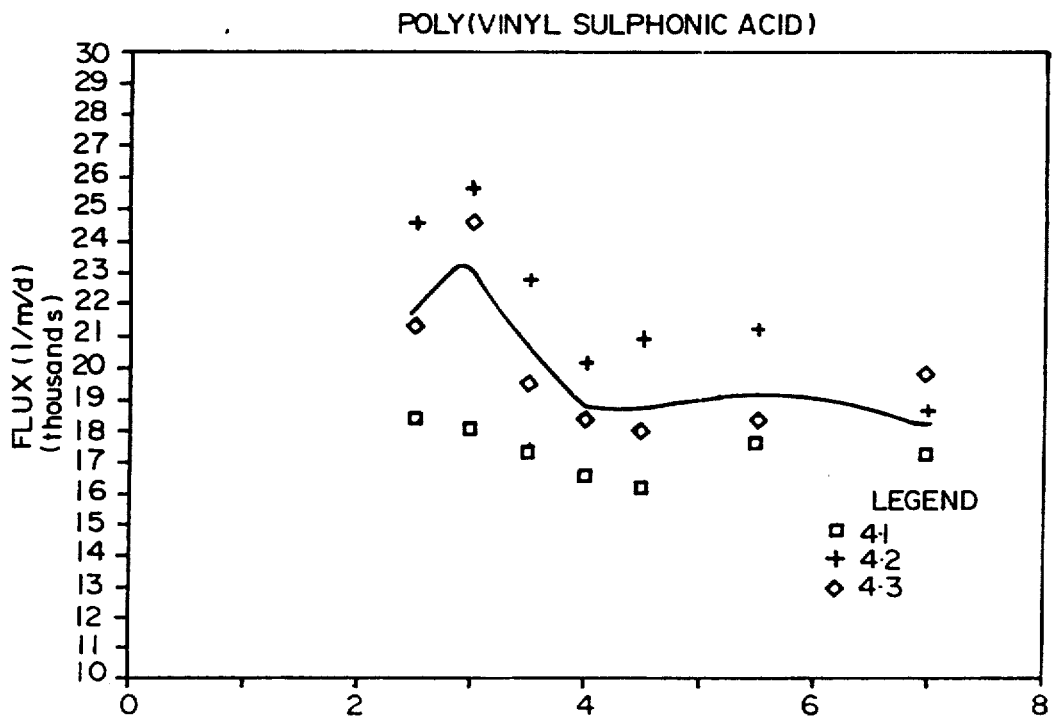
Figure 15:
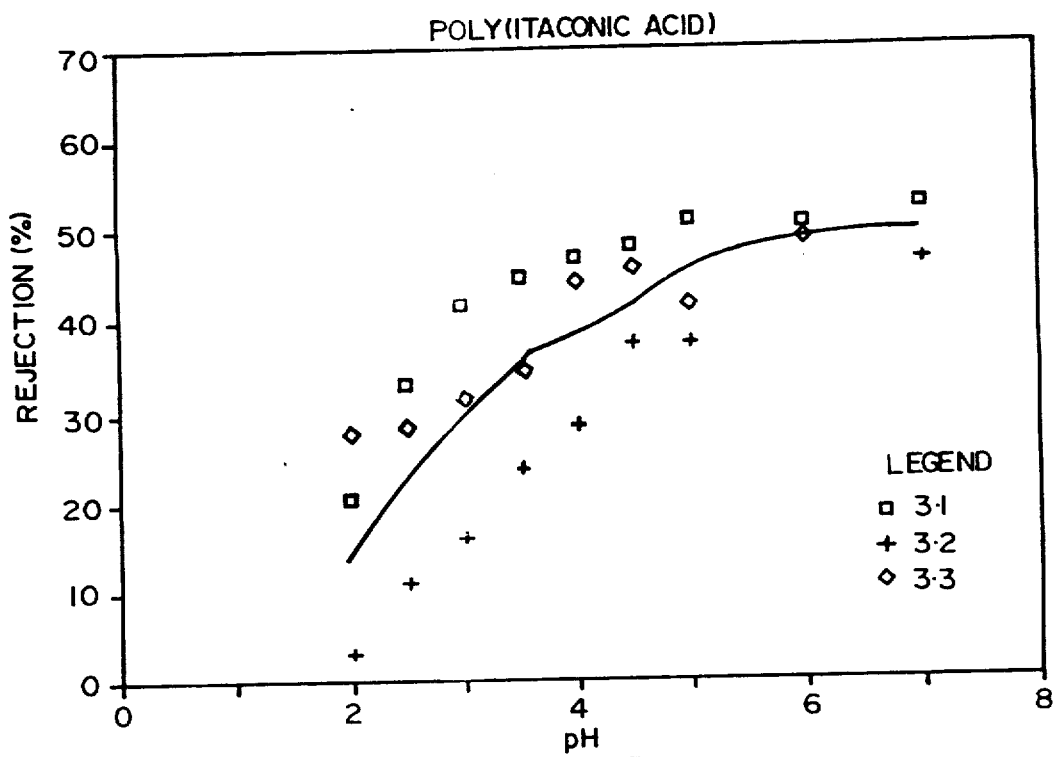
Figure 16:
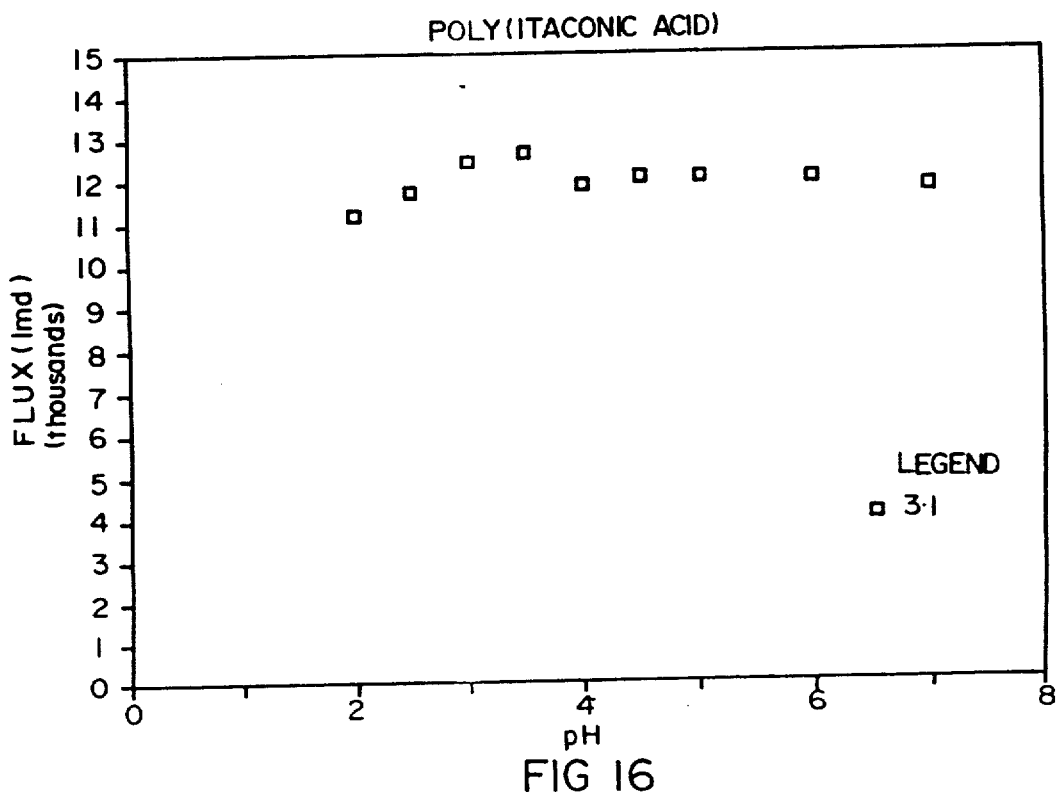
Figure 17:
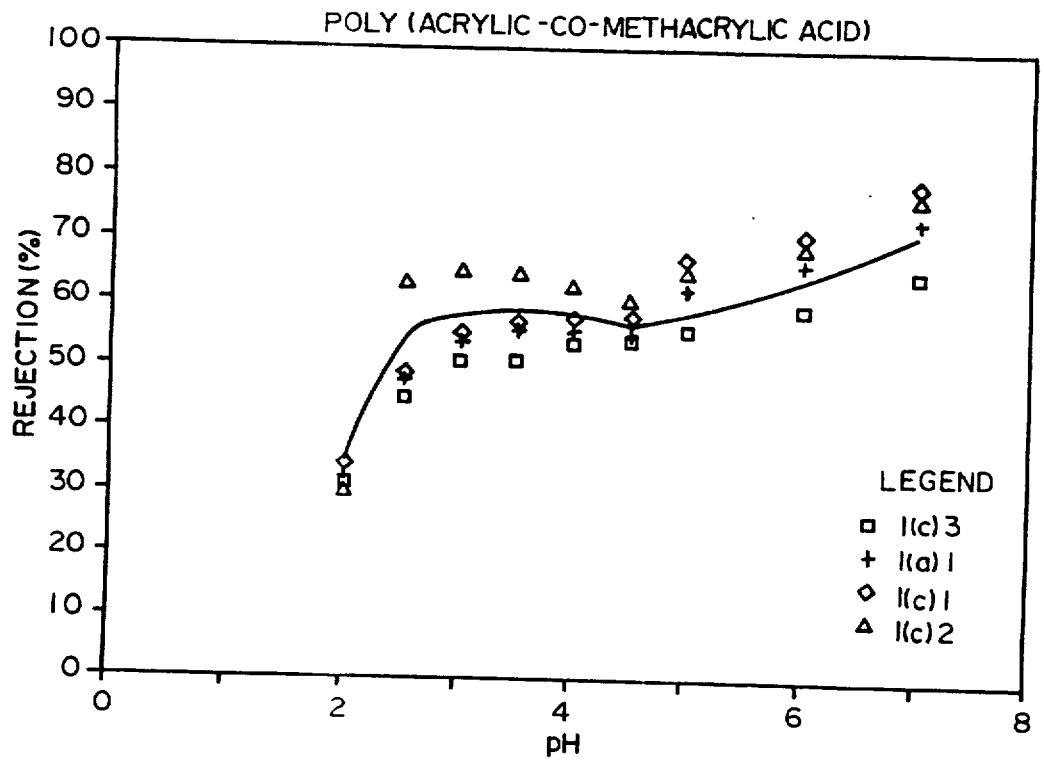
Figure 18:
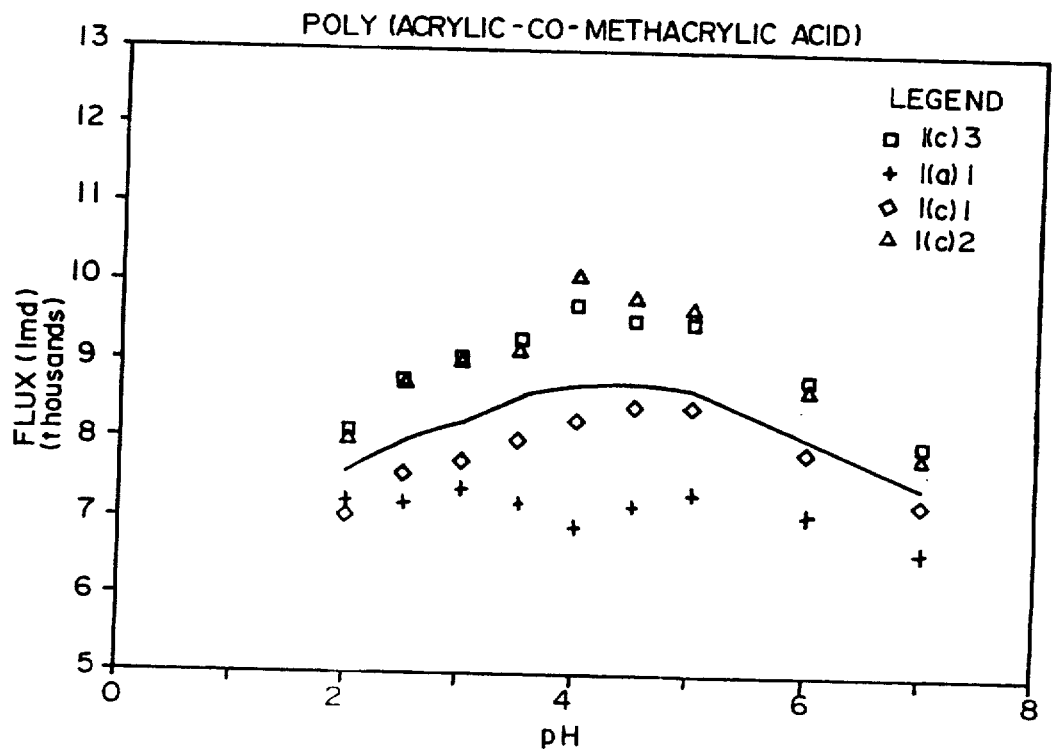
Figure 19:
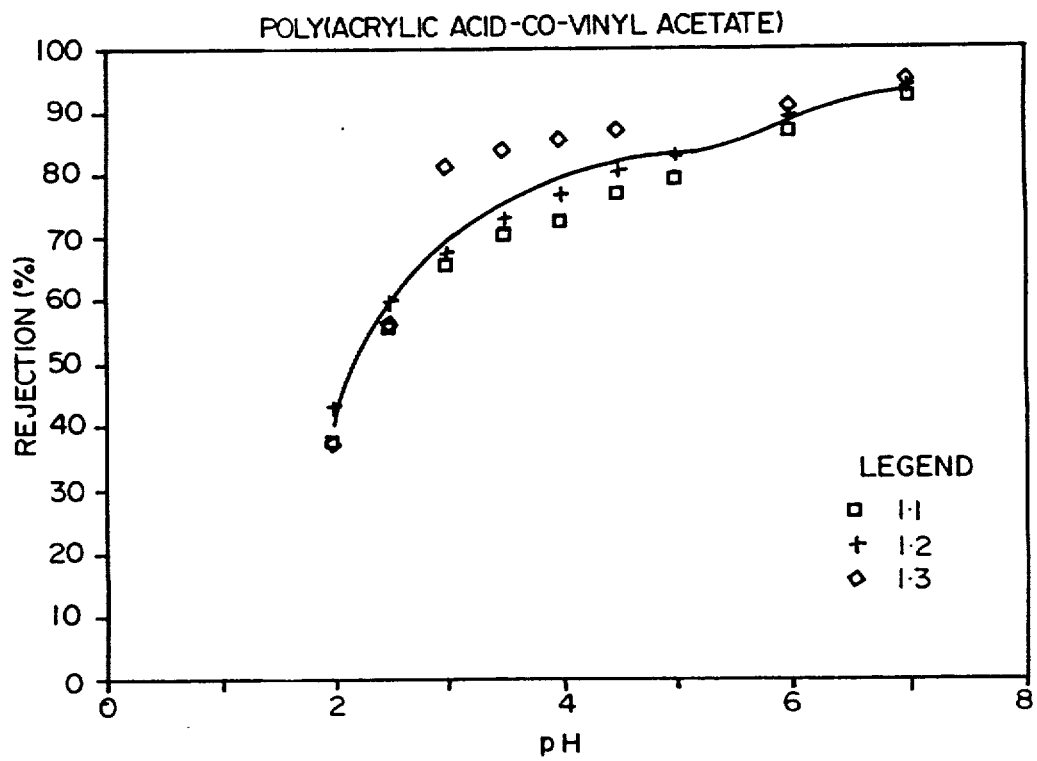
Figure 20:
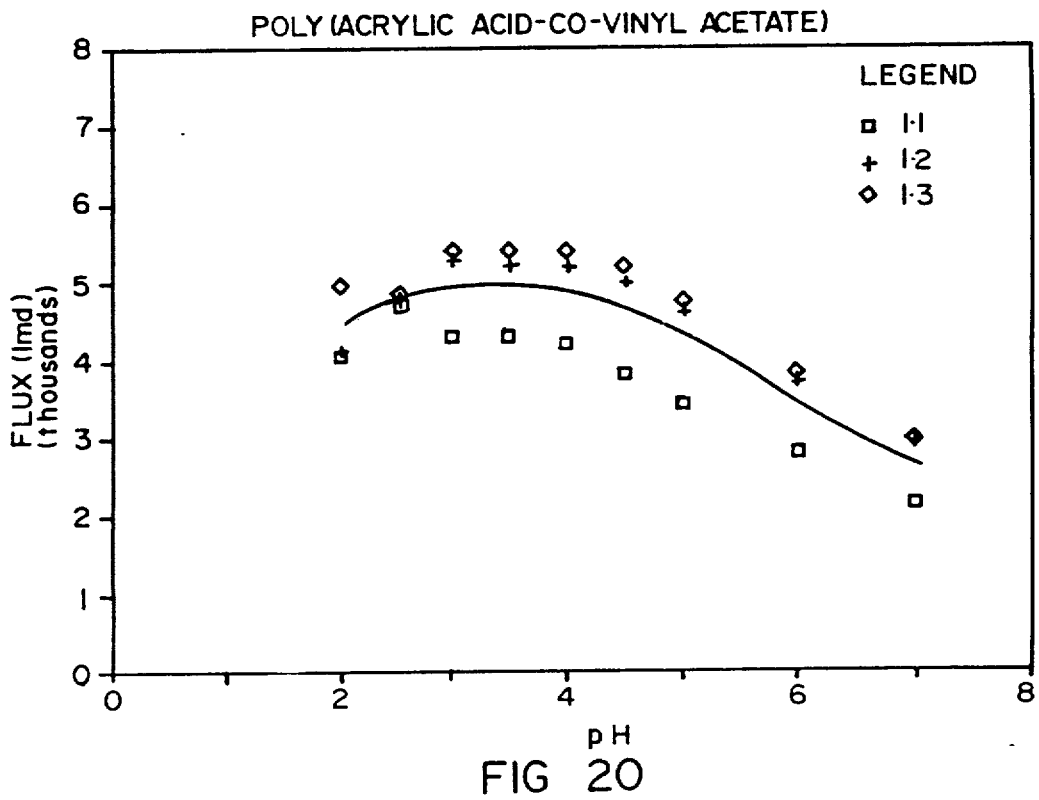
Figure 21:
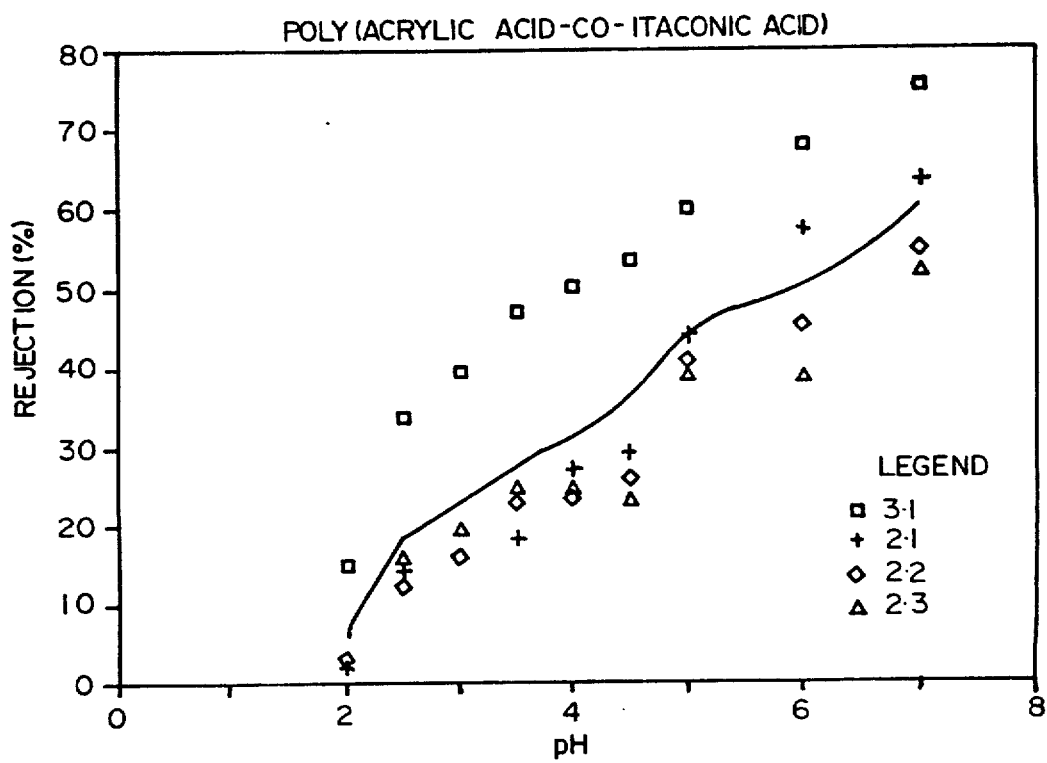
Figure 22:
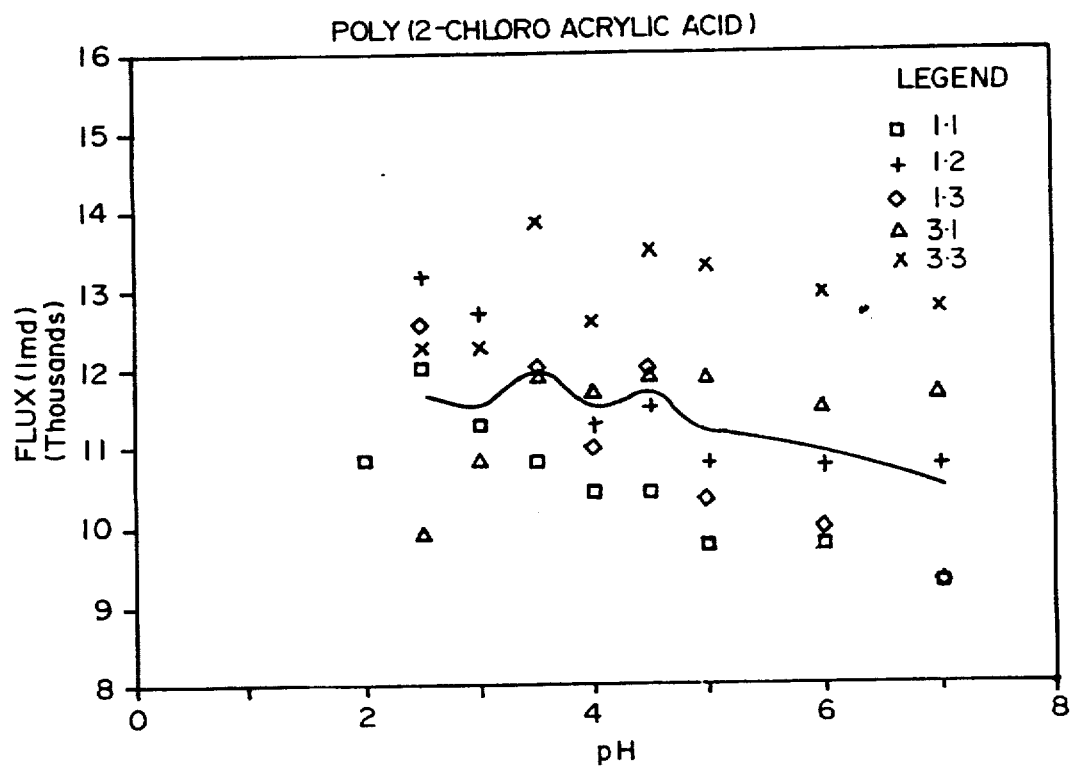
Figure 23:
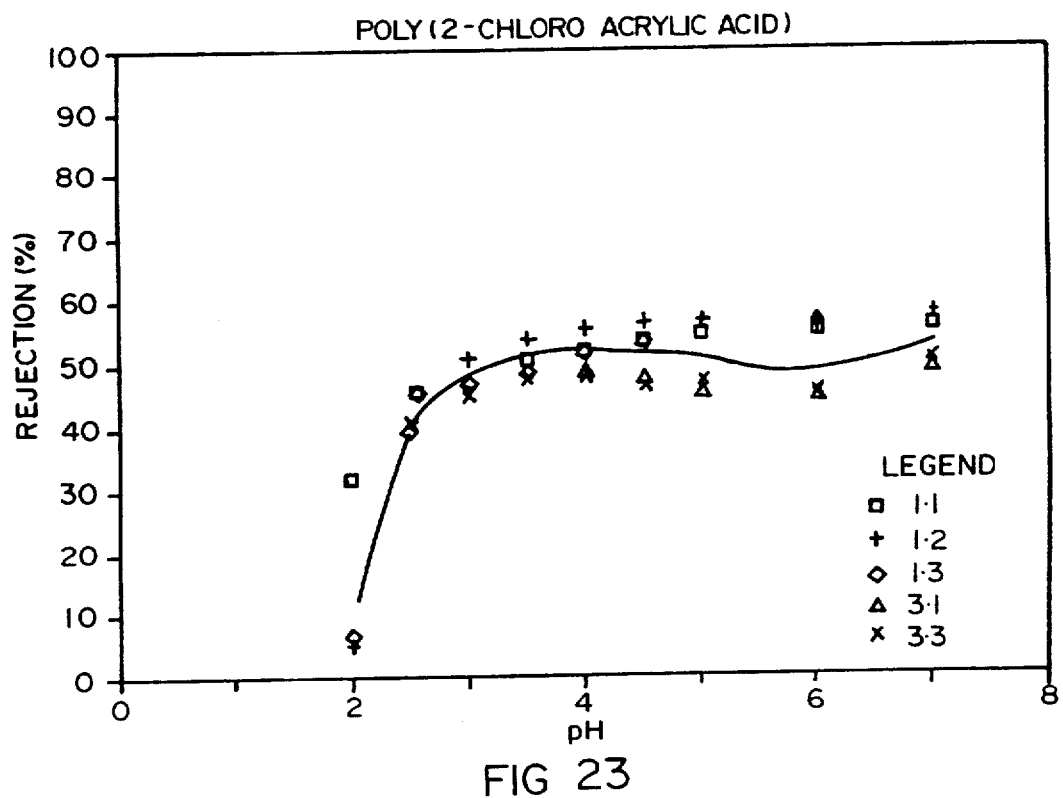
Figure 24:
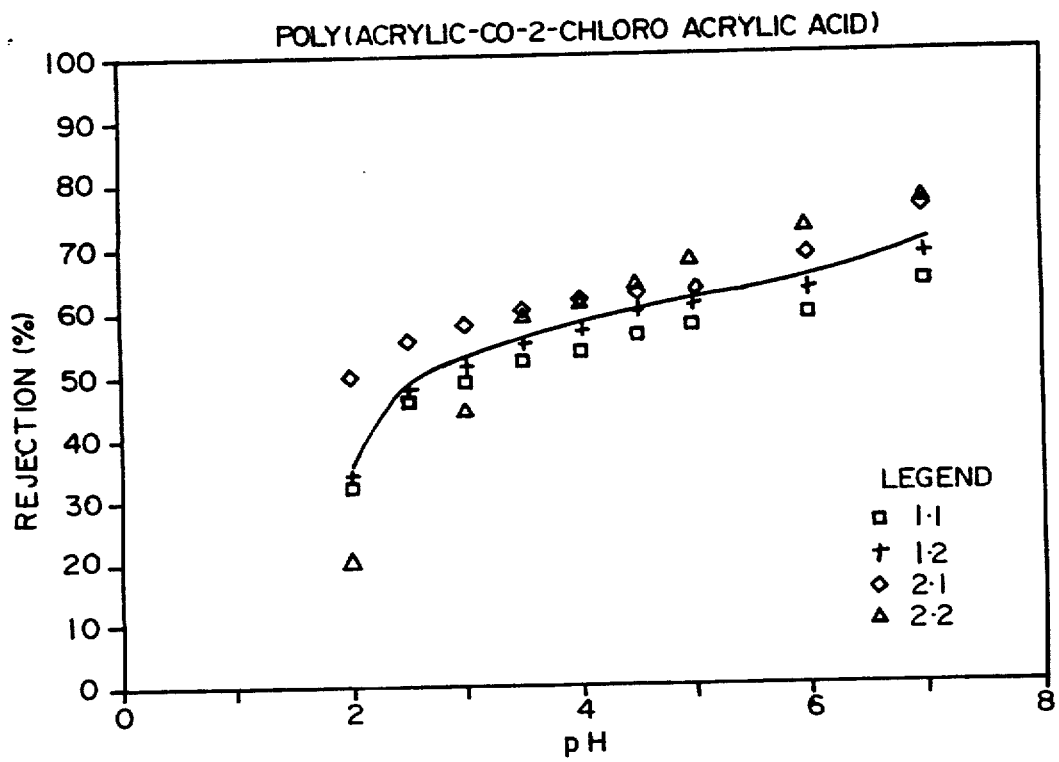
Figure 25:
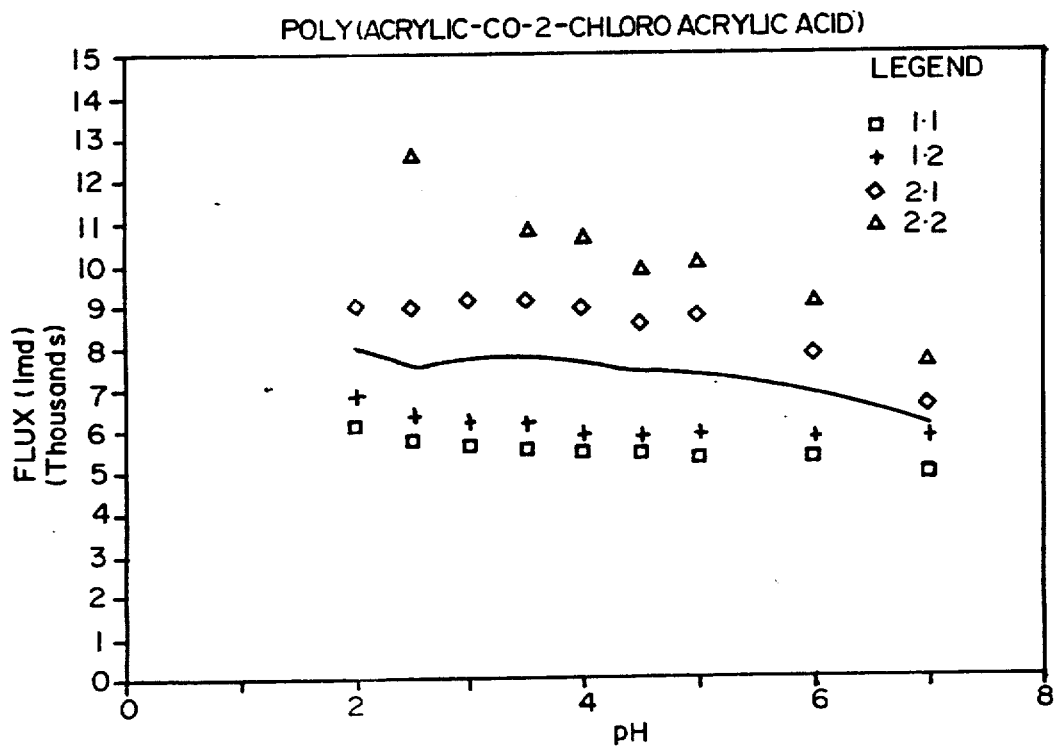
Figure 26:
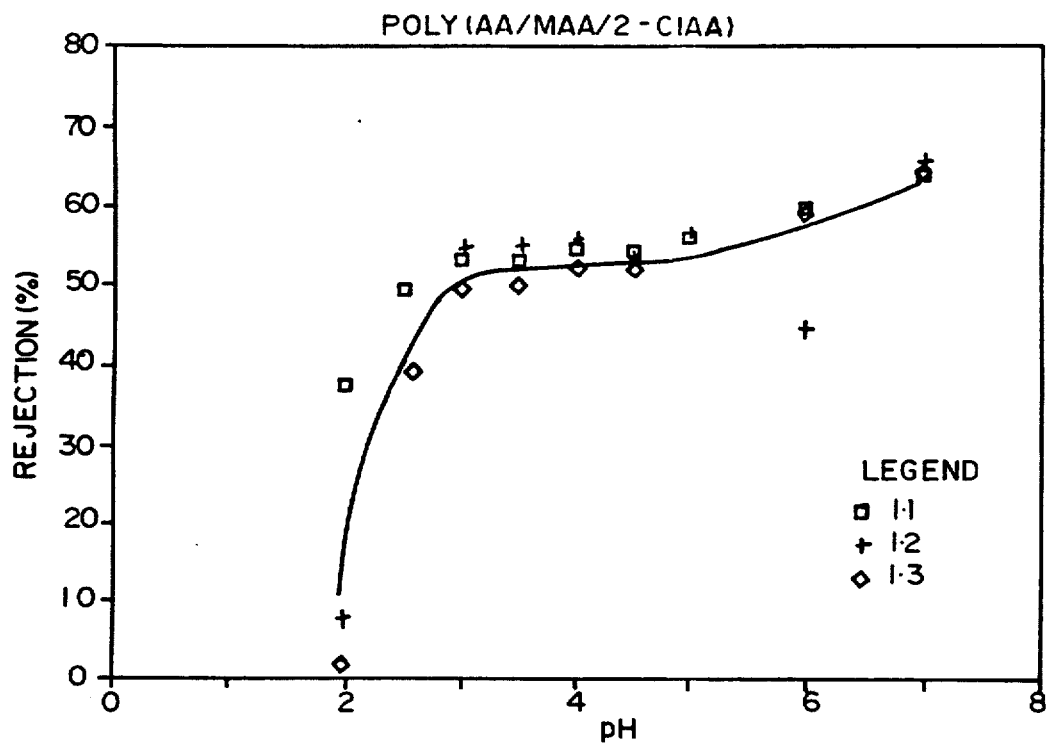
Figure 27:
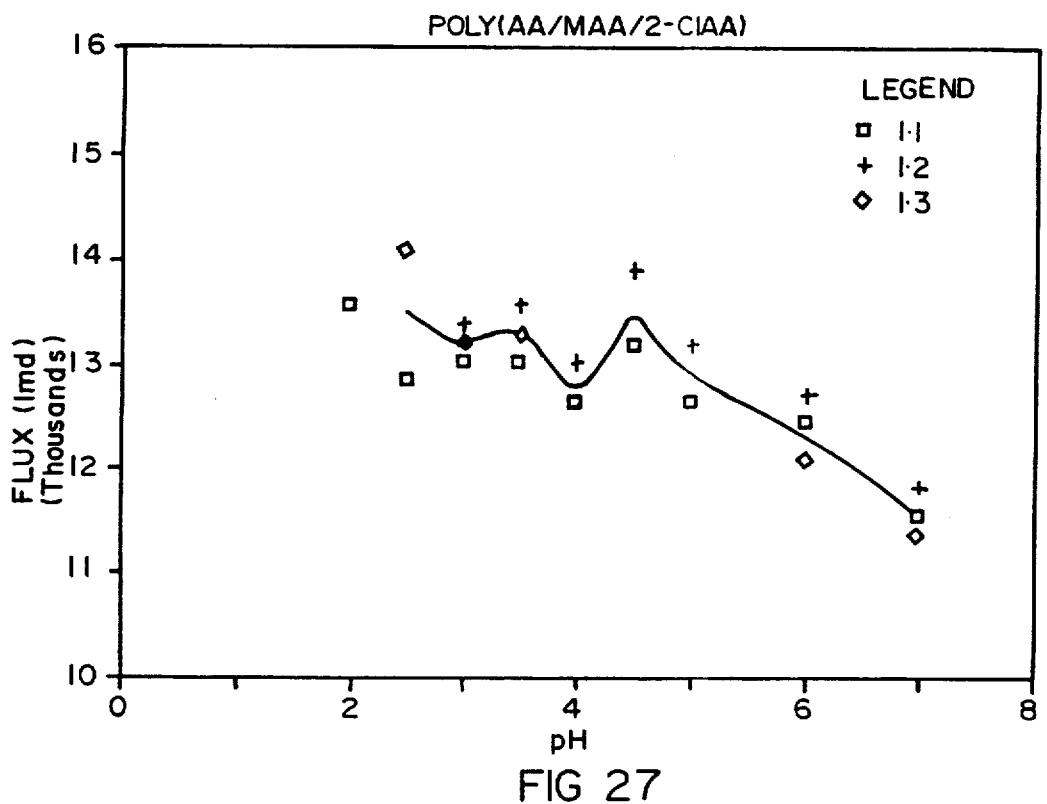
Figure 28:
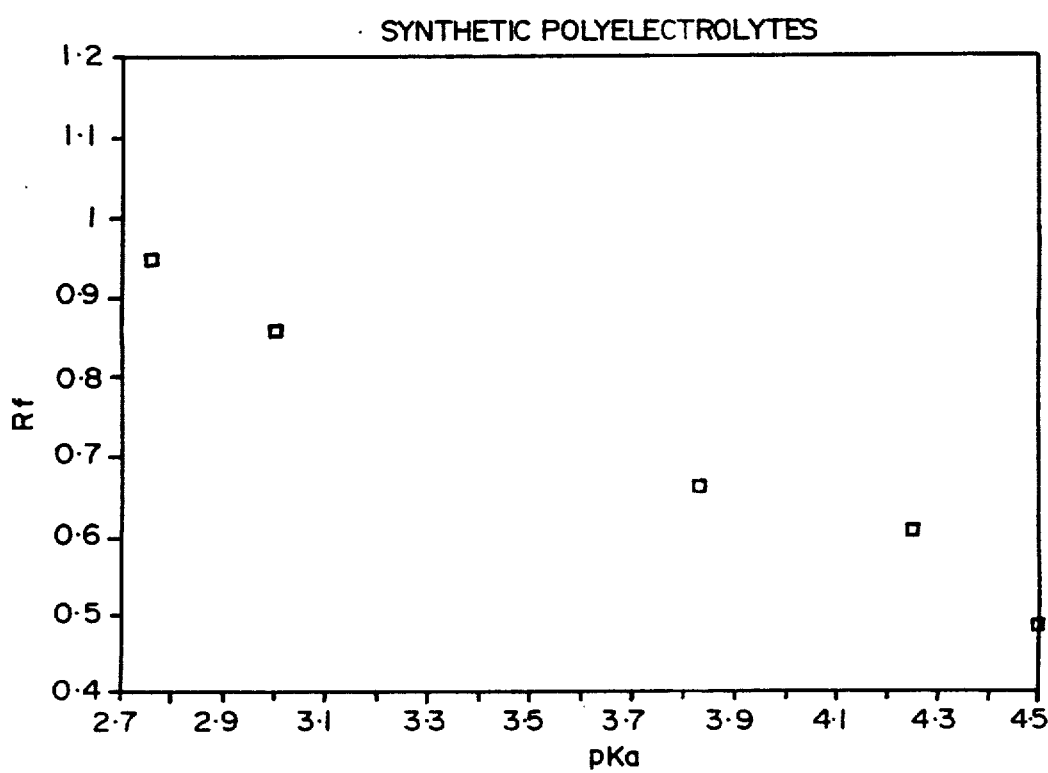
Figure 29A:
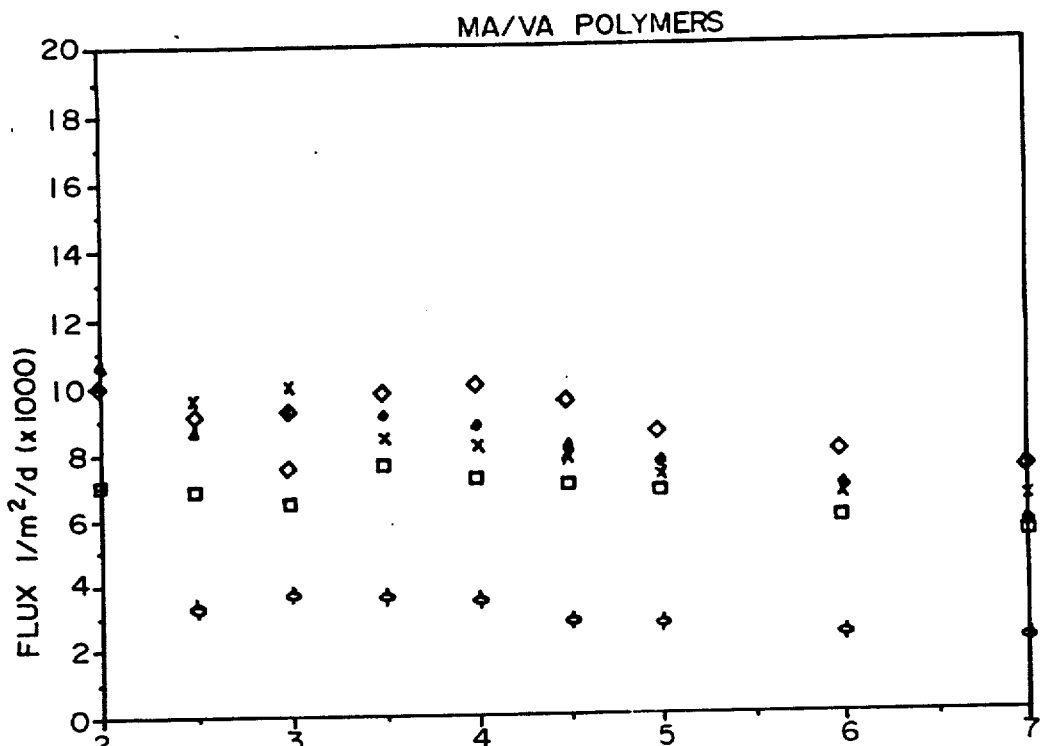
FIGS. 29 to 34 are plots of rejection versus pH and of flux versus pH during the formation of additional membranes in accordance with this invention.
Figure 29B:
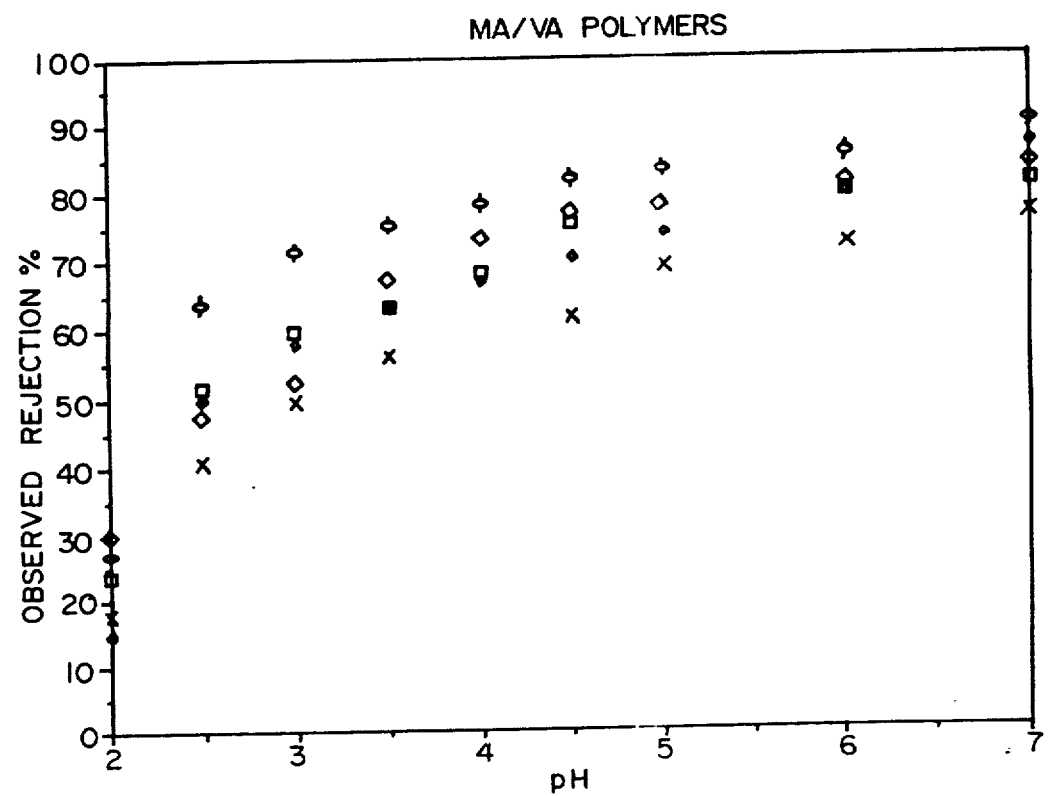
Figure 30A:
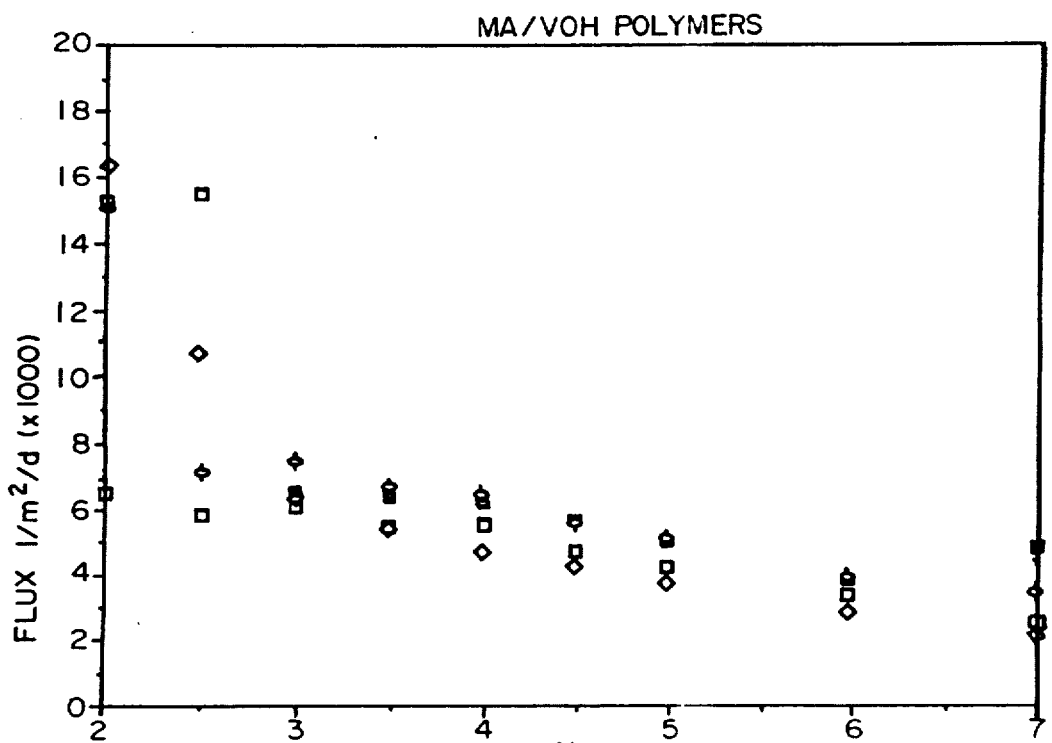
Figure 30B:
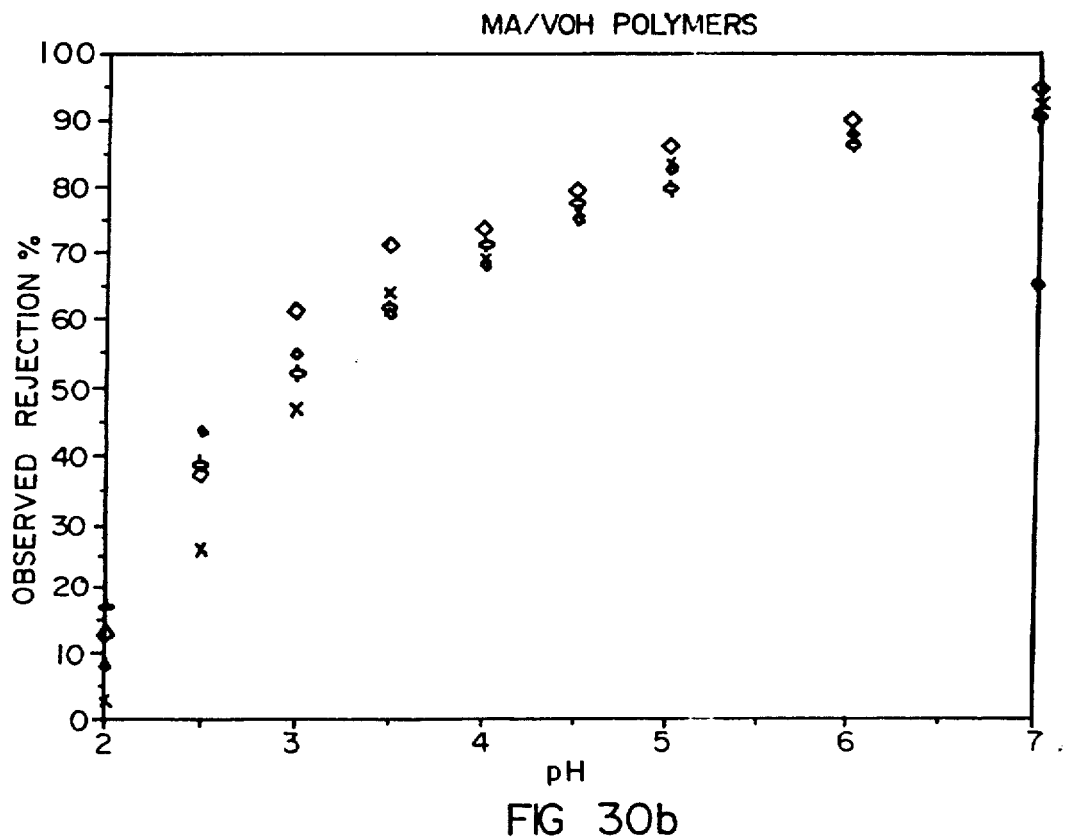
Figure 31A:
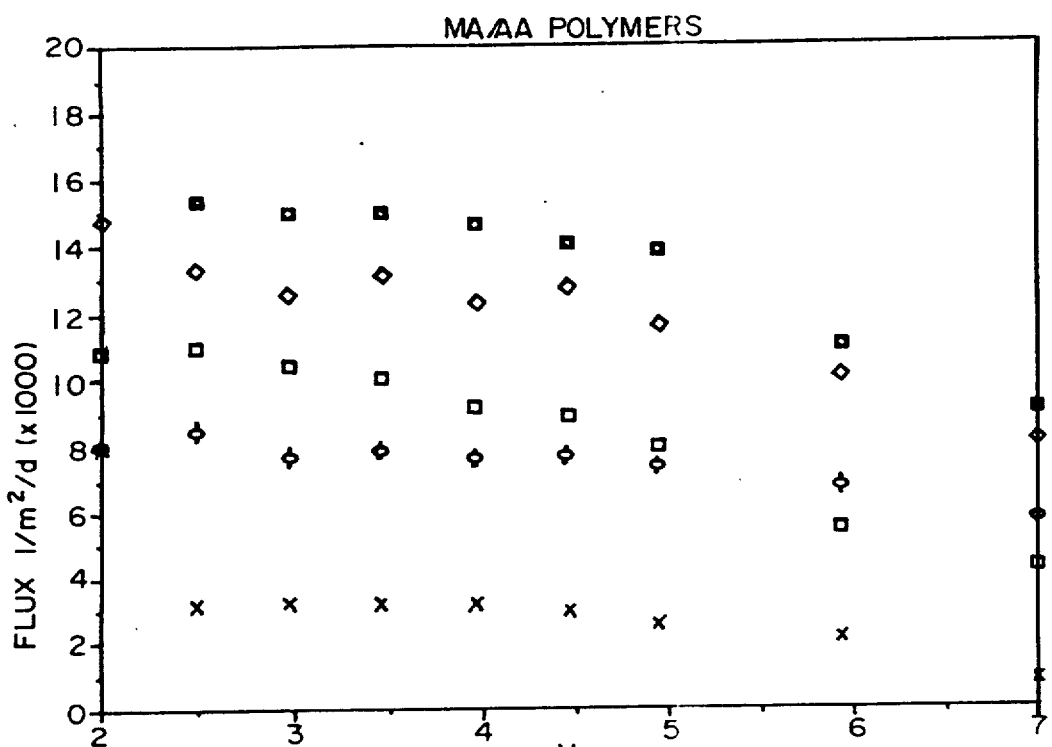
Figure 31B:
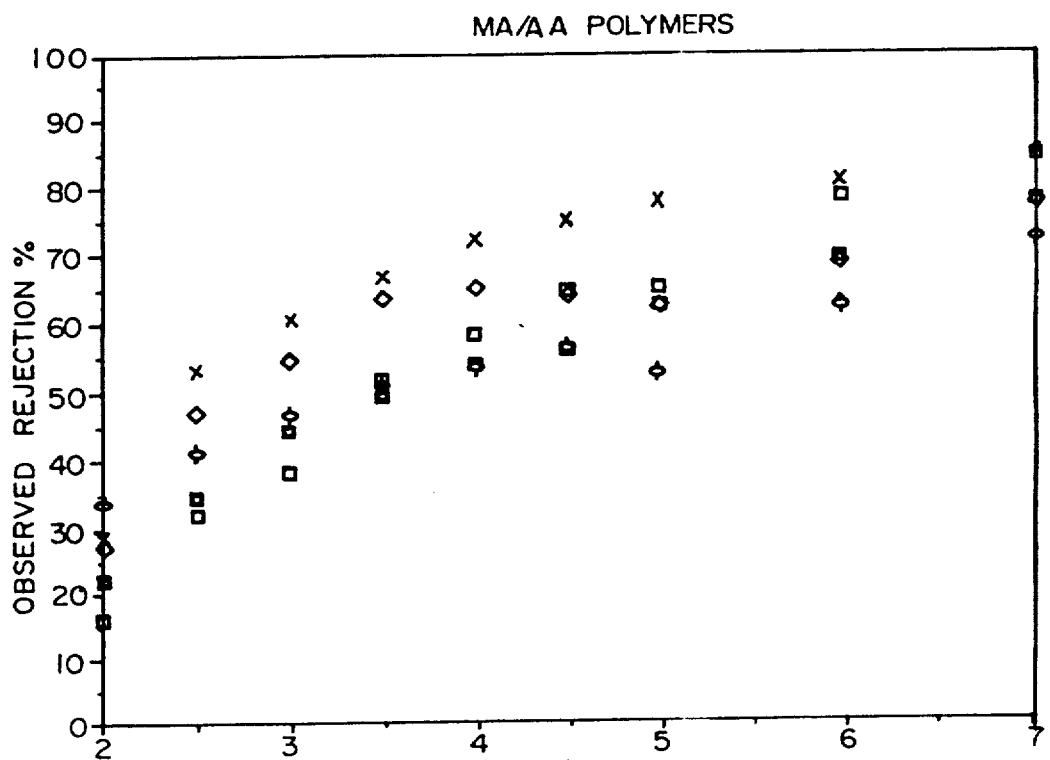
Figure 32A:
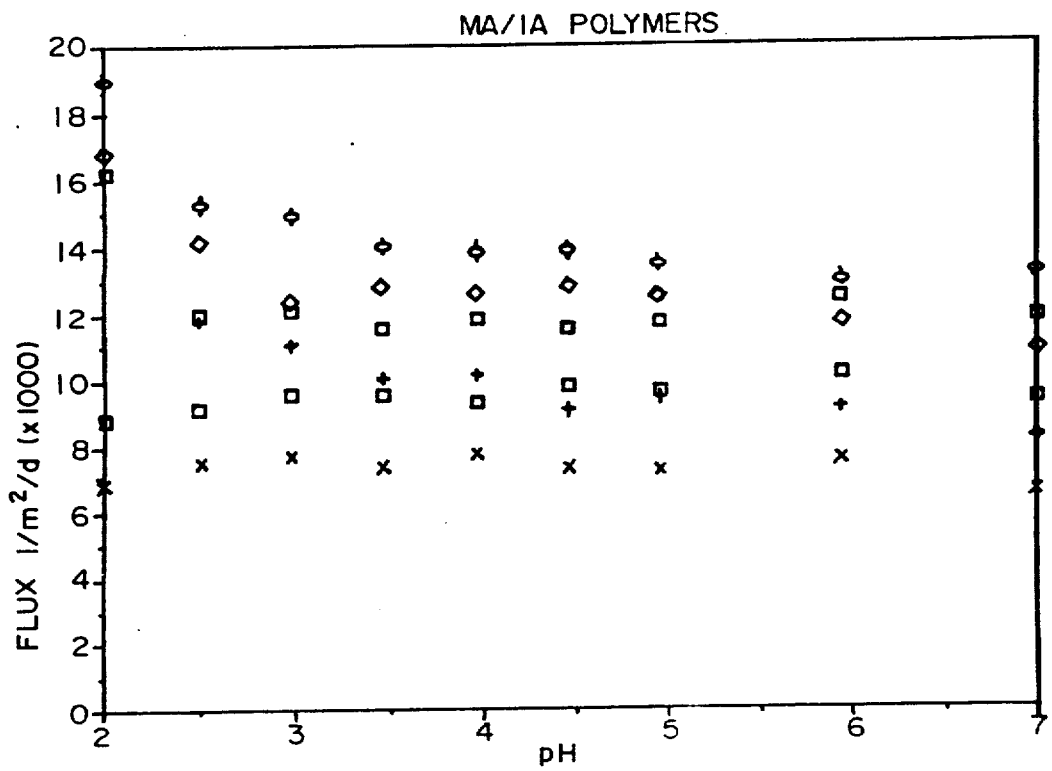
Figure 32B:
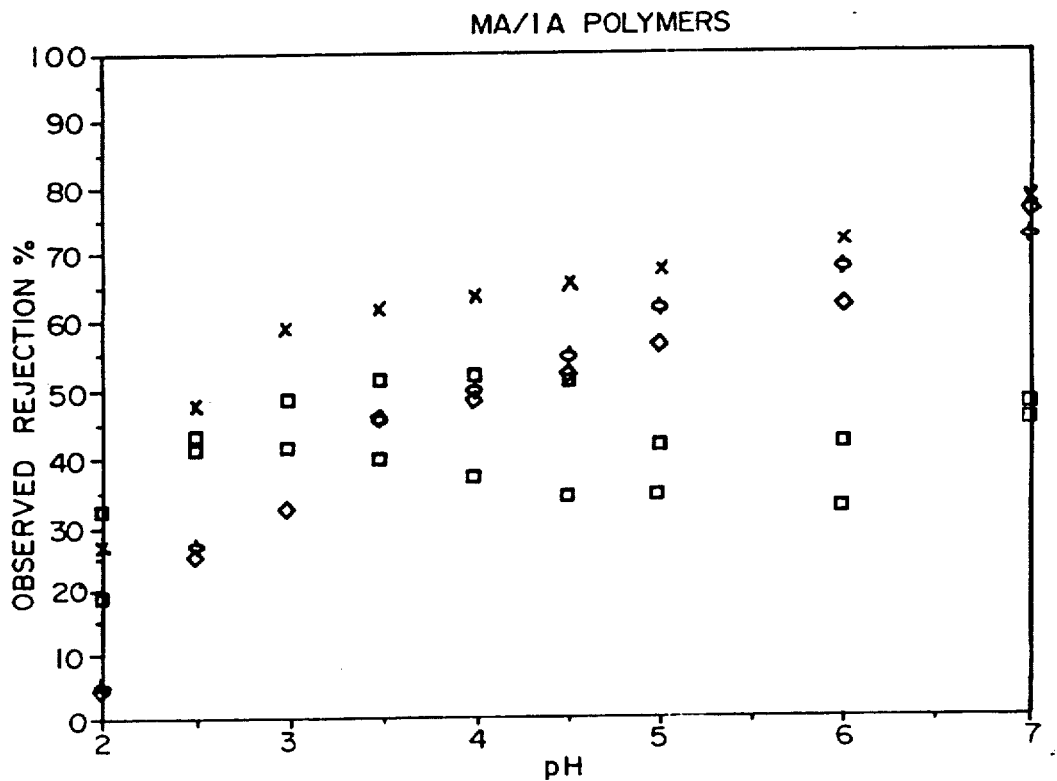
Figure 33A:
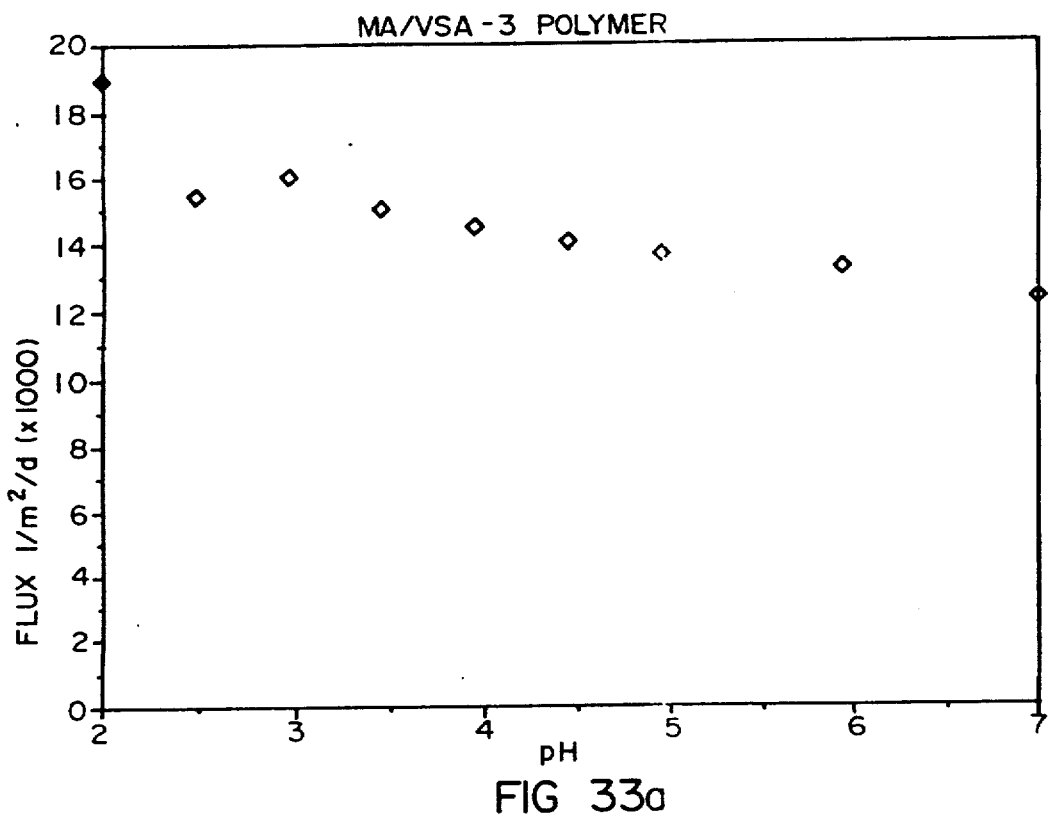
Figure 33B:
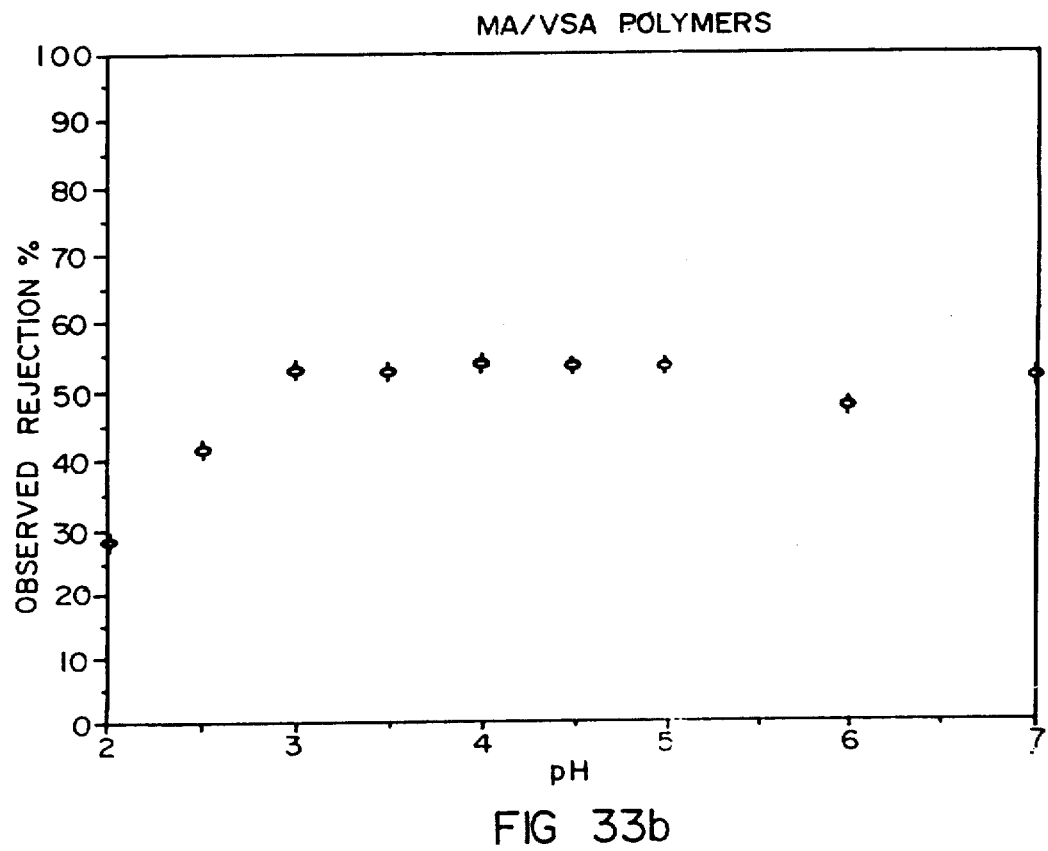
Figure 34A:
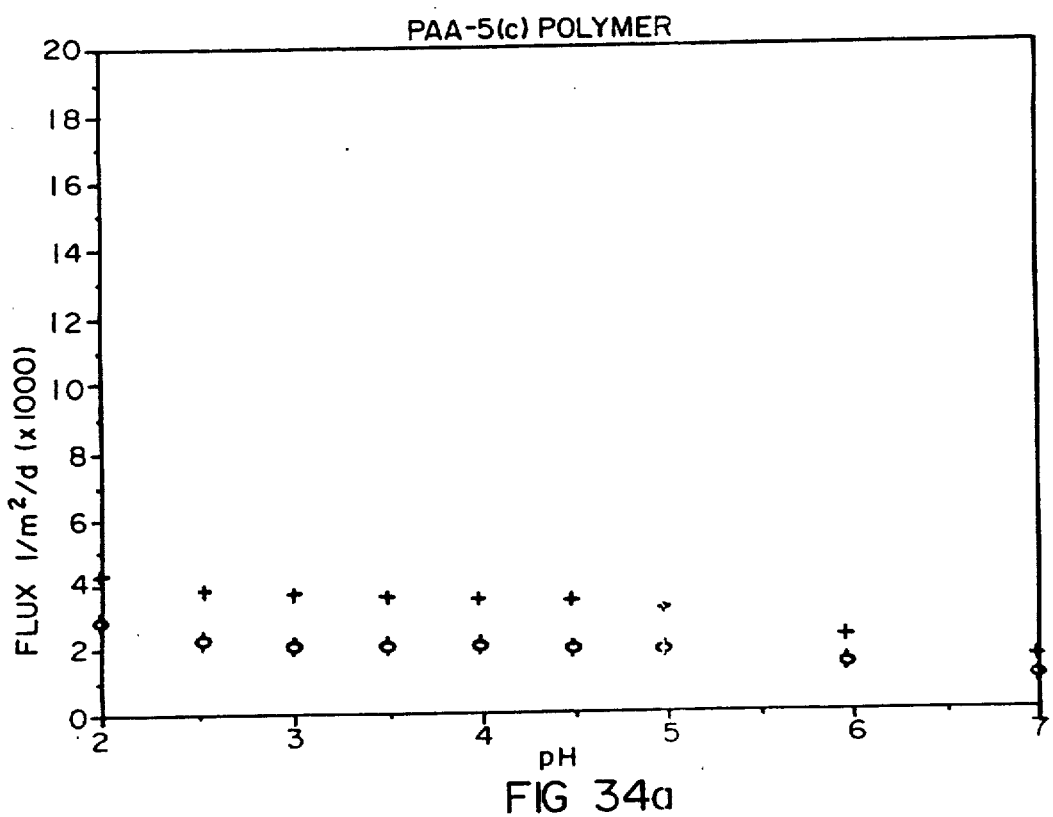
Figure 34B:
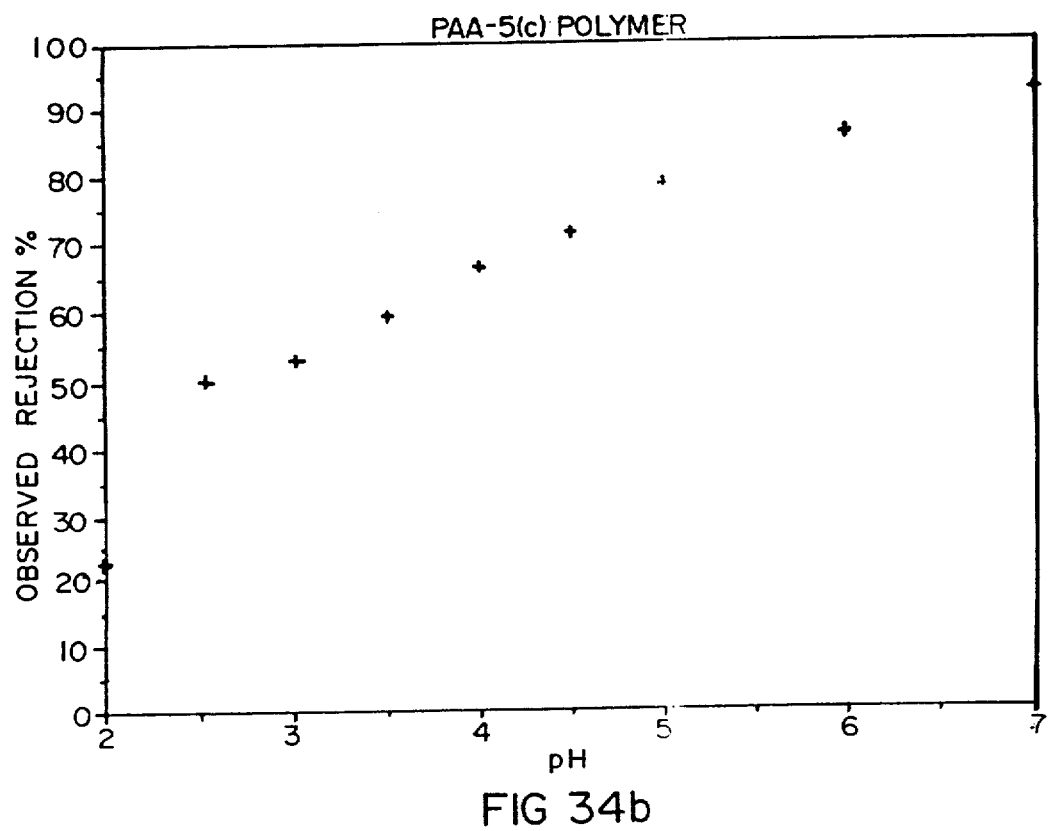
Figure 35:
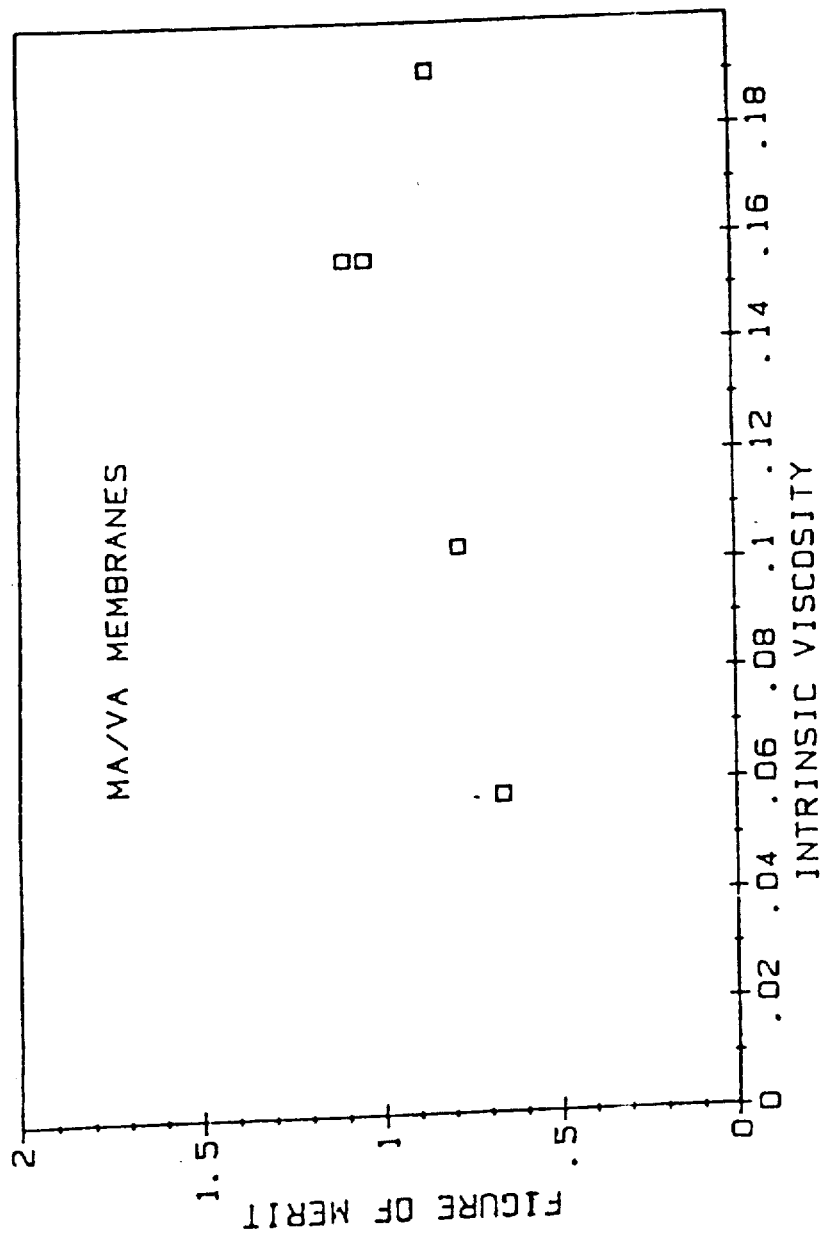
FIGS. 35 to 38 are plots of intrinsic viscosity against Figure of Merit of some membranes in accordance with this invention.
Figure 36:
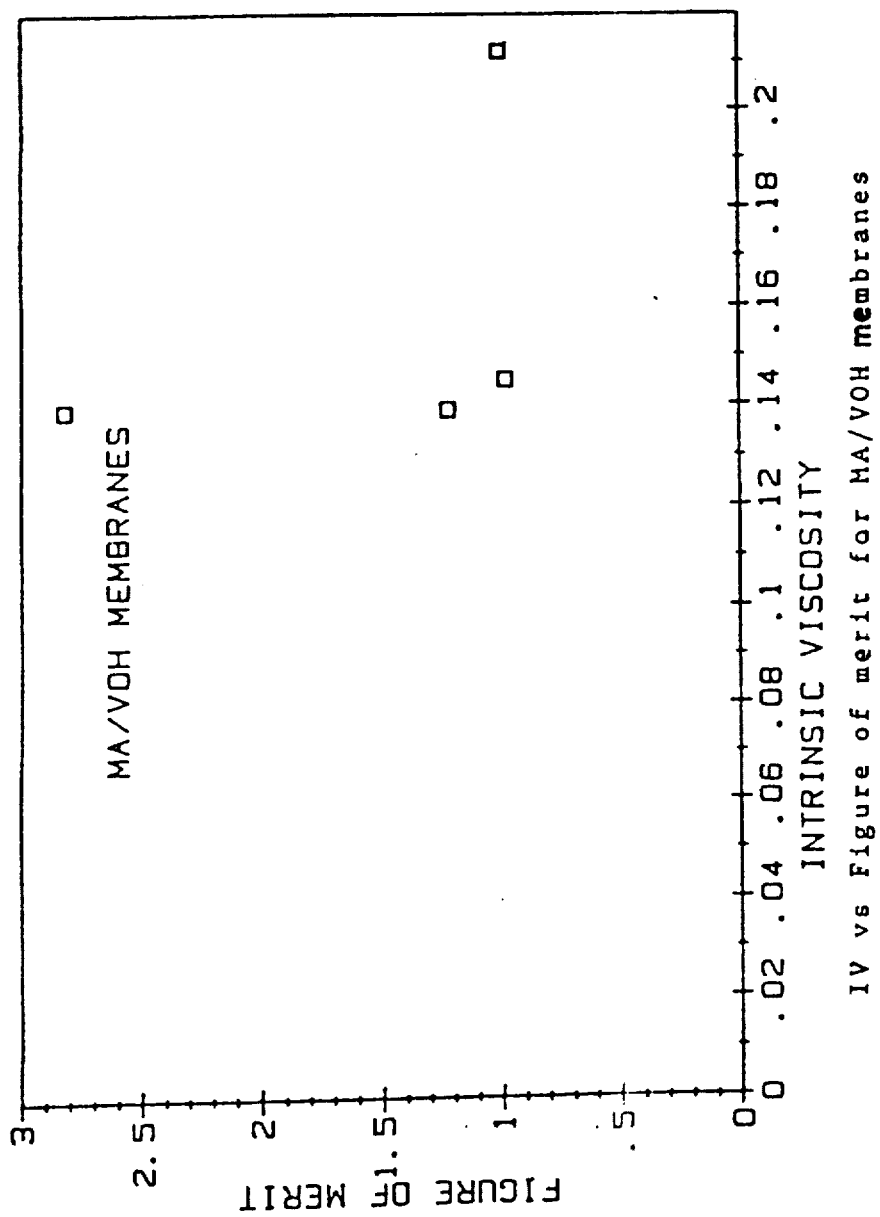
Figure 37:
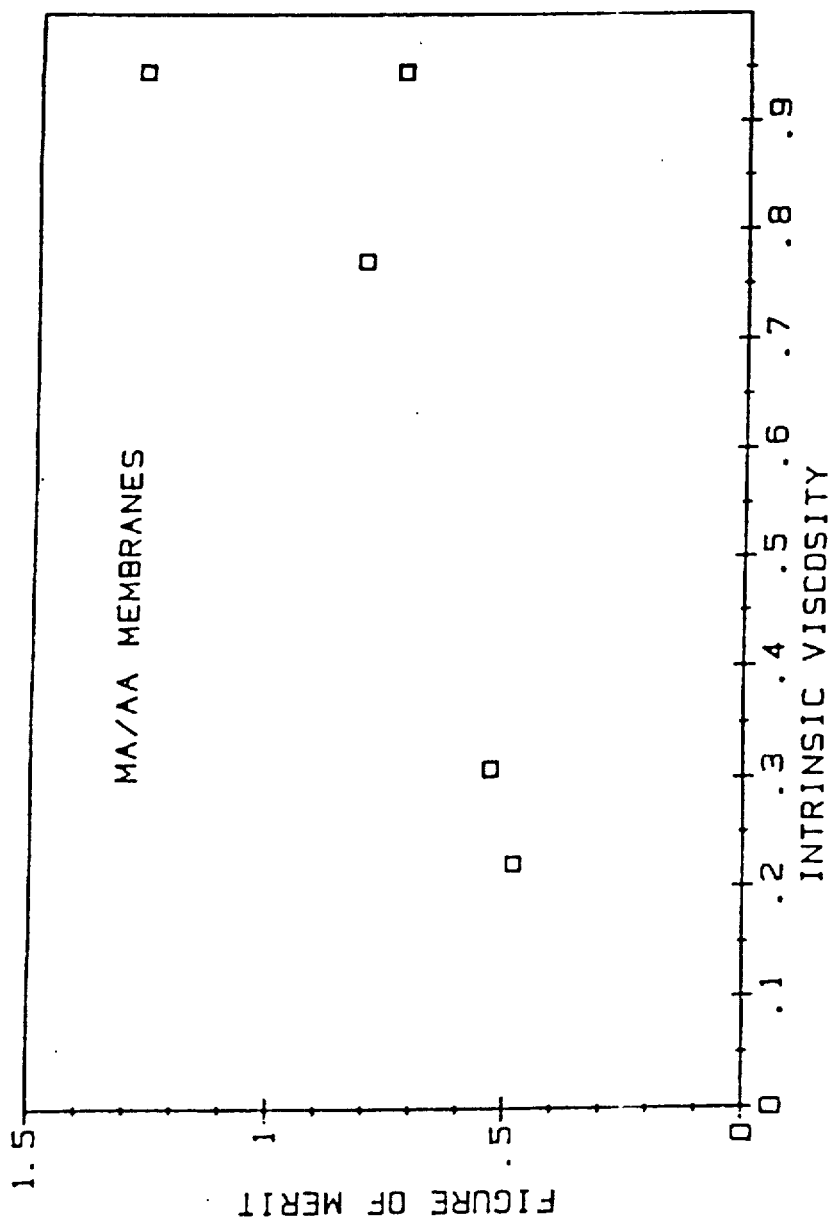
Figure 38:
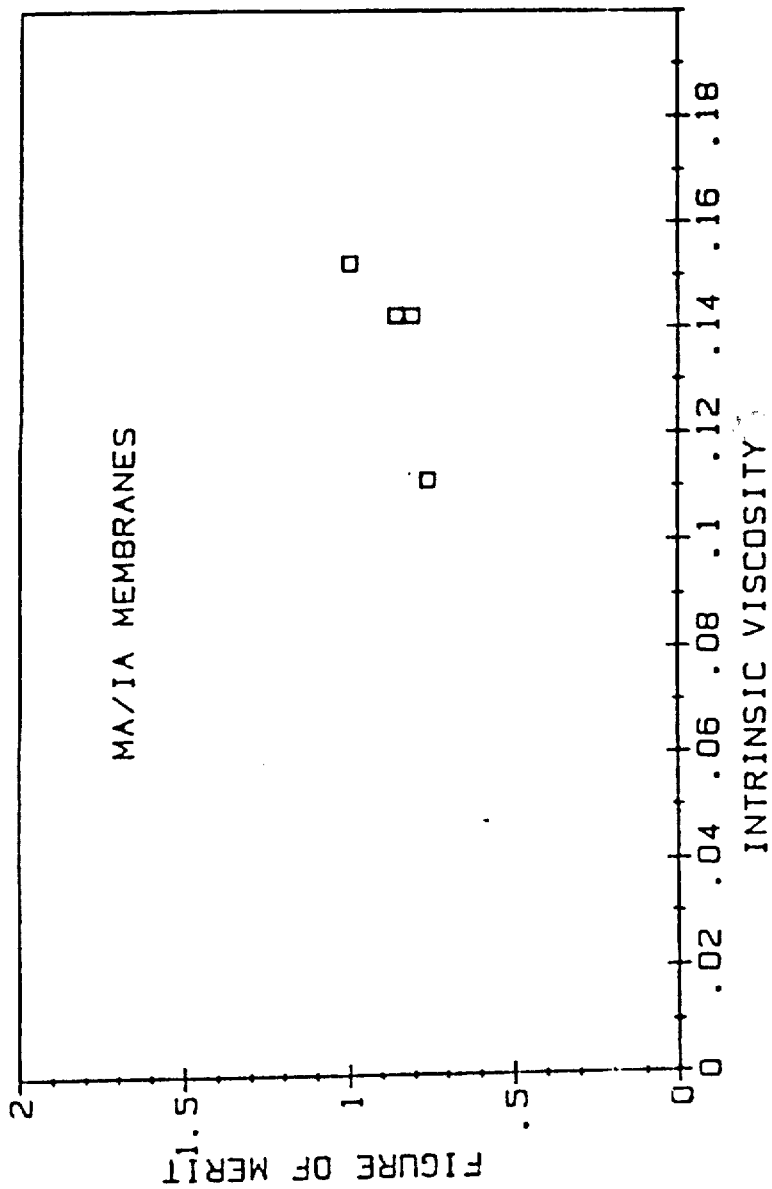

The product of the molecular mass (M) and the intrinsic viscosity ([n]) was calculated and then log M [n] was plotted against the retention time for each standard. The straight-line plot achieved in this way was used as the calibration curve. The curve obtained is given in FIG. 8.

All the synthesized polyelectrolytes were evaluated in terms of intrinsic viscosity and GPC retention times. Their molecular mass can thus be determined by means of the calibration curve, and the results are given in Table 1.

TABLE 1

MOLECULAR MASS OF SYTHESIZED HOMO- AND CO-POLYMERS

| Polymer | (n) | Retention Time (m) | log (Mw(n)) | Molecular Mass |
|---|---|---|---|---|
| PAA-1 | 0.152 | 2.74 | 3.88 | 50 000 |
| PAA-2 | 0.124 | 2.67 | 3.97 | 75 000 |
| PIA-1 | 0.265 | 2.34 | 4.21 | 61 200 |
| PIA-2 | 0.275 | 2.38 | 4.19 | 56 300 |
| PIA-3 | 0.285 | 2.50 | 4.09 | 43 200 |
| PCIAA-1 | 0.375 | 1.95 | 4.57 | 99 000 |
| PCIAA-2 | 0.100 | 2.95 | 3.70 | 19 000 |
| PCIAA-3 | 0.174 | 1.95 | 4.57 | 214 000 |
| PMAA-1 | 0.137 | 1.89 | 4.62 | 304 000 |
| PMAA-2 | 0.135 | 1.93 | 4.58 | 281 000 |
| PMAA-3 | 0.133 | 1.91 | 4.60 | 299 300 |
| PMAA-4 | 0.240 | 2.01 | 4.52 | 138 000 |
| PAA/MAA-1 | 1.360 | 1.90 | 4.61 | 30 000 |
| PAA/IA-1 | 0.586 | 1.99 | 4.53 | 60 000 |
| PAA/iA-2 | 0.678 | 2.00 | 4.52 | 49 000 |
| PAA/IA-3 | 0.646 | 2.10 | 4.43 | 41 000 |
| PAA/VAC | 0.088 | 2.60 | 4.00 | 113 600 |
| PAA/CIAA-1 | 0.310 | 2.06 | 4.47 | 95 200 |
| PAA/CIAA-2 | 0.183 | 2.75 | 3.87 | 40 510 |
| PVSA-1 | 0.0846 | 3.24 | 3.45 | 33 310 |
| PVSA-2 | 0.811 | 3.25 | 3.44 | 33 960 |
| PVSA-3 | 0.686 | 3.29 | 3.40 | 36 620 |
| PVSA-4 | 0.0636 | 3.50 | 3.22 | 26 000 |
| TERP-1 | 0.431 | 2.10 | 4.43 | 63 500 |
| PMAA/CIAA-1 | 0.564 | 2.09 | 4.45 | 50 000 |

The polymer compositions were determined by using titration techniques, and the results are given in Table 2.

TABLE 2

FEED RATIOS, MOLECULAR MASS, CONVERSION AND COMPOSITION OF CO-POLYMERS

| Polymer | Feed Ratios | | | Molecular Mass | Conversion | Composition | | |
|---|---|---|---|---|---|---|---|---|
| | A | B | C | | | A | B | C |
| PAA/MAA-1 | 0,50 | 0,50 | — | 30 000 | 0,98 | 0,50 | 0,50 | |
| PAA/1A-2 | 0,65 | 0,35 | — | 49 000 | 0,56 | 0,65 | 0,35 | |
| PAA/1A-3 | 0,65 | 0,35 | — | 41 000 | 0,87 | 0,65 | 0,35 | |
| PAA/VAC-1 | 0,50 | 0,50 | — | 113 000 | 0,58 | 0,60 | 0,40 | |
| PAA/CIAA-1 | 0,60 | 0,40 | — | 95 200 | 0,99 | 0,60 | 0,40 | |
| PAA/CIAA-2 | 0,63 | 0,37 | — | 40 500 | 0,99 | 0,63 | 0,37 | |
| PMAA/CIAA-1 | | | | 50 000 | 0,98 | | | |
| TERPI | 0,40 | 0,35 | 0,25 | 63 500 | 0,99 | 0,40 | 0,35 | 0,25 |

1.7 Membrane Formation

1.7.1 Introduction

The formation conditions affect the performance of dynamically formed membranes. For comparative purposes, formation conditions for all membranes were standardized. Figures of merit which depend on both flux and rejection were chosen as basis for comparison. The figures of merit can be represented by $A^2/B$ where A is a membrane constant for water permeation in $g/cm^2.s$, and B is the membrane constant for salt permeation in $g/cm^2.s$.

As poly(acrylic acid) is the present state-of-the-art polyelectrolyte in dynamically formed composite membranes, the formation conditions chosen were those recommended for hydrous zirconium oxide-poly(acrylic acid) composite membranes. Membranes made with all other polymers have been compared with that made with poly(acrylic acid) after (i) completion of formation (pH 7.00)
(ii) 18 hours of use (pH 7.00)
(iii) pH 8.00 was reached (iv) pH 9.00 was reached.

1.7.2 Formation of Dynamically formed Composite Membranes

The procedure used was based on that described in an article by Johnson, Minturn and Wadia in J. Electroanal, Chem. 37, 267, (1972), with small modifications as detailed in 1.7.2.1, 1.7.2.2 and 1.7.2.3.

1.7.2.1 Cleaning Procedures

The formation of a membrane was always preceded by a thorough cleaning of the membrane coating and evaluation equipment. The procedure recommended was:

(i) Wash with aqueous NaOH (pH 11.00) for 1-4 hours at 308° K.
(ii) Rinse with reverse osmosis permeate (hereafter called RO permeate).
(iii) Wash with aqueous $HNO_3$ (pH 1.00); wash for 1-3 hours at 323° K.
(iv) Rinse with RO permeate until the pH of the permeate equals the pH of the feed.
(v) Repeat until a check for Fe++ present by using Prussian Blue as indicator is negative and all oil contaminants are removed. This is especially important after long shut-down periods.

1.7.2.2 Formation of the Zirconium Layer

The recommended procedure was:

Use Millipore filters, HA, rated at 0.5 micron as backing material in the cells. Add RO permeate in the feed tank (FIG. 5) and circulate at 3.67 l.min$^{-1}$ through the system. Adjust the back pressure to 2 MPa. Bring the pH to 4.00 with $HNO_3$. Add $NaHO_3$ to 2 g/l. Then add the zirconium salt (Zr ($NO_3$)$_4$) to $1.0 \times 10^{-4}$ M. With the addition of the zirconium nitrate, the pH drops and is readjusted to between 3.75 and 3.90 using 10% sodium hydroxide solution. The back pressure is then increased by 1 MPa every 5 minutes until it reaches 6 MPa. The flux and rejection are monitored. The zirconium membrane is complete then values of 500-700 $lm^{-2}hr^{-1}$ for flux and 30-55% for rejection is attained. The pH is then lowered to 2.00 with $NHO_3$ and the feed tank is drained. Fresh RO permeate is added and the pH adjusted to 2.00. The system is rinsed and the tank drained again in order to remove all membrane preparation chemicals.

1.7.2.3 Formation of the Polyelectrolyte-zirconium Membrane

The recommended procedure was:

Refill the tank with RO permeate and adjust the pH to 2.00. Add 2 g/l $NaNO_3$ and recirculate at 3.67 l/min and 6 MPa. Add 50 ppm polyelectrolyte. Now increase the pH by 0.5 pH units every 30 minutes with 10% sodium hydroxide solution, until the pH reaches 7.00. Flux and rejection measurements are monitored throughout the period of membrane formation and repeated 18 hours later, when the membrane has stabilized. At this point, the pH must be adjusted to 8.00 and the membrane allowed to equilibrate for 45 minutes before the flux and rejection are measured again. The pH is then adjusted to 9.00 and equilibration and measurements repeated.

The data obtained can be fed into a computer programmed to evaluate the $A^2/B$ values at all four points of measurement.

1.8 Polymer Evaluation

1.8.1 Dynamic Membrane Formation

Without wishing to be bound by theory, the Applicant believes that membrane formation occurs as follows:

The interaction between the polymer and the zirconium is by a mechanism of chelation, with two adjacent carboxylic groups chelating with a single zirconium atom. The mechanism of formation of a composite membrane is one of pore-filling, namely the hydrous zirconium oxide layer has pores, and it is into these pores that the polyelectrolyte migrates. Interaction between the zirconium and the polyelectrolyte takes place. When the pH is then increased, the polymer swells due to ionisation, and the pores of the zirconium membrane fill. Hence, due to the swelling of the polymer molecules, the membrane pore size decreases, and due to the increase in charge density these ion-exchange membranes will exhibit a higher rejection at pH 7.00 than at pH 2.00.

1.8.2. Results

In order to evaluate the ability of the various polyelectrolytes to form dynamic membranes, measurements of flux and rejection were made after 30 minutes of formation (pH 2.50) and after 24 hours after the start of formation (pH 7.00).

The results re given in Tables 3 to 13.

(i) Poly(acrylic acid)—Table 3.

TABLE 3

| POLY(ACRYLIC ACID) | | | | |
|---|---|---|---|---|
| Polymer | pH | Time(h) | Rejection(%) | Flux $(1.m^{-2}.d^{-1})$ |
| PAA-1 | 2,5 | 0,5 | 32,4 | 5 400 |
| | 7,0 | 24,0 | 82,8 | 1 540 |
| PAA-1 | 2,5 | 0,5 | 39,1 | 4 440 |
| | 7,0 | 24,0 | 86,3 | 1 360 |
| PAA-2 | 2,5 | 0,5 | 32,3 | 3 900 |
| | 7,0 | 24,0 | 89,2 | 2 100 |
| PAA-2 | 2,5 | 0,5 | 13,7 | 12 320 |
| | 7,0 | 24,0 | 73,1 | 2 800 |

(ii) Poly(methacrylic acid)—Table 4.

TABLE 4

| POLY(METHACRYLIC ACID) | | | | |
|---|---|---|---|---|
| Polymer | pH | Time (h) | Rejection(%) | Flux $(1m.^{-2}d^{-1})$ |
| PMAA 3 | 2,5 | 0,5 | 32,6 | 5 500 |
| | 7,0 | 24,0 | 50,5 | 4 800 |
| PMAA 3 | 2,5 | 0,5 | 34,9 | 5 980 |
| | 7,0 | 24,0 | 52,3 | 5 070 |
| PMAA 1 | 2,5 | 0,5 | 21,1 | 7 340 |
| | 7,0 | 24,0 | 59,7 | 7 060 |
| PMAA 1 | 2,5 | 0,5 | 22,7 | 8 430 |
| | 7,0 | 24,0 | 58,6 | 7 790 |
| PMAA 4 | 2,5 | 0,5 | 34,2 | 10 150 |
| | 7,0 | 24,0 | 71,6 | 9 060 |
| PMAA 4 | 2,5 | 0,5 | 32,3 | 12 140 |

TABLE 4-continued

| POLY(METHACRYLIC ACID) | | | | |
|---|---|---|---|---|
| Polymer | pH | Time (h) | Rejection(%) | Flux $(1m.^{-2}d^{-1})$ |
| | 7,0 | 24,0 | 71,6 | 9 780 |

As with the poly(acrylic acid), there is definite evidence of the formation of dynamic membranes. There is, for the most part, not as marked an increase in rejection as with poly(acrylic acid), yet the rejection increases while the flux decreases, albeit less so than with poly(acrylic acid).

(iii) Poly(itaconic acid)—Table 5.

TABLE 5

| POLY(ITACONIC ACID) | | | | |
|---|---|---|---|---|
| Polymer Nr | pH | Time(h) | Rejection(%) | Flux $(1m^{-2}.d^{-1})$ |
| PIA 2 | 2,5 | 0,5 | 33,3 | 10 050 |
| | 7,0 | 24,0 | 58,3 | 8 520 |
| PIA 2 | 2,5 | 0,5 | 39,8 | 9 878 |
| | 7,0 | 24,0 | 56,1 | 10 500 |
| PIA 2 | 2,5 | 0,5 | 47,4 | 9 510 |
| | 7,0 | 24,0 | 55,7 | 9 330 |
| PIA 3 | 2,5 | 0,5 | 33,5 | 11 780 |
| | 7,0 | 24,0 | 54,7 | 10 510 |

As in the previous two cases (Tables 3 and 4), there is a definite increase in rejection, coupled with a decrease in flux, except with one membrane. These polymers do, therefore, form composite membranes with hydrous zirconium (IV) oxide.

The small decline in flux can probably be ascribed to the fact that this polymer would have, theoretically, a much higher charge density at neutral pH than poly(acrylic acid), since it has two ionizable groups per monomer. This higher charge density would result in a higher degree of hydrophilicity, and thus an increased water flux. This high hydrophilicity would be offset by swelling of the polymer due to charge repulsion and the resultant decrease in pore size.

(iv) Poly(vinyl sulfonic acid)—Table 6.

TABLE 6

| POLY(VINYL SULFONIC ACID) | | | | |
|---|---|---|---|---|
| Polymer | pH | Time(h) | Rejection(%) | Flux$(1.m^{-2}.d^{-1})$ |
| PVSA 1 | 2,5 | 0,5 | 29,7 | 15 950 |
| | 7,0 | 24,0 | 48,2 | 7 790 |
| PVSA 1 | 2,5 | 0,5 | 15,5 | 36 240 |
| | 7,0 | 24,0 | 47,0 | 8 520 |
| PVSA 1 | 2,5 | 0,5 | 26,5 | 17 580 |
| | 7,0 | 24,0 | 46,6 | 8 335 |
| PVSA 4 | 2,5 | 0,5 | 31,7 | 18 480 |
| | 7,0 | 24,0 | 38,4 | 11 415 |
| PVSA 4 | 2,5 | 0,5 | 26,9 | 24 640 |
| | 7,0 | 24,0 | 40,1 | 13 050 |
| PVSA 4 | 2,5 | 0,5 | 24,5 | 21 380 |
| | 7,0 | 24,0 | 40,4 | 12 230 |

Although the rejection did not reach a high final value for any of these membranes, there was an increase in rejection ranging from about 10% to 32%, from 30 minutes after the start of formation and 24 hours after the start of formation. Simultaneously, the flux decreased, in all cases, quite substantially. This indicates the formation of a composite dynamically formed hydrous zirconium(IV)-poly(vinyl sulfonic acid) membrane.

(v) Poly(2-chloro acrylic acid)—Table 7.

TABLE 7

POLY(2-CHLORO ACRYLIC ACID)

| Polymer nr | pH | Time(h) | Rejection(%) | Flux(l.m$^{-2}$.d$^{-1}$) |
|---|---|---|---|---|
| PCIAA 1 | 2,5 | 0,5 | 45,2 | 12 050 |
|  | 7,0 | 24,0 | 61,2 | 9 060 |
| PCIAA 1 | 2,5 | 0,5 | 45,4 | 13 230 |
|  | 7,0 | 24,0 | 63,8 | 10 420 |
| PCIAA 1 | 2,5 | 0,5 | 40,0 | 12 600 |
|  | 7,0 | 24,0 | 63,8 | 9 240 |
| PCIAA 2 | 2,5 | 0,5 | 38,9 | 7 610 |
|  | 7,0 | 24,0 | 41,9 | 7 970 |
| PCIAA 2 | 2,5 | 0,5 | 39,8 | 8 700 |
|  | 7,0 | 24,0 | 41,5 | 8 880 |
| PCIAA 3 | 2,5 | 0,5 | 45,8 | 9 970 |
|  | 7,0 | 24,0 | 48,3 | 11 420 |
| PCIAA 3 | 2,5 | 0,5 | 40,6 | 12 320 |
|  | 7,0 | 24,0 | 47,9 | 11 960 |

The rejection values indicates the formation of a composite membrane.

(vi) Poly(acrylic acid-co-methacrylic acid)—Table 8.

TABLE 8

POLY(ACRYLIC ACID-CO-METHACRYLIC ACID)

| Polymer | pH | Time(h) | Rejection(%) | Flux(l.m$^{-2}$.d$^{-1}$) |
|---|---|---|---|---|
| PAA/MAA 1 | 2,5 | 0,5 | 45,3 | 7 520 |
|  | 7,0 | 24,0 | 60,1 | 6 430 |
| PAA/MAA 1 | 2,5 | 0,5 | 40,8 | 8 880 |
|  | 7,0 | 24,0 | 53,4 | 7 970 |
| PAA/MAA 1 | 2,5 | 0,5 | 50,0 | 10 150 |
|  | 7,0 | 24,0 | 60,9 | 9 785 |
| PAA/MAA 1 | 2,5 | 0,5 | 48,2 | 7 610 |
|  | 7,0 | 24,0 | 66,6 | 8 515 |
| PAA/MAA 1 | 2,5 | 0,5 | 49,2 | 8 790 |
|  | 7,0 | 24,0 | 68,8 | 9 970 |
| PAA/MAA 1 | 2,5 | 0,5 | 63,6 | 8 790 |
|  | 7,0 | 24,0 | 68,1 | 9 970 |

Rejection values clearly indicate the formation of composite hydrous zirconium(IV) oxide-poly (acrylic acid-co-methacrylic acid) membranes.

(vii) Poly(acrylic acid-co-itaconic acid)—Table 9.

TABLE 9

POLY(ACRYLIC ACID-CO-ITACONIC ACID)

| Polymer | pH | Time(h) | Rejection(%) | Flux(l.m$^{-2}$-d$^{-1}$) |
|---|---|---|---|---|
| PAA/IA 3 | 0,5 | 0,5 | 34,3 | 8 150 |
|  | 7,0 | 24,0 | 78,0 | 5 980 |
| PAA/IA 3 | 0,5 | 0,5 | 4,8 | 25 000 |
|  | 7,0 | 24,0 | 75,6 | 7 880 |
| PAA/IA 2 | 0,5 | 0,5 | 14,2 | 6 250 |
|  | 7,0 | 24,0 | 77,8 | 4 350 |
| PAA/IA 2 | 0,5 | 0,5 | 14,1 | 6 885 |
|  | 7,0 | 24,0 | 75,3 | 4 440 |
| PAA/IA 2 | 0,5 | 0,5 | 16,1 | 4 900 |
|  | 7,0 | 24,0 | 73,1 | 3 625 |

For both the polymers evaluated, quite sharp differences in rejection values, ranging from 44% to 71% over the pH range of 2.50 to 7.00 and the time range of 0.5 to 24.0 hours, and declining flux values over the same pH and time ranges clearly demonstrate the formation of dynamic hydrous zirconium (IV) oxide-poly (acrylic acid-co-itaconic acid) membranes.

(viii) Poly(acrylic acid-co-2-chloro acrylic acid)—Table 10.

TABLE 10

POLY(ACRYLIC ACID-CO-2-CHLORO ACRYLIC ACID)

| Polymer | pH | Time(h) | Rejection(%) | Flux(l.m$^{-2}$.d$^{-1}$) |
|---|---|---|---|---|
| PAA/CIAA 1 | 2,5 | 0,5 | 46,4 | 5 580 |
|  | 7,0 | 24,0 | 62,0 | 5 440 |

TABLE 10-continued

POLY(ACRYLIC ACID-CO-2-CHLORO ACRYLIC ACID)

| Polymer | pH | Time(h) | Rejection(%) | Flux(l.m$^{-2}$.d$^{-1}$) |
|---|---|---|---|---|
| PAA/CIAA 1 | 2,5 | 0,5 | 48,1 | 6 430 |
|  | 7,0 | 24,0 | 65,2 | 5 980 |
| PAA/CIAA 1 | 2,5 | 0,5 | 44,5 | 6 250 |
|  | 7,0 | 24,0 | 65,2 | 5 890 |
| PAA/CIAA 2 | 2,5 | 0,5 | 55,9 | 9 060 |
|  | 7,0 | 24,0 | 73,5 | 7 250 |
| PAA/CIAA 2 | 2,5 | 0,5 | 47,9 | 12 685 |
|  | 7,0 | 24,0 | 75,8 | 8 430 |

Rejection values show an increase from the start of formation to 24 hours after the start of formation, ranging from 15% and 28%. A decrease in flux is evident throughout. Dynamic membranes are therefore formed.

(ix) Poly(methacrylic acid-co-2-chloro acrylic acid)—Table 11.

TABLE 11

POLY(METHACRYLIC ACID-CO-2-CHLORO ACRYLIC ACID)

| Polymer | pH | Time(h) | Rejection(%) | Flux (l.m$^{-2}$.d$^{-1}$) |
|---|---|---|---|---|
| PMAA/CIAA 1 | 2,5 | 0,5 | 51,1 | 13 050 |
|  | 7,0 | 24,0 | 58,1 | 12 500 |
| PMAA/CIAA 1 | 2,5 | 0,5 | 54,8 | 14 500 |
|  | 7,0 | 24,0 | 57,2 | 13 410 |
| PMAA/CIAA 1 | 2,5 | 0,5 | 34,4 | 20 115 |
|  | 7,0 | 24,0 | 53,9 | 13 230 |

Although the final rejection values for these membranes are low, compared with poly(acrylic acid), rejection and flux figures indicate the formation of dynamic membranes.

(x) Poly(acrylic acid-co-vinyl acetate)—Table 12.

TABLE 12

POLY(ACRYLIC ACID-CO-VINYL ACETATE)

| Polymer | pH | Time(h) | Rejection(%) | Flux(l.m$^2$ · d$^{-1}$) |
|---|---|---|---|---|
| PAA/VAC-1 | 2,5 | 0,5 | 55,9 | 3 990 |
|  | 7,0 | 24,0 | 88,2 | 2 720 |
| PAA/VAC-1 | 2,5 | 0,5 | 60,2 | 4 800 |
|  | 7,0 | 24,0 | 92,8 | 3 800 |
| PAA/VAC-1 | 2,5 | 0,5 | 56,6 | 4 890 |
|  | 7,0 | 24,0 | 93,2 | 3 900 |

The large increases in rejection, ranging from 32% to 36% over the measurement period, the high final rejection figures, and the flux decline clearly demonstrate the formation of dynamic membranes.

(xi) Poly(acrylic-co-methacrylic-co-2-chloro acrylic acid)—Table 13.

TABLE 13

POLY(ACRYLIC-CO-METHACRYLIC-CO-2-CHLORO ACRYLIC ACID)

| Polymer | pH | Time(h) | Rejection(%) | Flux(1 · m$^{-2}$ · d$^{-1}$) |
|---|---|---|---|---|
| TERP-1 | 2,5 | 0,5 | 49,8 | 12 870 |
|  | 7,0 | 24,0 | 61,7 | 11 420 |
| TERP-1 | 2,5 | 0,5 | 40,1 | 17 400 |
|  | 7,0 | 24,0 | 64,0 | 12 140 |
| TERP-1 | 2,5 | 0,5 | 40,1 | 14 130 |
|  | 7,0 | 24,0 | 63,4 | 11 325 |

(xii) Poly(acrylic acid-co-vinyl alcohol)

The final rejection figures for these copolymer membranes are in excess of 99%, and are given in Table 14. These experiments are described also in greater detail in Example 3.

TABLE 14

| POLY-MER | PRES-SURE | RUN TIME | | | |
|---|---|---|---|---|---|
| | | 1h | 18h | 24h | 70h |
| PAA/VOH-1.1 | 6MPa | 99,4%<br>(2250)<br>[12,8] | 99,4%<br>(2310)<br>[13,2] | 99,6<br>(2240)<br>[19,2] | 99,6%<br>(2240)<br>[16,4] |
| PAA/VOH-1.2 | 6MPa | 99,7%<br>(2520)<br>[28,8] | 99,6%<br>(2550)<br>[21,9] | 99,7%<br>(2540)<br>[29,0] | 99,7%<br>(2750)<br>[31,4] |
| PAA/VOH-1.1 | 1MPa* | 93,9%<br>(635)<br>[15,1] | | | |
| PAA/VOH-1.2 | 1MPa* | 93,6%<br>(660)<br>[15,1] | | | |

LEGEND
PAA/VOH = Poly(acrylic acid-co-vinyl alcohol)
-1.1 = Polymer 1, membrane 1
-1.2 = Polymer 1, membrane 2
Figures quoted in the above Table are:
Figures without brackets: Salt rejection (NaNO$_3$,%)
Figures in round brackets (): Flux (liters per square meter/day
Figures in square brackets []: Figure of merit ($\times$ 10 000).
Results are obtained at a temperature of 35° C. and a feed salt concentration of 2000 ppm.
*Figures obtained after 1h at 1MPa, following 144h of operation at 6MPa.

(xiii) Poly(2-chloro acrylic acid-co-vinyl acetate) and Poly(2-hydroxy acrylic acid-co-vinyl acetate)

The final rejection figures for these membranes are given in Table 15.

TABLE 15

| Polymer | Time(h) | |
|---|---|---|
| | 1 | 48 |
| PCl A/VAC-1 | 76,4<br>(5175) | 77,7<br>(4980) |
| PClAA/VAC-2 | 76,7<br>(4855) | 77,8<br>(4730) |
| POHAA/VAC-1 | 90,7<br>(6470) | 90,5<br>(6110) |
| POHAA/VAC-2 | 88,8<br>(6110) | 89,7<br>(5725) |

LEGEND:
PClAA/VAC = Poly(2.chloro acrylic acid-co-vinyl acetate)
POHAA/VAC = Poly(2-hydroxy acrylic acid-co-vinyl acetate)
-1 = membrane 1
-2 = membrane 2
The unbracketed figures give the salt rejection(%, 2000 ppm NaNO$_3$).
The figures in round brackets, ( ), give the flux in liters per square meter per day.
Test conditions pressure 6MPa, flow rate 6 m/s, temperature 35° C.

(xiv) Poly(acrylic acid-co-vinyl alcohol-co-vinyl acetate)

The final rejection figures for these membranes are in excess of 97% and are given in Table 16.

TABLE 16

| Polymer | Pressure | Time(h) | |
|---|---|---|---|
| | | 1 | 48 |
| PAA/VOH/VAC-1.1 | 6MPa | 98,3<br>(1700) | 98,0<br>(2210) |
| PAA/VOH/VAC-1.1 | 6MPa | 87,8<br>(1569) | 97,7<br>(1975) |
| PAA/VOH/VAC-1.1 | 1MPa | 92,2<br>(480) | |
| PAA/VOH/VAC-1-2 | 1MPa | 90,3<br>(370) | |

LEGEND:
PAA/VOH/VAC = Poly(acrylic acid-co-vinyl alcohol-co-vinyl acetate)
-1.1 = polymer 1, membrane 1
-1.2 = polymer 1, membrane 2
Figures quoted are
Figures without brackets: Salt rejection (%, 2000 ppm NaNO$_3$)
Figures with round brackets: ( ) Flux (liters per square meter per day)

Results were obtained at a temperature of 35° C., a feed pressure of 6 MPa and a flow rate of 6 m/s.

The average increase in rejection of about 20% in rejection over the measurement period, and the decrease in flux over the same period, show the formation of dynamic membranes.

Hence, all of the following polymers form dynamically formed composite membranes with hydrous zirconium (iv) oxide sub-layers:

Poly(acrylic acid)
Poly(methacrylic acid)
Poly(2-chloro acrylic acid)
Poly(vinyl sulfonic acid)
Poly(itaconic acid)
Poly(acrylic acid-co-methacrylic acid)
Poly(acrylic acid-co-2-chloro acrylic acid)
Poly(acrylic acid-co-itaconic acid)
Poly(acrylic acid-co-vinyl acetate)
Poly(methacrylic acid-co-2-chloro acrylic acid)
Poly(acrylic-co-methacrylic-co-2-chloro acrylic acid).

1.8.3 Membrane Formation—The Effect of pH on Rejection and Flux.

A pH value of 3.5 was used as a comparative value since at this pH a membrane was formed in all cases, ie with all the polymers used. $R_f$ is defined as $R_{3.5}/R_m$ where $R_{3.5}$ is the rejection of pH 3.5 and $R_m$ is the maximum rejection attained by the membrane.

Plots of rejection versus pH, and flux versus pH, during membrane formation are given in FIGS. 9 to 29.

1.9 Membrane Performance.

Membranes were evaluated in terms of Lonsdale's figures of merit, in the following cases:
Membrane performance in terms of time, as an indication of membrane stability.
Membrane performance as a function of pH, 18 hours after the completion of formation.

1.9.1 Membrane Stability

These are set out in Tables 17 and 18. Membrane stability is a function of the strength of the hydrous zirconium (IV) oxide-polyelectrolyte bond. Hence, the following points can be noted:

5- and 6-membered rings are the most stable in chelate ring formations;
polymers containing methyl groups and chloro groups are less stable than the poly(acrylic acid) membranes, and this is supported by the results of Table 18.

TABLE 17

| | MEMBRANE STABILITY | | | | | |
|---|---|---|---|---|---|---|
| | no. | | | | | |
| | 1 | | 2 | | 3 | |
| | Time(h) | | | | | |
| Membrane | 0 | 18 | 0 | 18 | 0 | 18 |
| Zr-PAA-1 | 0,15 | 0,26 | 0,12 | 0,31 | 0,17 | 0,32 |
| Zr-PAA-2 | 0,39 | 0,60 | 0,58 | 0,27 | 0,21 | 0,69 |
| Zr-PMAA-1 | 0,45 | 0,37 | 0,53 | 0,39 | 0,49 | 0,39 |
| Zr-PMAA-3 | 0,17 | 0,17 | 0,20 | 0,16 | 0,18 | 0,17 |
| Zr-PMAA-4 | 0,24 | 0,85 | 1,22 | 0,85 | 1,15 | 0,87 |
| Zr-PClAA-3 | 0,44 | 0,38 | 0,49 | 0,39 | — | — |
| Zr-PClAA-1 | 0,45 | 0,37 | 0,56 | 0,49 | 0,48 | 0,48 |
| Zr-PIA-1 | 0,38 | 0,42 | 0,52 | 0,47 | 0,37 | 0,41 |
| Zr-PIA-2 | 0,49 | 0,45 | 0,49 | 0,49 | 0,52 | 0,45 |
| Zr-PVSA-1 | 0,21 | 0,26 | 0,24 | 0,31 | 0,22 | 0,29 |
| Zr-PAA/MAA-1a | 0,47 | 0,43 | — | — | — | — |
| Zr-PAA/MAA-1b | 0,62 | 0,54 | — | — | — | — |
| Zr-PAA/MAA-1c | 0,76 | 0,61 | 1,12 | 0,89 | 1,05 | 0,83 |
| Zr-PAA/ClAA-1 | 0,35 | 0,31 | 0,51 | 0,40 | 0,46 | 0,40 |
| Zr-PAA/ClAA-2 | 0,82 | 0,70 | 1,07 | 1,13 | 1,07 | 0,92 |
| Zr-PAA/IA-2 | 0,24 | 0,48 | 0,25 | 0,54 | | |
| Zr-PAA/IA-3 | 0,83 | 0,85 | 0,71 | 0,74 | | |

TABLE 17-continued

| | MEMBRANE STABILITY | | | | | |
|---|---|---|---|---|---|---|
| | no. | | | | | |
| | 1 | | 2 | | 3 | |
| | Time(h) | | | | | |
| Membrane | 0 | 18 | 0 | 18 | 0 | 18 |
| Zr-PMAA/CIAA-1 | 0,78 | 0,61 | 0,62 | 0,63 | 0,60 | 0,54 |
| Zr-TERP-1 | 0,77 | 0,65 | 0,86 | 0,76 | 0,78 | 0,69 |

TABLE 18

RELATIVE MEMBRANE STABILITIES

| Membrane | FOM | Stability |
|---|---|---|
| Zr-PAA | +0,915 | + |
| Zr-PVSA | +0,283 | + |
| Zr-PAA/IA | +0,042 | + |
| Zr-PIA | −0,017 | +/− |
| Zr-PMAA/CIAA | −0,101 | − |
| Zr-PMAA | −0,107 | − |
| Zr-PAA/CIAA | −0,108 | − |
| Zr-PCIAA | −0,129 | − |
| Zr-TERP | −0,129 | − |
| Zr-PAA/MAA | −0,165 | − |
| Zr-PAA/VAC | −0,288 | − |

1.9.2 The Effect of pH on Membrane Performance

After 18 hours of testing of the membranes, the pH was adjusted to 8, and conditions were allowed to stabilize, and the flux and rejection values then taken. The pH was then adjusted to pH 9, and the above repeated. The time allowed for stabilization of conditions was 0.75 hours. The results are given in Table 19.

TABLE 19

EFFECT OF pH ON MEMBRANE PERFORMANCE

| Polymer | Rejection (%) | | | Flux(l.m$^{-2}$.d$^{-1}$) | | | A$^2$/B (×10$^5$) | | |
|---|---|---|---|---|---|---|---|---|---|
| pH | 7,0 | 8,0 | 9,0 | 7,0 | 8,0 | 9,0 | 7,0 | 8,0 | 9,0 |
| PAA-2.1 | 89,2 | 91,8 | 89,4 | 2080 | 1900 | 1990 | 0,60 | 0,75 | 0,59 |
| PAA-2.2 | 73,1 | 63,2 | 71,9 | 2810 | 2990 | 2170 | 0,27 | 0,18 | 0,87 |
| PAA-2.3 | 90,4 | 93,2 | 90,2 | 2080 | 1810 | 1900 | 0,69 | 0,87 | 0,61 |
| PMAA-4.1 | 71,6 | 77,6 | 75,4 | 9060 | 7790 | 7790 | 0,80 | 0,94 | 0,83 |
| PMAA-4.3 | 71,8 | 77,1 | 75,2 | 9780 | 8335 | 8520 | 0,87 | 0,98 | 0,90 |
| PCIAA-3.1 | 48,3 | 53,4 | 58,7 | 11420 | 10870 | 9870 | 0,38 | 0,44 | 0,49 |
| PCIAA-3.3 | 47,9 | 52,1 | 57,4 | 11960 | 11660 | 10510 | 0,39 | 0,45 | 0,50 |
| PCIAA-2.1 | 41,9 | 52,1 | 54,3 | 7970 | 7520 | 7430 | 0,21 | 0,29 | 0,31 |
| PCIAA-2.2 | 41,5 | 51,8 | 54,0 | 8880 | 8150 | 8070 | 0,22 | 0,31 | 0,34 |
| PCIAA-2.3 | 40,2 | 50,8 | S3,0 | 8340 | 7700 | 7520 | 0,20 | 0,28 | 0,30 |
| PCIAA-1.1 | 55,1 | 61,7 | 63,2 | 8430 | 8060 | 7790 | 0,37 | 0,46 | 0,48 |
| PCIAA-1.2 | 59,7 | 63,6 | 65,0 | 9330 | 8770 | 8600 | 0,49 | 0,56 | 0,57 |
| PCIAA-1.3 | 60,6 | 64,1 | 65,6 | 8880 | 8520 | 8310 | 0,48 | 0,54 | 0,56 |
| PVSA-4.1 | 39,4 | 44,0 | 45,2 | 11415 | 11230 | 12140 | 0,26 | 0,31 | 0,35 |
| PVSA-4.2 | 40,1 | 43,7 | 44,7 | 13050 | 13050 | 13050 | 0,31 | 0,36 | 0,37 |
| PVSA-4.3 | 40,4 | 43,7 | 44,7 | 12330 | 12140 | 13050 | 0,29 | 0,33 | 0,37 |

1.9.3 Membrane Performance in terms of Flux, Rejection and Figures of Merit These were done on seven membranes, and the results are set out in Table 20.

TABLE 20

FLUX, REJECTION AND FIGURES OF MERIT

| Membrane | Rejection(%) | Flux(l/m$^2$/d) | A$^2$/B (×10$^5$) |
|---|---|---|---|
| Zr-PAA-2.1 | 89,2 | 2 080 | 0,60 |
| PMAA-4.1 | 71,6 | 9 060 | 0,80 |
| Zr-PMAA/IA | 78,0 | 5 980 | 0,74 |
| Zr-PAA/MAA-1.4 | 60,9 | 9 780 | 0,54 |
| Zr-TERP-1.2 | 64,0 | 12 140 | 0,76 |
| Zr-PMAA/CIAA-1.1 | 58,2 | 12 500 | 0,61 |
| Zr-PAA/CIAA-2.2 | 73,5 | 7 250 | 0,75 |

EXAMPLE 2

2.1 Equipment

2.1.1 2,5-furandione (maleic anhydride) Purification Equipment

Figure 6:
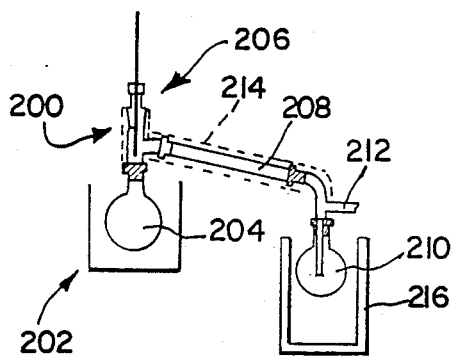

The maleic anhydride monomer is stored in a desiccator and freshly vacuum-sublimed/distilled before use, in an apparatus as indicated in FIG. 6.

Referring to FIG. 6, reference numeral 200 generally indicates apparatus for vacuum-subliming maleic anhydride monomer. The apparatus 200 includes a heating bath 202, in which is located a round-bottomed flask 204 containing to the monomer. To the round-bottomed flask 204 is fitted a reflux tube 206, fitted with a condenser 208, the condenser discharging into a round-bottomed flask 210. The condenser 208 is also connected to vacuum apparatus (not shown) via a connection 212. Heating tape 214 is provided around the condenser 208. The flask 210 is located in a liquid nitrogen trap 216.

The monomer is a slid, melting at 52° C. and boiling at 200° C. under ambient pressure condition. The flask 204 is maintained at 100° C. and 200 mm Hg vacuum, and the distillate/sublimate is collected at liquid nitrogen temperature to prevent contamination of the vacuum system. Purity was checked by melting point determination by differential scanning calorimetry techniques.

2.1.2 Other Monomers

Figure 7:
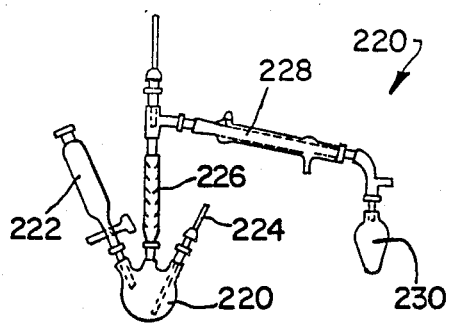

The co-monomers used were all liquid at ambient temperature, and were purified immediately before use, by vacuum distillation, in the apparatus indicated in FIG. 7.

Referring to FIG. 7, reference numeral 220 generally indicates vacuum distillation equipment. The equipment 220 comprises a flask 220 into which protrudes a dropping funnel 222, a capillary tube 224 and a vigraux column 226. To the vigraux column 226 there is connected a condenser 228, and a flask 230 is connected to the discharge side of the condenser.

Dry argon was bled through the capillary tube 224 to prevent 'bumping' effects and carry-over of stabilizers present in the monomer. The following monomers were purified with the apparatus of FIG. 7: 2-propenoic acid (acrylic acid); methylene butanedioic acid (itaconic acid); ethenyl acetate (vinyl acetate); 2,3,-epoxy propyl methacrylate (glycidyl methacrylate); ethene sulphonic acid (Na+ salt) (sodium vinyl sulphonate).

2.1.3 Polymerization or Synthesis Equipment

The same equipment as indicated in FIGS. 1 and 2 was used.

2.2 Experimental Techniques

A vacuum freeze/thaw technique was used in conjunction with an inert gas blanket, since oxygen had to be excluded from the polymerization system for consistent and reproducible results. This technique has the advantage of requiring only a modest vacuum of about 2 mm Hg pressure and results in a low level of residual oxygen in the system.

The general procedure was as follows:

(a) Thoroughly clean the reaction vessel or ampoule 40 with chromic acid mixture, rinse thoroughly, dry at 90° C., and cool it in a desiccator.

(b) Weigh out monomers and solvent directly into the ampoule, add a PTFE-coated magnetic follower and seal with a rubber septum cap.

(c) Enclose the ampoule in a stainless steel gauze sleeve (in case of vacuum implosion), connect gas/vacuum line 10 to the side arm 46 via thick-walled vacuum tubing. Cool the ampoule in an iso-propanol/liquid nitrogen mixture until the monomer and solvent freeze. Add initiator dissolved in a known volume of solvent via the septum cap.

(d) Allow the bath temperature to rise until the mixture just begins to thaw and, while maintaining this temperature, apply vacuum to the ampoule while stirring the mixture.

(e) When evolution of gas has ceased, close the vacuum tap and open the gas tap to allow argon to fill the ampoule from the gas line (previously flushed to remove air). Allow the argon gas to saturate the monomer/solvent mixture — this takes about 15 minutes.

(f) Repeat the alternate application of vacuum and gas flush for a further five cycles, then pressurize the ampoule with argon and close off the gas line and the ampoule side-arm tap.

(g) Remove the ampoule and contents from the freezing mixture, place in a stirred, thermostatically controlled, liquid bath at the required temperature for a sufficient time for polymerization to be completed.

For homopolymerization of 2,5-furandione slight modifications to the equipment and techniques were required, as follows:

(h) Bulk homopolymerization required the top half of the ampoule to be heated with an electrical heating tape to a temperature of 60° C. to prevent accumulation of sublimed solid monomer.

(i) Solution homopolymerization of 2,5-furandione frequently required successive additions of initiator. This was accomplished by the transfer, via the rubber septum cap, of a previously degassed stock solution of initiator, stored at 4° C., into the polymerization system. Where high-boiling-point solvents were used, a water-cooled reflux condenser was fitted to the ampoule with the rubber septum cap fitted to the top of the condenser.

All solvents used in the polymerizations were of A.R. grade and were freshly redistilled before use. Solvents for precipitation were of A.R. grade, and were used without further purification.

2.3 EXPERIMENTAL DETAILS 2.3.1 Homopolymerization of 2,5-furandione (maleic anhydride)

(i) Method A—solution polymerization.

The reaction mixture consisted of 2,5-furandione (41.51 g; 0.423 mole); chlorobenzene (150 ml) in ampoule 1. AIBN (3.34 g; 2.03 x $10^{-2}$ mole); clorobenzene (50 ml) in ampoule 2.

Both ampoules were vacuum-degassed as described in 2.2 above. Ampoule 1 was equipped with a reflux condenser and was heated to 381° F±1° K. in a silicone oil bath. While the contents were stirred, 10 ml of the initiator solution in ampoule 2 was transferred to ampoule 1 by means of a long cannula, by piercing the rubber septum of each ampoule and applying a partial vacuum to ampoule 1 while the inert gas pressure in ampoule 2 was maintained. The flow of initiator solution was stopped when required by equalizing the pressures. The remaining 40 ml of initiator solution was added in four 10 aliquots at 30-minute intervals. The polymerization was terminated after 4 hours by cooling the reaction mixture to ambient temperature. The tarry brown polymer formed was separated, washed with hot chlorobenzene and dried under vacuum. The polymer was purified by dissolving it in an excess of 2N potassium hydroxide and then precipitating it in methanol. The polymer salt was dissolved in water, reprecipitated, in methanol and dried to constant mass at 333° K. under a vacuum of 2 mm Hg. The molecular mass of this polymer was less than 2000.

Yield: 2.93 g (3.86%) of brown waxy polymer. Polymer reference (ii) Method B — bulk polymerization.

The reaction mixture consisted of 2.5 furandione (10.86 g; 0.11 mole) and benzoyl peroxide (0.56 g; 2.3 $\times 10^{-3}$ mole). The 2,5-furandione was placed in an ampoule and heated to melting point (approximately 325° K) in an oil bath, and degassed as described in 2.2 above. The benzoyl peroxide was dried under vacuum and held in a separate container. Approximately 20% (0.118 g; 0.49 $\times 10^{-3}$ mole) of the benzoyl peroxide was added to the ampoule and the temperature was raised to 363° K±1° K with stirring. Four further additions of benzoyl peroxide were made at 30-minute intervals, as follows:

Addition (2) 0.099 g; 0.41 $\times 10^{-3}$ mole
Addition (3) 0.115 g; 0.48 $\times 10^{-3}$ mole
Addition (4) 0.114 g; 0.47 $\times 10^{-3}$ mole
Addition (5) 0.114 g; 0.47 $\times 10^{-3}$ mole.

The polymerization was terminated after five hours by cooling the reaction mixture and pouring it into 100 ml of methyl benzene. The dark tarry residue was washed with five 20 ml aliquots of hot methyl benzene and dried under vacuum at 333° K. The product was purified by dissolving it in 1M potassium hydroxide and precipitating in methanol. The reprecipitation was repeated once. The polymer molecular mass was less than 2000.

Yield: 0.41 g (2.7%) of a dark brown semi-solid. Polymer reference MA-2.

(iii) Various Homopolymerization Methods.

Further attempts, based on melt and solution techniques, were made to homopolymerize 2,5-furandione-brief details are given below:

| | |
|---|---|
| (a) 2,5-furandione | 47,89 g (0.488 mole) |

| -continued | |
|---|---|
| Acetic anhydride | 0,5 ml |
| 1,4 dioxane | 100 ml |
| AIBN | 2,54 (1,55 × 10⁻² mole) |

The AIBN was added in five increments at 30-minute intervals. Solutions temperature was 363° K±1°K; polymerization time was 5.25 hours.

Yield: 0.9 g (1.9%) dark brown waxy polymer.
Reference MA-3.

(b) 2,5-furandione; 48.95 (0.50 mole).
Benzoyl peroxide; 2.533 g (1,05×10⁻² mole).

Benzoyl peroxide was added in five equal increments at 30-minute intervals. Melt temperature was 398° K±1°K, polymerization time was 4 hours. Polymer MA—3 had a molecular mass below 2000 as determined by GPC techniques.

Yield: Trace only.

2.3.2 Alternating copolymerization of 2,5-furandione and ethenyl acetate (maleic anhydride/vinyl acetate)

Four reaction mixtures were made up as follows:

(1) Polymer reference MA/VA-1: 2,5-furandione (29.51 g; 0.300 mole); ethenyl acetate (26.39 g; 0.3000 mole); AIBN (0.571 g; 3.5×10⁻³ mole); 1,4-dioxane (100 ml). (Initiator concentration 1.17 mole %).

(2) Polymer Reference MA/VA-2: 2,5-furandione (15.38 g; 0.156 mole); ethenyl acetate (13.3 g; 0.136 mole); AIBN (0.14 g; 0.85×10⁻³ mole); 1,4-dioxane (50 ml). (Initiator concentration 0.625 mole %).

(3) Polymer REference MA/VA-3: 2,5-furandione (15.5 g; 0.158 mole); ethenyl acetate (13.25 g; 0.153 mole); AIBN (0.081 g; 0.48×10⁻³ mole); 1,4-diozane (50 ml). (Initiator concentration 0.320 mole %).

(4) Polymer Reference MA/VA-4; 2,5-furandione (15.6 g; 0.159 mole); ethenyl acetate (13.1 g; 0.152 mole); AIBN (0.031 g; 0.19×10⁻³ mole). (Initiator concentration 0.125 mole %).

(NOTE: Initiator concentrations are expressed as mole percentages of the effective monomer concentration).

The reaction mixtures were placed in ampoules and degassed as described in 2.2 above. The ampoules were heated to 333° K±1° K with stirring and maintained at this temperature for 24 hours. Mixtures (1) and (2) showed evidence of exothermal behavior in the first 15 minutes of reaction and the ampoules were cooled to try to control the temperature of the contents. Polymer became visible in the mixture as a gelatinous precipitate within 15 minutes and after successively longer times in the other mixtures. The polymerizations were terminated after 24 hours by pouring the reaction mixtures into methyl benzene to precipitate the polymers. The polymers were washed three times with hot methyl benzene and dried to constant weight of 333° K under a vacuum of 2 mm Hg. The polymers were purified by dissolving them in an excess of cold 2N KOH and precipitating them in methanol. The precipitated polymers were filtered, washed with methanol and dried. The polymers were then dissolved in water and precipitated in methanol — this last step was repeated once. The polymers were finally dried to constant weight at 333° K under a vacuum of 2 mm Hg.

Yield: (1) MA/VA-1 62.6 g or 93.9%;
(2) MA/VA-2 27.8 g or 92.0%;
(3) MA/VA-3 29.2 g or 85.4%;
(4) MA/VA-4 28.4 g or 84.1%. 5 g samples of each MA/VA copolymer were hydrolysed to the corresponding alcohols. The reaction mixtures were as follows: Copolymer (5.0 g; 0.027 mole), potassium hydroxide A.R. (5.6 g; 0.100 mole) de-ionized water (40 ml). The potassium hydroxide was dissolved carefully in the water and the copolymers added with stirring. The mixtures were stirred and heated to reflux temperatures under a water-cooled condenser, the flask and condenser being purged slowly with pure nitrogen to reduce oxidative degradation. After 12 hours under reflux, the mixtures were cooled and the polymers precipitated in methanol, filtered, washed and dried. The polymers were purified by dissolving them in water and reprecipitating in methanol — this procedure was repeated once. The polymers were dried at 333° K under a vacuum of 2 mm Hg.

Yield: (typical figure) 4.3 g (73.0%).

Reaction:

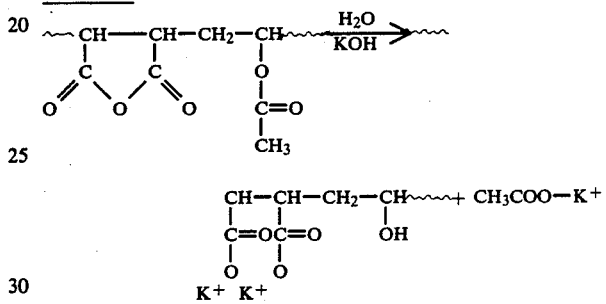

Polymer reference: From MA/VA-1 is produced MA/VOH-1.
From MA/VA-2 is produced MA/VOH-2.
From MA/VA-3 is produced MA/VOH-3.
From MA/VA-4 is produced MA/VOH-4.

2.3.3. Alternating copolymerization of 2,5-furandione and 2-propenoic acid (Maleic anhydride/acrylic acid)

Method A

Two reaction mixtures were made up as follows:

(1) Polymer reference MA/AA-1.
2,5-Furandione (22.07 g; 0.225 mole); 2-propenoic acid (16.05 g; 0.223 mole), benzoyl peroxide (0.206 g; 0.85×10⁻³ mole), 1,4 dioxane (100 ml). (Initiator concentration 0.38 mole % with respect to monomer).

(2) Polymer reference MA/AA-2.
2,5-Furandione (30.27 g; 0.307 mole); 2-propenoic acid (14.71 g; 0.204 mole), benzoyl peroxide (0.25 g; 1.03×10⁻³ mole), 1,4 dioxane (100 ml). (Initiator concentration 0.51 mole % with respect to monomer).

The reaction mixtures were placed in ampoules degassed as described in 2.2 above, and heated to 323° K±1° K with stirring. Exotherms were noted in the first 15 minutes and the ampoules were cooled vigorously to maintain the set temperature. The solution viscosity increased rapidly during this first period. The polymerization was terminated after a total of 18 hours by cooling the reaction mixture and pouring it into methyl benzene. The precipitated polymers were filtered and repeatedly washed with hot methyl benzene and dried to constant weight at 333° K under a vacuum of 2 mm Hg.

Yield: (a) MA/AA-1 73.5 g or 96.0%;
(b) MA/AA-2 33.5 g or 97.5%.

The polymers were further purified by dissolving them in excess 2M KOH and precipitating in methanol. The precipitated polymers were dissolved in de-ionized water and precipitated in methanol twice more and were then dried to constant mass at 333° K under a vacuum of 2 mm Hg.

Method B

Two reaction mixtures were made up as follows:

(3) Polymer reference MA/AA-3.

2,5-Furandione (10.3 g; 0.105 mole); 2-propenoic acid (7.4 g; 0.103 mole), benzoyl peroxide (0.036 g; $0.149 \times 10^{-3}$ mole), 1,4 dioxane (25 ml). (initiator concentration 0.144 mole % with respect to monomer).

(4) Polymer reference MA/AA-4.

2,5-Furandione (10.3 g; 0.105 mole); 2-propenoic acid (7.4 g; 0.103 mole), benzoyl peroxide (0.018 g; $0.743 \times 10^{-4}$ mole), 1,4 dioxane (25 ml). (initiator concentration 0.072 mole % with respect to monomer).

The reaction mixtures placed in ampoules and degassed as described in Section 2.2 above. The mixtures were then heated to 323° K±1° K with stirring and maintained at this temperature for 48 hours. The polymerizations were terminated by cooling and pouring the mixtures into methyl benzene. The polymers precipitated were filtered off, washed repeatedly with hot methyl benzene and dried to constant weight at 333° K under a vacuum of 2 mm Hg.

Yield: (3) MA/AA-3 5.2 g or 29.7%;
(4) MA/AA-4 6.5 g or 37.1%.

The polymers were further purified by neutralization with an excess of 2N potassium hydroxide, precipitation in methanol and filtration. The precipitates were then dissolved in de-ionized water and re-precipitated in methanol — this last procedure was done twice. The polymer was dried to constant mass at 333° K under a vacuum of 2 mm Hg.

2.3.4 Copolymerization of 2,5-furandione and methylene butanedioic acid (maleic anhydride/itaconic acid)

Method A

Two reaction mixtures were made up as follows:

(1) Polymer reference MA/IA-1.

2,5-Furandione (9.96 g; 0.102 mole); methylene butanedioic acid (13.26 g; 0.102 mole), potassium persulphate (0.115 g; $4.25 \times 10^{-4}$ mole), potassium hydrogen sulphite (0.046 g; $4.42 \times 10^{-4}$ mole); de-ionized water (50 ml). (initiator concentration 0.417 mole % with respect to monomer).

(2) Polymer reference MA/IA-3.

2,5-Furandione (14.80 g; 0.151 mole); methylene butanedioic acid (13.26 g; 0.102 mole), potassium persulphate (0.092 g; $3.40 \times 10^{-4}$ mole), potassium hydrogen sulphite (0.040 g; $3.84 \times 10^{-4}$ mole); de-ionized water (50 ml). (Initiator concentration 0.333 mole % with respect to monomer).

The reaction mixtures were placed in ampoules and degassed as described in 2.2 above. The mixtures were then heated to 323° K±1° K with stirring and maintained at this temperature for 24 hours. The polymerizations were terminated by cooling and the polymers were converted to the partial potassium salts by neutralization with an excess of cold 5N KOH. The polymer salts were then precipitated in an excess of methanol, filtered, washed thoroughly with cold methanol and dried. The polymers were further purified by dissolving them in water and precipitating them in methanol — this procedure was repeated once. The polymers were then dried to constant mass at 333° K under a vacuum of 2 mm Hg.

Yield: (1) MA/IA-1 36,1 g or 90,7% (As K+ salt);
(2) MA/IA-3 32,5 g or 80,0% (As K+ salt).

Method B

A reaction mixture was made up as follows:

(3) Polymer reference MA/IA-2.

2,5-Furandione (11.60 g; 0.118 mole); methylene butanedioic acid (13.03 g; 0.100 mole), benzoyl peroxide (0.13 g; $5.37 \times 10^{-4}$ mole); 1,4-dioxane (50 ml).

The reaction mixture was placed in an ampoule, degassed as described in 2.2 above, and heated to, and maintained at, 323° K±1° K with stirring. The polymerization was terminated after 46 hours by cooling the mixture and pouring it into an excess of methyl benzene. The polymer precipitated out and was filtered and washed thoroughly with hot methyl benzene. The polymer was dried to constant mass at 333° K under a vacuum of 2 mm Hg.

Yield: (3) MA/IA-2 9.72 g or 42.6%.

The polymer was further purified by neutralization with an excess of cold 5N KOH and precipitation in methanol. The polymer was thoroughly washed with methanol and dried. The precipitated polymer was dissolved in de-ionized water and re-precipitated in methanol, this last procedure being repeated once. The polymer was then dried to constant mass at 333° K under a vacuum of 2 mm Hg.

Method C

Reaction mixtures were made up as follows:

(4) Polymer reference MA/IA-4.

2,5-Furandione (15.2 g; 0.155 mole); methylene butanedioic acid (19.6 g; 0.151 mole), potassium persulphate (0.070 g; $2.59 \times 10^{-4}$ mole), potassium hydrogen sulphite (0.028 g; $2.69 \times 10^{-4}$ mole); de-ionized water (150 ml). (Initiator concentration 0.178 mole %).

(5) Polymer reference MA/IA-5.

2,5-Furandione (15.3 g; 0.156 mole); methylene butanedioic acid (19.5 g; 0.150 mole), potassium persulphate (0.040 g; $1.48 \times 10^{-4}$ mole), potassium hydrogen sulphite (0.014 g; $1.00 \times 10^{-4}$ mole); de-ionized water (150 ml). (Initiator concentration 0.099 mole %).

The reaction mixtures were placed in ampoules and degassed as described in 2.2 above. The mixtures were then heated to 303° K±1° K and maintained at this temperature. The polymerizations were terminated after 72 hours. The polymers were neutralized by addition of excess 5N KOH and precipitated in methanol. The precipitated polymers were filtered, washed thoroughly with methanol and dried. The polymers were further purified by being dissolved in de-ionized water and precipitated in methanol— this procedure were repeated once. The polymers were then dried to constant mass at 333° K under a vacuum of 2 mm Hg.

Yield: (4) MA/IA-4 29.4 g or 54.1%;
(5) MA/IA-5 42.5 g or 78.7%.

The polymers were sparingly water-soluble, but were not soluble at the 1% level in aqueous 0.5 M Na sodium sulphate solution.

2.3.5 Copolymerization of 2,5-furandione and ethene sulphonic acid (sodium salt)

The ethene sulphonic acid (Na+ salt) was supplied unstabilized as a 30% m/m solution in water and was used as supplied.

Method A (1) Polymer reference MA/VSA-2

A reaction mixture was made up as follows:

2,5-Furandione (10.76 g; 0.110 mole); sodium ethene sulphonate (7.143 g; 0.055 mole), potassium persulphate (0.27 g; $1.00 \times 10^{-3}$ mole). (Initiator concentration 1.82% with respect to monomer).

The reaction mixture was placed in an ampoule and degassed as described in 2.2 above. The ampoule was heated to 330° K±1° K with stirring and maintained at this temperature for 60 hours. The reaction mixture was then cooled, neutralized with 2N sodium hydroxide and the polymer precipitated in acetone. The precipitated polymer, which was an oily liquid, was filtered, washed thoroughly with acetone and dried. It was then purified by being dissolved in water and precipitated in acetone— this procedure was repeated once. The polymer was finally dried to constant mass at 333° K under a vacuum of 2 mm Hg. The polymer had a molecular mass below 2000.

Yield: (1) MA/VSA-1 12.5 g or 90.6%.

Method B

Two reaction mixtures were made up as follows:

(2) Polymer reference MA/VSA-2.

2,5-Furandione (10.150 g; 0.104 mole); sodium ethene sulphonate (6.912 g; 0.053 mole), potassium persulphate (0.083 g; $0.307 \times 10^{-3}$ mole). (Initiator concentration 0.58% with respect to monomer).

(3) Polymer reference MA/VSA-3.

2,5-Furandione (14.78 g; 0.151 mole); sodium ethene sulphonate (14.30 g; 0.110 mole), potassium persulphate (0.050 g; $0.185 \times 10^{-3}$ mole). (Initiator concentration 0.17% with respect to monomer).

The reaction mixtures were placed in ampoules and degassed as described in 2.2 above. The ampoules were then heated, with stirring, to 323° K±1° K and maintained at this temperature for 24 hours. The reaction mixtures were neutralized with 2N sodium hydroxide and the polymers precipitated in acetone. The precipitates were filtered, washed thoroughly with acetone and dried. The polymers were then dissolved in de-ionized water and re-precipitated in acetone — this procedure was repeated once. The polymers were dried to constant mass at 333° K under a vacuum of 2 mm Hg. MA/VSA-2 had a molecular mass below 2000.

Yields: (2) MA/VSA-2 2.57 g or 19.3%;

(3) MA/VSA-3 6.80 g or 24.6%.

2.3.6 Alternating copolymerization of 2,5-furandione and 2,3-epoxy propyl methacrylate (Maleic anhydride/-glycidyl methacrylate)

A reaction mixture was made up as follows:

(1) Polymer reference MA/GMA-1.

2,5-Furandione (10.01 g; 0.102 mole); 2,3-epoxy propyl methacrylate (14.31 g; 0.100 mole), AIBN (0.140 g; $0.53 \times 10^{-3}$ mole); 1,4-dioxane (150 ml).

The reaction mixture was placed in an ampoule and degassed as described in 2.2 above. The ampoule was then heated, with stirring, to 333° K±1° K and maintained at this temperature for 64 hours. The polymer, in the form of a swollen gel, was transferred to a breaker containing a large volume of methyl benzene and the mass broken up, filtered, washed thoroughly with copious amounts of hot methyl benzene. The polymer mass was dried at 333° K under a vacuum of 2 mm Hg. The hard, glassy polymer was insoluble in common solvents, including water and aqueous potassium hydroxide solution, producing a swollen gel after long periods of immersion in such solvents. A number of repeated polymerizations also yielded insoluble polymers despite rigorous attempts to keep the reaction system absolutely dry, and it is presumed that the copolymer cross-linked during polymerization to give an insoluble product.

Yield of insoluble product: 17.24 g or 71.8%.

2.4 Polymer Characterization

Polymer characterization was effected in a similar manner to that described in 1.6 above. The results are given in Tables 18 and 19. It should be noted that the molecular mass figures quoted indicate order of magnitudes only, and intrinsic viscosity values [n] are considered a more accurate indication of molecular mass.

2.5 MEMBRANE EVALUATION

This was effected in apparatus as indicated in FIG. 5, and in a similar fashion to the membrane formation of Example 1 (see 1.7 above).

2.6 Membrane Formation 2.6.1 Flux, Rejection and Figure of Merit (FOM) Determination Membranes were evaluated in terms of flux and rejection figures, both during and after formation of the membranes.

Membrane Evaluation during Formation

Observed rejection is expressed as Robs, where $$R_{obs} = (1 - K_p/K_f \times 100\%)$$, and wherein $K_p$ is conductivity of permeate; and $K_f$ is conductivity of feed.

Membrane flux was determined for each cell by measuring the time for permeate to fill a 10 ml measuring cylinder and converting this figure to a cell flux in ml/min. Multiplication of this figure by a constant factor of 906.0 enabled the flux in $1/m^2/day$ to be determined. This factor includes a correction for the exposed area of the membrane.

Membrane Evaluation after Formation

Flux and observed rejection figures were determined for membranes immediately after formation (when pH had been adjusted to 7.0) and 20 hours later. This was done to evaluate the membrane permanence. Flux figures were determined as in Section 2.5.1 above, but in this case conductivity figures were determined off-line by means of an identical conductivity bridge (Radiometer Model CDM 83) and a single flow cell which was equilibrated at 30° C. The flow cell/conductivity bridge combination was carefully calibrated sing a series of five known concentrations of sodium nitrate, and the calibration was checked before each membrane evaluation by a single point check. For this cell the relationship between concentration and conductivity is given by $$C = 0.009\ 32\ K - 0.002\ 22$$

where $C$ = concentration of sodium nitrate in mole.dm$^{-3}$; and $K$ = conductivity of solution in ms (millisiemens).

The correlation coefficient for this relationship was established as 0.998. Hence, values for observed rejection for the equilibrium membrane determinations are given by $$R_{obs}'(1 - C_p/C_f) \times 100\%$$

where $C_p$ = calculated value of permeate concentration (mole.dm$^{-3}$); and $C_f$ = calculated value of feed concentration (mole.dm$^{-3}$).

In addition, values of flux and rejection were determined at pH 8 and pH 9 for certain membranes, using an identical method. Figure of merit values (FOM) were calculated by a computer programme.

2.6.2 Concentration Effects on Membrane Properties

The polyelectrolytes in each copolymer group which exhibited the best overall performance were assessed by forming new membranes and examining their rejection and flux properties at a range of concentrations up to 0.1 mole.dm$^{-3}$. For each polymer the constants E and H in the equation Log S = E log M + H where S is the solute flux,
M is the concentration, were established, and rejection figures and 'figures of merit' were determined at a common concentration of 2000 ppm (0.0235 mole.dm$^{-3}$). Membrane fixed charge index ($\overline{M}$) and fixed charged homogeneity indices (b) were determined for each membrane in this series, using the method given by Spencer in Desalination, 52, 1, (1984).

2.7 Results

2.7.1 Molecular Mass

These are set out in Table 21.

TABLE 21

| MOLECULAR MASS INFORMATION | | | | | |
|---|---|---|---|---|---|
| Polymer | I | n | Rv | log M$_w$ n | M.Mass ($\times 10^{-3}$) |
| MA/VA-1 | 1,17 | 0,058 | 3,36 | 3,200 | 55,2 |
| -2 | 0,63 | 0,103 | 2,94 | 3,880 | 73,7 |
| -3 | 0,32 | 0,156 | 3,01 | 3,766 | 37,4 |
| -4 | 0,13 | 0,191 | 3,00 | 3,782 | 31,7 |
| MA/AA-1 | 0,38 | 0,308 | *1 | *1 | °1 |
| -2 | 0,51 | 0,221 | 3,00 | 3,780 | 27,3 |
| -3 | 0,14 | 0,771 | 2,264 | 4,958 | 117,8 |
| -4 | 0,07 | 0,946 | 2,396 | 4,747 | 39,1 |
| MA/VOH-1 | | 0,212 | 3,36 | 3,200 | 7,5 |
| -2 | | 0,290 | 2,94 | 3,880 | 26,2 |
| -3 | | 0,145 | 3,26 | 3,360 | 15,8 |
| -4 | | 0,139 | 3,27 | 3,340 | 15,7 |
| MA/IA-1 | 0.42 | 0,142 | 3,19 | 3,480 | 21,3 |
| -2 | 0,54 | 0,111 | 3,17 | 3,510 | 29,2 |
| -3 | 0,33 | 0,152 | 3,06 | 3,680 | 31,5 |
| -4 | 0,18 | *2 | *2 | *2 | °2 |
| -5 | 0,10 | *2 | *2 | *2 | °2 |
| MA/VSA-1 | 1,82 | 0,056 | *3 | *3 | °3 |
| -2 | 0,58 | 0,018 | *3 | *3 | °3 |
| -3 | 0,17 | 0,011 | 3,00 | 3,766 | (530) |

Key:
I - initiator concentration in mole %
n - intrinsic viscosity in dl · g$^{-1}$
Rv - GPC retention volume in ml
*1 - unrealistic results due to very broad distribution
*2 - polymers insoluble in 0,5 M sodium sulphate
*3 - no observed detector response in GPC determination

2.7.2 Composition Analysis

These were determined using titration techniques, and the results are given in Table 22. From Table 19 it can be seen that the compositions of the MA/VA and MA/AA polymers were closed to 50:50 mole %, ie alternating.

TABLE 22

| COMPOSITION ANALYSIS | | |
|---|---|---|
| | MOLE % MALEIC ACID | |
| POLYMER | Feed | Polymer |
| MA/VA-3 | 50 | 52 |
| MA/IA-1 | 50 | 55 |
| MA/IA-2 | 54 | 28 |
| MA/AA-4 | 50 | 51 |
| MA/VSA-3 | 67 | 27 |

2.7.3 Membrane Formation and Evaluation

2.7.3.1 Introduction

Copolymers which had been synthesized and characterized as described previously, were used to form composite hydrous zirconia/polyelectrolyte membranes, using the procedure hereinbefore described. Performance characteristics (flux and rejection) of the composite membranes were monitored during formation at pH 7, 30 minutes after completion of formation, and after 20 hours of operation. In addition, most membranes were evaluated for performance of pH values of 8, 9 10 after the 20 hours stabilization period. Selected copolymers were then used to form a second series of membranes which were rigorously evaluated, the results being normalized to a feed concentration of 2000 ppm sodium nitrate to enable meaningful comparisons of performance to be made.

2.7.3.2 Dynamic Membrane Formation

The formation of a polyelectrolyte membrane as a composite layer is characterized by three major phenomena:

(a) Interaction of the anionic polyelectrolyte with the cationic zirconia membrane at low pH causes a rapid initial drop in rejection due to charge neutralization.

(b) An anionic polyelectrolyte membrane shows an increase in rejection with an increase in pH as a result of increasing anionic charge density. A zirconia membrane alone is cationic and rejection is reduced as pH rises.

(c) A polyelectrolyte membrane swells, due to charge repulsion effects, as the pH rises, resulting in a reduction in the membrane flux due to occlusion of the pores of the zirconia membrane.

If all three of the above effects can be demonstrated, then the presence of a composite membrane is confirmed. Table 23 gives relevant summarized information. These results are flux and rejection figures for the zirconia membrane at the formation pH 4, together with results at pH 2 and pH 7 for the composite membrane.

TABLE 23

| COMPOSITE MEMBRANE PERFORMANCE | | | | | | |
|---|---|---|---|---|---|---|
| | Zirconia Membrane | | Composite Membrane | | | |
| | pH 4 | | pH 2 | | pH 7 | |
| POLYMER | Flux | R$_{obs}$ | Flux | R$_{obs}$ | Flux | R$_{obs}$ |
| PAA-5(c).2 | 20,7 | 45,1 | 4,2 | 22,8 | 2,0 | 92,4 |
| MA/VA-1.1 | 23,2 | 41,8 | 7,0 | 26,9 | 2,2 | 90,2 |
| MA/VA-2.1 | 13,1 | 36,0 | 9,5 | 17,7 | 6,5 | 76,5 |
| MA/VA-3.1 | 42,0 | 37,6 | 9,1 | 29,4 | 7,5 | 83,5 |
| MA/VA-3.2 | 29,6 | 51,3 | 8,7 | 14,8 | 5,8 | 87,0 |
| MA/VA-4.1 | 15,7 | 54,3 | 6,8 | 23,4 | 5,5 | 81,3 |
| MA/VOH-1.1 | 38,5 | 52,0 | 14,9 | 16,9 | 3,6 | 91,3 |
| MA/VOH-3.1 | 35,3 | 43,1 | 16,2 | 2,3 | 2,4 | 93,1 |
| MA/VOH-4.1 | 17,1 | 29,9 | 15,1 | 12,6 | 2,7 | 95,4 |
| MA/VOH-4.2 | 29,2 | 53,3 | 6,5 | 8,3 | 4,7 | 86,2 |
| MA/AA-1.1 | 15,8 | 57,7 | 7,9 | 33,6 | 6,2 | 72,7 |
| MA/AA-2.1 | 24,5 | 29,3 | 3,3 | 28,6 | 12,0 | 85,4 |
| MA/AA-3.1 | 33,5 | 39,0 | 14,7 | 27,2 | 8,5 | 77,6 |
| MA/AA-4.1 | 21,5 | 40,4 | 10,9 | 16,3 | 4,6 | 84,8 |

TABLE 23-continued
COMPOSITE MEMBRANE PERFORMANCE

| POLYMER | Zirconia Membrane pH 4 | | Composite Membrane pH 2 | | pH 7 | |
|---|---|---|---|---|---|---|
| | Flux | $R_{obs}$ | Flux | $R_{obs}$ | Flux | $R_{obs}$ |
| MA/AA-4.2 | 34,4 | 52,5 | 20,1 | 22,2 | 9,5 | 77,9 |
| MA/IA-1.1 | 35,1 | 51,3 | 15,2 | 24,9 | 12,4 | 71,8 |
| MA/IA-1.2 | 32,9 | 47,8 | 18,8 | 4,8 | 8,3 | 73,1 |
| MA/IA-2.1 | 19,3 | 41,4 | 6,9 | 26,6 | 6,7 | 77,3 |
| MA/IA-3.1 | 28,5 | 56,6 | 16,7 | 5,6 | 10,9 | 75,8 |
| MA/IA-4.1 | 14,7 | 37,4 | 8,8 | 19,3 | 9,5 | 45,1 |
| MA/IA-5.1 | 22,0 | 48,7 | 16,1 | 32,0 | 11,9 | 47,7 |
| MA/VSA-3.1 | 21,1 | 52,7 | 19,0 | 27,8 | 12,4 | 52,7 |

LEGEND:
.1 is first trial with particular polymer
.2 is second trial with particular polymer From these membrane results (other than for MA/VSA-3) it can readily be seen that in all cases (1) rejection at pH 2 after polyelectrolyte addition was substantially lower than that of the zirconia membrane at pH 4, indicating interaction of the polyelectrolyte with the zirconia membrane;

(2) composite membrane rejection increased with increase in pH indicating that the effective membrane was anionic;

(3) a substantial drop in flux occurs after addition of polyelectrolyte, indicating the 'pore-filling' is taking place;

(4) the flux at pH 7 was invariably lower than at pH 2 due to swelling of the anionic polyelectrolyte membrane.

The magnitude of these changes is sufficient to provide that a composite membrane was formed.

In the case of copolymer MA/VAS-3.1, the above changes do take place, but the magnitudes are much smaller.

2.7.3.3 Membrane Property Development during Formation

Introduction

Major property changes take place during the process of applying a polyelectrolyte to a preformed zirconia dynamic membrane. These changes are due to neutralization of the poly-carboxylic acid groups on the polymer backbone as pH rises, causing polymer swelling and increases in ion exchange capacity. As the polymer swells, the pores in the zirconia substrate become increasingly occluded, causing a rapid reduction in flux. At the same time, the higher charge density and the more homogeneous distribution of charge lead to improvement in rejection.

Rejection and Flux as a Function of pH during Formation

The data for this comparison is presented in graphical form in FIGS. 29 to 34. The plotting symbols used are consistent throughout the series and the key is given below. The plotted values for flux and observed rejection are mean figures for the three cells in each trial, eliminating results from cells with damaged membranes.

Key to Graphical Plots:
| Polymer | Symbol |
|---|---|
| MA/XX | |
| -1.1 | + |
| -2.1 | × |
| -3.1 | ◊ |
| -4.1 | □ |
| -5.1 | o |
| -1.2 | # |
| -2.2 | ✕ |
| -3.2 | ⊛ |
| -4.2 | ▣ |
| -5.2 | ⊕ | where MA/XX-1.1 indicates polymer MA/XX-1, first trial
MA/XX-1.2 indicates polymer MA/XX-1, second trial, etc.

The membranes to be discussed were all ion exchange types, the rejection properties varying markedly with ion exchange capacity. The ion exchange capacity is a function of the charge density and hence of the degree of ionization of the various acid groups present in the polymer. The charge in degree of ionization is most rapid in the area of the pK of the acid group but the change is not as sharp as that observed with monomeric acids because of electrostatic interactions between the fixed acid groups.

The increase in charge density associated with the acid pK's also has the effect of causing swelling of the polymer, due to electrostatic repulsion and to binding of solvent to the anionic sites. The polymer is present primarily in the pore structure of the zirconia base membrane, and the swelling of the polymer occludes the pores, producing a 'tighter' membrane having higher rejection and lower flux.

The observed characteristics of membrane performance at various pH values can be explained broadly in terms of the effects mentioned above, but it should be pointed out that these observed effects are transient in nature and not amenable to detailed analysis.

2.7.3. Membrane Permanence

The membranes were also assessed for membrane permanence, ie retention of properties with time. Evaluation time was limited to 20 hours after formation. The results are set out in Table 24. In Table 24, the following definition applies:

$$FOM = \frac{FOM(20\ h) - FOM(0,5\ h)}{FOM(0,5\ h) \times 100\%} \times 100\%$$

where FOM is the Lonsdale figure of merit.

TABLE 24
FIGURES OF MERIT-CHANGE WITH TIME

| MEMBRANE REFERENCE | $FOM^{0,5}$ | $FOM^{20}$ | FOM (%) |
|---|---|---|---|
| MA/VA-1.1 | 0,68 | 0,66 | −2,9 |
| MA/VA-2.1 | 0,72 | 0,78 | +8,3 |
| MA/VA-3.1 | 1,31 | 1,68 | +28,2 |
| MA/VA-3.2 | 1,37 | 1,04 | −24,1 |
| MA/VA-4.1 | 0,79 | 0,86 | +8,7 |
| MA/VOH-1.1 | 1,29 | 1,01 | −21,7 |
| MA/VOH-3.1 | 1,10 | 0,98 | −10,9 |
| MA/VOH-4.1 | 2,69 | 2,82 | +4,8 |
| MA/VOH-4.2 | 1,01 | 1,22 | +22,0 |
| MA/AA-1.1 | 0,55 | 0,53 | −3,6 |
| MA/AA-2.1 | 0,38 | 0,48 | +26,3 |
| MA/AA-3.1 | 0,97 | 0,81 | −16,5 |
| MA/AA-4.1 | 0,85 | 0,73 | −14,1 |
| MA/AA-4.2 | 1,13 | 1,28 | +13,3 |
| MA/IA-1.1 | 1,05 | 0,86 | −18,1 |
| MA/IA-1.2 | 0,75 | 0,81 | +8,0 |
| MA/IA-2.1 | 0,78 | 0,76 | −2,6 |
| MA/IA-3.1 | 1,30 | 1,00 | −23,1 |
| MA/IA-4.1 | 0,31 | 0,22 | −29,0 |
| MA/IA-5.1 | 0,36 | 0,39 | +8,3 |
| MA/VSA-3.1 | 0,47 | 0,35 | −25,5 |
| PAA-5(C).1 | 0,66 | 0,51 | −22,7 |

TABLE 24-continued

| FIGURES OF MERIT-CHANGE WITH TIME | | | |
|---|---|---|---|
| MEMBRANE REFERENCE | FOM$^{0,5}$ | FOM$^{20}$ | FOM (%) |
| PAA-5(C).2 | 0,80 | 0,75 | −6,3 |

PAA-5(C) - control membrane using polyacrylic acid as the polyelectrolyte

2.7.3.5 pH Effects on Membrane Performance
The results are set out in Table 25.

TABLE 25

EFFECTS OF pH ON MEMBRANE PERFORMANCE

| | FLUX (× 1000) | | | $R_{obs}$ (%) | | | $A^2/B \times 10^{-5}$ | | |
|---|---|---|---|---|---|---|---|---|---|
| MEMBRANE | pH 7 | pH 8 | pH 9 | pH 7 | pH 8 | pH 9 | pH 7 | pH 8 | pH 9 |
| MA/VA-1.1 | 2,40 | 2,08 | 1,95 | 89,2 | 91,0 | 90,7 | 0,66 | 0,69 | 0,63 |
| MA/VA-3.1 | 8,28 | 7,43 | 6,77 | 85,9 | 85,5 | 91,2 | 1,68 | 1,74 | 1,89 |
| MA/VA-3.2 | 6,92 | 6,01 | 5,38 | 81,6 | 86,0 | 87,6 | 1,04 | 1,25 | 1,30 |
| MA/VOH-1.1 | 4,20 | 3,56 | 3,50 | 87,6 | 89,5 | 90,0 | 1,01 | 1,05 | 1,09 |
| MA/VOH-4.2 | 4,41 | 3,93 | 2,92 | 88,2 | 90,3 | 91,1 | 1,22 | 1,44 | 1,42 |
| MA/AA-1.1 | 5,83 | 5,58 | 5,07 | 73,4 | 76,7 | 80,3 | 0,53 | 0,60 | 0,68 |
| MA/AA-3.1 | 9,15 | 7,66 | 6,07 | 72,1 | 78,6 | 84,6 | 0,81 | 0,96 | 1,11 |
| MA/AA-4.1 | 5,08 | 4,74 | 4,98 | 80,9 | 84,2 | 81,2 | 0,73 | 0,83 | 0,65 |
| MA/AA-4.2 | 9,52 | 8,34 | 7,11 | 79,8 | 85,6 | 89,4 | 1,13 | 1,28 | 1,69 |
| MA/IA-1.1 | 11,33 | 10,45 | 9,48 | 69,5 | 72,7 | 74,4 | 0,86 | 0,93 | 0,92 |
| MA/IA-1.2 | 8,34 | 7,70 | 6,98 | 74,4 | 76,6 | 78,5 | 0,81 | 0,83 | 0,85 |
| MA/IA-2.1 | 6,95 | 6,89 | 6,31 | 76,7 | 79,3 | 81,4 | 0,76 | 0,80 | 0,84 |
| MA/IA-3.1 | 10,93 | 11,78 | 10,21 | 69,4 | 76,0 | 77,8 | 1,00 | 1,22 | 1,31 |
| MA/IA-5.1 | 10,57 | 10,19 | 9,24 | 52,6 | 57,5 | 60,9 | 0,39 | 0,46 | 0,48 |
| MA/VAS-3.1 | 7,42 | 7,37 | 7,28 | 58,3 | 61,5 | 62,3 | 0,35 | 0,39 | 0,40 |
| PAA-5(c).2 | 2,02 | 1,63 | 1,65 | 91,4 | 93,5 | 94,1 | 0,75 | 0,83 | 0,83 |

PAA-5(c) - control membrane using polyacrylic acid as the polyelectrolyte

2.7.3.6 Molecular Mass Effects
The result are indicated FIGS. 35 to 41, in which IV is the intrinsic viscosity, and is plotted against FOM.

2.7.3.7 Membrane Performance as a Function of Salt Concentration
Quantitative comparisons of the membrane performance can be made only if results are normalized to a common salt concentration. To enable this to be done, one copolymer from each group was selected for further testing involving valuation of properties over a range of concentrations. The results are set out in Table 26.

TABLE 26

MEMBRANE CHARGE DENSITY AND MICRO HOMOGENEITY INDICES

| MEMBRANE | E | H | r | M | b |
|---|---|---|---|---|---|
| MA/VA-3.2 | 0,723 | 0,328 | 0,996 | 1,14 | 0,86 |
| MA/VOH-4.2 | 0,937 | 0,404 | 0,976 | 0,96 | 0,97 |
| MA/AA-4.2 | 0,492 | 0,025 | 0,963 | 2,29 | 0,75 |
| MA/IA-1.2 | 0,735 | 0,407 | 0,999 | 0,95 | 0,87 |
| PAA-5(c).2 | 0,992 | 0,383 | 0,998 | 1,00 | 0,99 |
| PAA* | 0,40 | −0,36 | — | 5,81 | 0,70 |

(PAA* refers to results drawn from the publication by Spencer in Desalination, 52,1, (1984)
E slope of log m vs log s plot
H intercept of log m vs log s plot
r correlation coefficient of regression line
M molality of free fixed charges in the active membrane
b fixed charge micro-homogeneity index

2.7.3.8 Normalized Membrane Results

The effect of salt concentration of rejections of membranes is substantial. In order to compare membranes realistically, rejection values must be adjusted to a common value of salt concentration. Flux, rejection and FOM values for the five membranes selected for the second trail were normalized to 2000 ppm salt concentration, and are shown in Table 27.

TABLE 27

| | NORMALIZED MEMBRANE RESULTS | | |
|---|---|---|---|
| MEMBRANE | FLUX (1/m$^2$/d × 1000) | REJECTION % | FOM × 10$^5$ |
| MA/VA-3.2 | 7,094 | 85,8 | 1,42 |
| MA/VOH-4.2 | 4,684 | 91,8 | 1,73 |
| MA/AA-4.2 | 10,084 | 83,3 | 1,66 |
| MA/IA-1.2 | 7,402 | 79,4 | 0,94 |
| PAA-5(c)-2 | 2,446 | 94,1 | 1,29 |

2.7.3.9 Charge Density Determination
An electrolytic cell was used to determine the thermodynamically effective membrane charge density ($\Phi X$). The method used was developed by researchers examining inorganic cation exchange membranes.

The five membranes previously selected for a second trail were removed from the test cells and evaluated by membrane potential measurements; basic data obtained was used to calculate apparent co-ion transference number ($T_{app}$). The plots of $1/T_{app}$ vs $1/C_l$ were done and their respective regression equations and correlation coefficients were calculated. Values of $\Phi X$ derived from this information are listed in Table 28. The corresponding values of free fixed-charge molality (M) are quoted for purposes of comparison.

TABLE 28

| | MEMBRANE CHARGE DENSITIES | |
|---|---|---|
| MEMBRANE | $\Phi X$ (mole · dm$^{-3}$) | M (mole · kg$^{-1}$) |
| MA/VA-3.2 | 0,48 × 10$^{-2}$ | 1,14 |
| MA/VOH-4.2 | 1,90 × 10$^{-2}$ | 0,96 |
| MA/AA-4.2 | 0,69 × 10$^{-2}$ | 2,29 |
| MA/IA-1.2 | 0,13 × 10$^{-2}$ | 0,95 |
| PAA-5(c).2 | 0,69 × 10$^{-2}$ | 1,00 |

2.7.3.10 Consolidation of Membrane Data
The membrane performance data which has been presented includes performance-oriented figures, in particular values for normalized flux, rejection and FOM; and also values of 'structural' variables such as of charge density and membrane microhomogeneity. The 'structural' variables that have the most significant effect on performance were then identified. Table 29 contains normalized membrane performance data for the five selected membranes together with the relevant 'structural' variables.

TABLE 29

MEMBRANE DATA AND STRUCTURAL VARIABLES

| MEMBRANE | $R_{obs}$ | Flux (× 1000) | FOM × $10^5$ | b | M | OX |
|---|---|---|---|---|---|---|
| MA/VA-3.2 | 85,8 | 7,09 | 1,42 | 0,86 | 1,14 | 0,48 |
| VA/VOH-4.2 | 91,8 | 4,68 | 1,73 | 0,97 | 0,96 | 1,90 |
| MA/AA-4.2 | 83,3 | 10,08 | 1,66 | 0,75 | 2,29 | 0,69 |
| MA/IA-1.2 | 79,4 | 7,40 | 0,94 | 0,87 | 0,95 | 0,13 |
| PAA-5(c)-2 | 94,1 | 2,45 | 1,29 | 0,99 | 1,00 | 0,69 |

Figure 39:
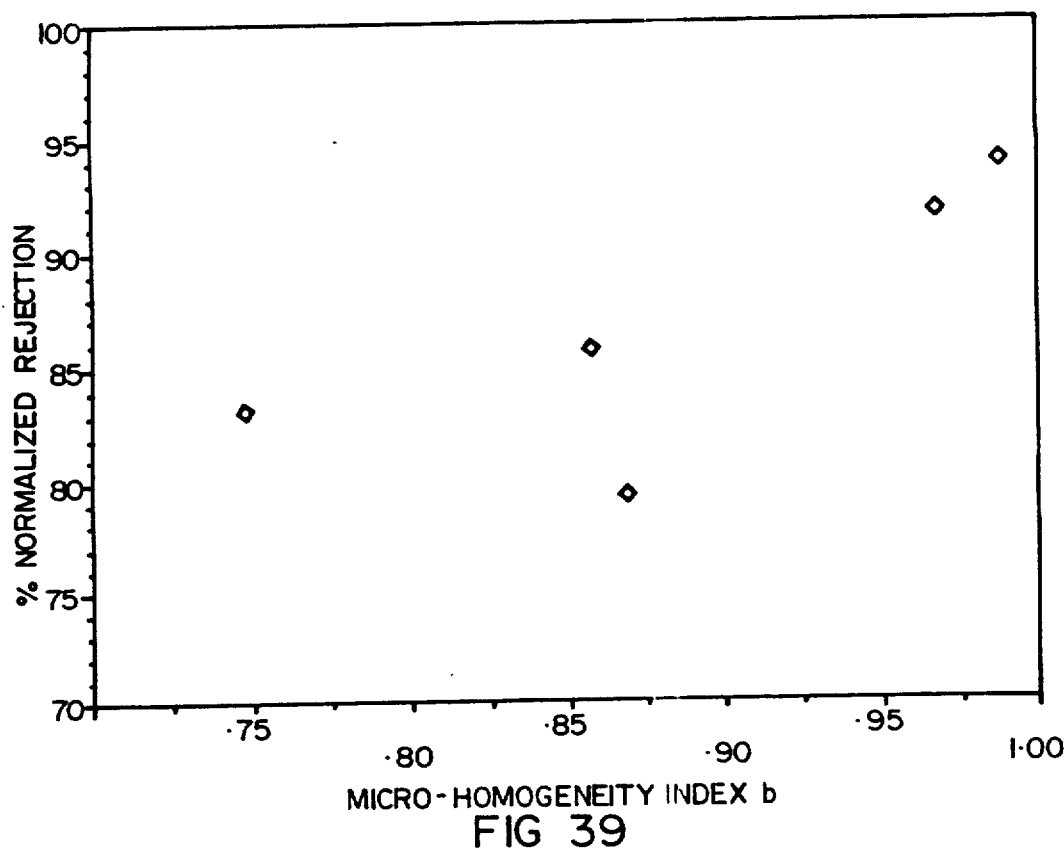
FIGS. 39 and 40 are plots of rejection versus micro-homogeneity index and a flux versus micro-homogeity index, respectfully.
Figure 40:
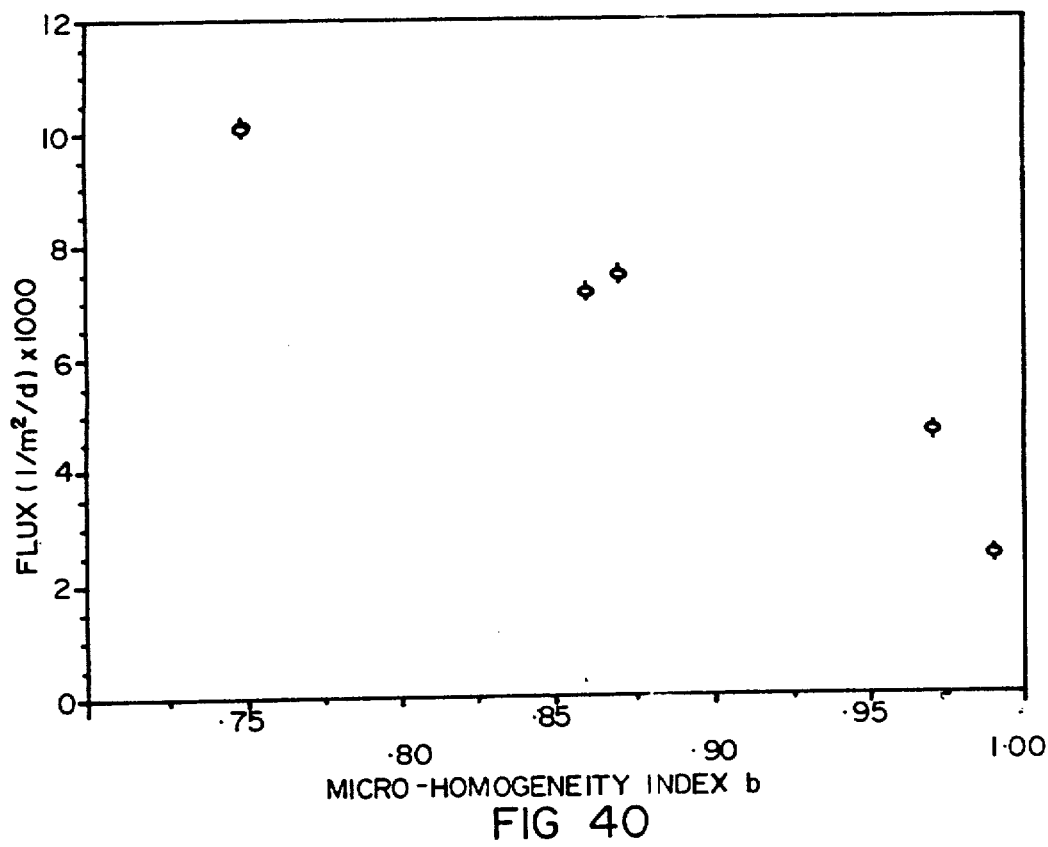

$R_{obs}$ Normalized observed rejection in %
Flux Normalized flux in $l/m^2/d$
FOM Lonsdale figure of merit calculated from normalized data
b Membrane micro-homogeneity index (max. value 1,00)
M Membrane charge density in mole · $kg^{-1}$
OX Thermadynamically effective charge density in mole · $dm^{-3}$ An examination of the figures presented shows that both flux and rejection are strong functions of the membrane microhomogeneity index b. The relationship is shown in FIGS. 39 and 40.

The invention accordingly also extends to a method of making a polymer, as hereinbefore described, as well as to a polymer when made according to such a method.

EXAMPLE 3

3.1 The Preparation of Poly Acrylic Acid-co-Vinyl Alcohol 3.1.1 Method (a) Preparation of poly(acrylic acid-co-vinyl acetate)

Acrylic acid (45.0 g, 0.625 moles) and vinyl acetate (30.0 g, 0.349 moles) in 1.4 dioxane (150 ml) was stirred for one hour while bubbling Argon through the mixture. The mixture was then heated to 75° C. in a round-bottomed flask fitted with a reflux condenser. Benzoyl peroxide (0.294 g, 0.00121 moles) was then added. The reaction was terminated after a period of 40 minutes by the addition of hydroquinone (ca 0.3 g). The polymer was isolated by precipitation with ether. The polymer was purified by repeated washes with ether, and dried to constant weight under reduced pressure.

Yield 18.5 g or 24.7% of polymer PAA/VAC-4.

(b) Hydrolysis of the poly(acrylic acid-co-vinyl acetate) to poly(acrylic acid-co-vinyl alcohol)

Poly(acrylic acid-co-vinyl acetate) (9.1 g) was heated to reflux temperature in an excess of aqueous NaOH. The reaction, in a round-bottomed flask fitted with a reflux condenser, was continued for a period of 14 hours. The polymer was isolated by precipitation with methanol, and purified by redissolving in water and again precipitating with methanol. The polymer was dried to constant weight under reduced pressure.

Yield: 8.5 g or 93.4% of polymer PAA/VOH-2.

A membrane was formed with this polymer according to the method hereinbefore described. The results are tabled in Table 14 given hereinbefore.

EXAMPLE 4: POLY(ACRYLIC ACID) DYNAMIC MEMBRANE ON A TUBULAR MEMBRANE SUPPORT

A dynamic zirconium oxide-poly (acrylic acid) membrane was formed using the standard formation procedure described under 1.7.2.3, on a porous support, comprising a tube of nonwoven polyester fabric on which a polysulfone membrane was cast using a 15% polysulfone solution in DMF. The results are given in Table 30.

TABLE 30

| Membrane | Feed Concentration (M) | Rejection (%) | Flux (l.m.d.) |
|---|---|---|---|
| ZO-1 | 0,0239 | 38,9 | 11 920 |
| ZO-2 | 0,0239 | 38,5 | 10 870 |
| ZOPA-1 | 0,0229 | 85,1 | 4 620 |
| ZOPA-2 | 0,0229 | 85,5 | 4 430 |

LEGEND:
ZO = Hydrous zirconium oxide
-1 = Membrane 1
-2 = Membrane 2
ZOPA = Hydrous zirconium oxide - poly(acrylic acid) membranes Testing was done at 35° C., a flow rate of 6 m/s and a pressure of 4 MPa.

EXAMPLE 5

The PAA/VOH copolymer, the synthesis of which was described under Example 3, was evaluated as a dynamic membrane in treating an industrial effluent. The membrane formation conditions were standard as described under 1.7.2.3. Subsequent to membrane formation, the membranes were then exposed to the industrial effluent. The feedwater composition and reverse osmosis results are given in Tables 31 and 32 respectively.

TABLE 31

| CONCENTRATION | CONCENTRATION (mg/l) |
|---|---|
| Sulphur as $SO_4 =$ | 320 |
| $Na^+$ | 12• |
| $K^+$ | 0,9 |
| $CA^{2+}$ | 0,5 |
| $Mg^{2+}$ | 0,2 |
| Nitrogen as $NH_3$ | 271 |
| $SO_4{}^{O-2}$ | 189 |
| $Cl^-$ | 85 |
| $F^-$ | 115 |
| Nitrogen as $NO_3^-$ | 0,45 |
| $SCN^-$ | 160 |
| Phenol | 20 |
| Acetic acid | 70 |
| Propionic acid | 30 |
| Dimethyl hydantoin | 89 |
| Methyl ethyl hydantoin | 30 |
| Chemical Oxygen Demand | |

Make-up of Industrial Feedwater treated with PAA/VOH Membranes.

TABLE 32

| COMPONENT | % REMOVAL AT WATER RECOVERY LEVELS: | | | |
|---|---|---|---|---|
| | 5% | 20% | 40% | 60% |
| Sulphur as $SO_4 =$ | 96,9 | 97,2 | 99,7 | 95,9 |
| $NA^+$ | 99,2 | 91,7 | 95,0 | 100 |
| $K^+$ | 89,0 | 99,3 | 96,2 | 97,2 |
| $Ca^{2+}$ | 40 | 42,9 | 75,0 | 40,0 |
| $Mg^{2+}$ | 50 | 66,6 | 75,0 | 80,0 |
| Nitrogen as $NH_3$ | 77,9 | 94,1 | 91,7 | 94,7 |

TABLE 32-continued

| COMPONENT | % REMOVAL AT WATER RECOVERY LEVELS: | | | |
|---|---|---|---|---|
|  | 5% | 20% | 40% | 60% |
| $SO_4^{-2}$ | 76,7 | 100 | 100 | 100 |
| $Cl^-$ | 100 | 100 | 100 | 100 |
| $F^-$ | 99,5 | 99,7 | 99,7 | 99,6 |
| Nitrogen as $NO_3^-$ | 22,2 | 33,3 | 61,6 | 69,2 |
| $SCN^-$ | 97,5 | 97,2 | 99,2 | 98,6 |
| Phenol | 50 | — | — | — |
| Acetic acid | 85,7 | 94 | 100 | 100 |
| Propionic acid | 100 | 100 | 100 | 100 |
| Dimethyl hydantoin | 92,1 | 94,7 | 100 | 97,8 |
| Methyl Ethyl hydantoin | 100 | 100 | 100 | 100 |

Membranes were evaluated at 35° C., a pressure of 6 MPa and a flow rate of 6 m/s.

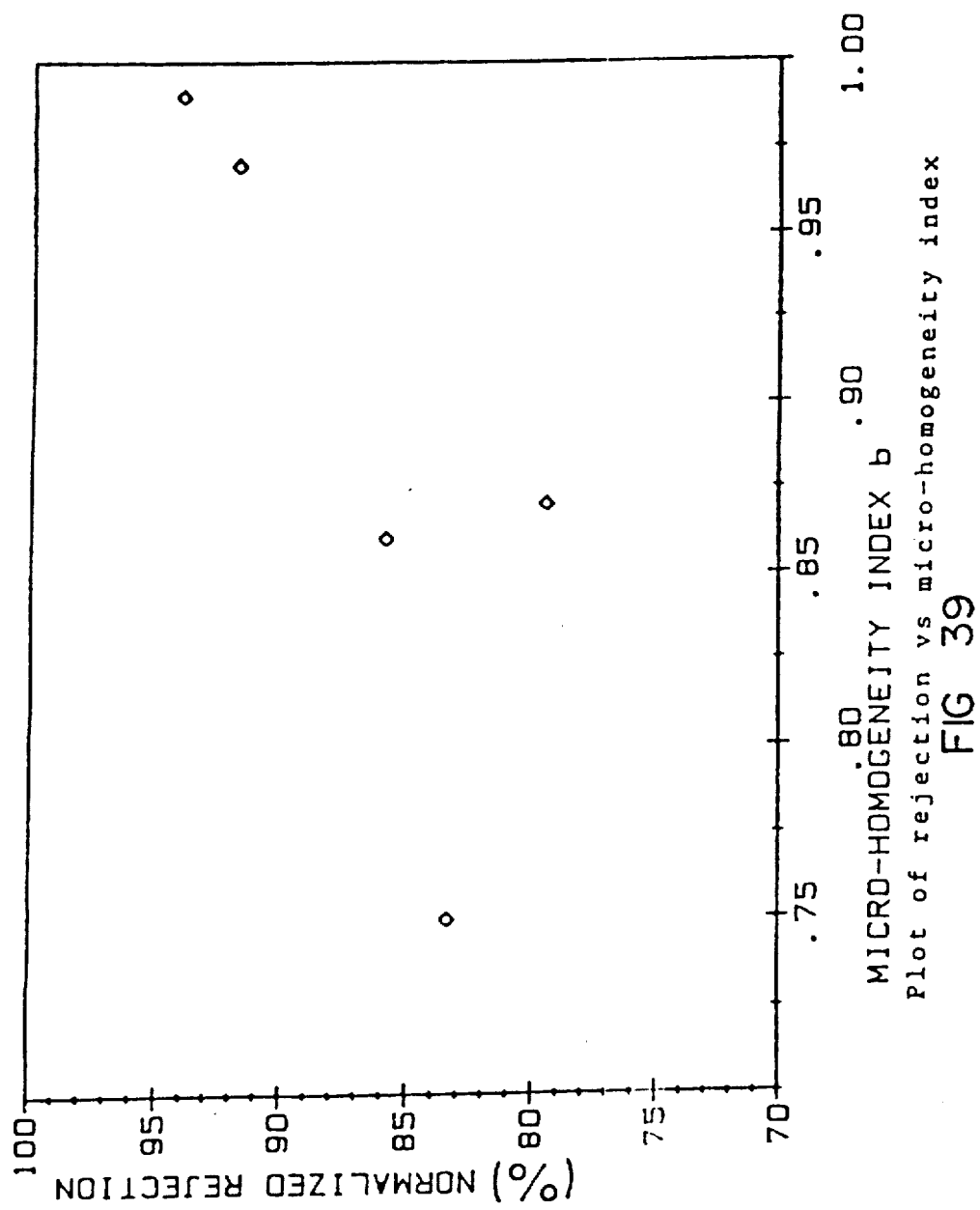

We claim:

1. A semi-permeable membrane, which comprises a porous artifact; and a polyelectrolyte layer on the artifact, the polyelectrolyte layer comprising a polymer which has carboxylic acid functional groups as well as functional groups other than carboxylic acid groups, and which is selected from the group consisting of (i) poly $(CH_2=C(Y_2)(COOH))-co-CH_2=C(Y_3)-(Y_4))$ wherein
  (a) when $Y_2$ is —H and $Y_3$ is —H, $Y_4$ is —$OCH_3$, —$OC(O)CH_3$ or —OH;
  (b) when $Y_2$ is -halogen and $Y_3$ is —H, $Y_4$ is —$OCH_3$, —$OC(O)CH_3$ or —OH;
  (c) when $Y_2$ is —$OCH_3$ and $Y_3$ is —H, $Y_4$ is —$OC(O)CH_3$, —OH or —$OCH_3$;
  (d) when $Y_2$ is —OH and $Y_3$ is —H, $Y_4$ is —$OCH_3$, —$OC(O)CH_3$ or —OH;

(ii) poly $(CH_2=CH\ COOH)-co-(CH_2=CH-OH)-c-(CH_2=CH-(Y_8))$ where
  $Y_8$ is —O—C(O)—$(Y_9)$, $Y_9$ is —$CH_3$ or $+CH_2+_n CH_3$, n = 1 to 3 or
  $Y_8$ is —C(O)—O—$(Y_{10})$, $Y_{10}$ is —$CH_3$ or $+CH_2+_n CH_3$, n=1 to 3 or
  $Y_8$ is —C(O)—$CH_3$ or
  $Y_8$ is —O—$CH_3$;

(iii) poly-$CH(COOX_2)-C(X_1)(COOX_3-)$-alt-$CH_2-CH(X_4)$— wherein $X_1$ is H, —$OCH_3$ or —OH, $X_2$ and $X_3$ are each —H, an alkyl group, a cycloaliphatic group, a phenyl, a substituted phenyl group, a polyether or a polyglycol chain of molecular mass 200 to 5000, and $X_4$ is $CH_3 C(O))-$, —OH, or —$C(O)NH_2$;

(iv) poly —$CH(COOX_2)-C(X_1COOX_3)-co-CH_2-C(X_5)(X_6)$— wherein $X_1$, $X_2$, and $X_3$ are as defined above, and $X_6$ is —$OCH_3$ when $X_5$ is —H;

(v) the alkali metal salts or partial salts of the above polyacids, said membrane having properties for providing salt rejection through both an electrokinetic mechanism provided by charged functional groups and a non-coulombic mechanism provided by non-charged functional groups.

2. A semi-permeable membrane according to claim 1, wherein the polymer has a molecular mass of 20,000 to 500,000, and is selected from the group consisting of:

(1) poly (acrylic acid-co-vinyl acetate)
(2) poly (2-chloro acrylic acid-co-vinyl acetate)
(3) poly (2-hydroxy acrylic acid-co-vinyl acetate)
(4) poly (acrylic acid-co-methyl vinyl ether)
(5) poly (2-chloro acrylic acid-co-methyl vinyl ether)
(6) poly (2-chloro acrylic acid-co-vinyl alcohol)
(7) poly (2-methoxy acrylic acid-co-methyl vinyl ether)
(8) poly (2-methoxy acrylic acid-co-vinyl acetate)
(9) poly (2-methoxy acrylic acid-co-vinyl alcohol)
(10) poly (2-hydroxy acrylic acid-co-vinyl methyl ether)
(11) poly (2-hydroxy acrylic acid-co-vinyl alcohol)
(12) poly (maleic acid-alt-vinyl acetate)
(13) poly (maleic acid-alt-vinyl alcohol)
(14) poly (maleic acid-alt-acrylamide)
(15) poly (maleic acid-alt-methyl vinyl ether)
(16) the maleate half esters which are reaction products of the copolymer poly(maleic anhydride-alt-acrylic acid), with the following alcohols or polyols:
  (i) methanol, ethanol and other n-alkyl alcohols
  (ii) cyclohexanol
  (iii) phenol
  (iv) poly (ethylene glycol)
  (v) poly (propylene glycol)
  (vi) poly (butylene glycol)
(17) poly(acrylic acid-co-vinyl alcohol)
(18) poly(acrylic acid-co-vinyl alcohol-co-vinyl acetate)
(19) poly(acrylic acid-co-vinyl alcohol-co-vinyl ethanoate)
(20) poly(acrylic acid-co-vinyl alcohol-co-vinyl propionate)
(21) poly(acrylic acid-co-vinyl alcohol-co-vinyl butyrate)
(22) poly(acrylic acid-co-vinyl alcohol-co-methyl acrylate)
(23) poly(acrylic acid-co-vinyl alcohol-co-ethyl acrylate)
(24) poly(acrylic acid-co-vinyl alcohol-co-propyl acrylate)
(25) poly(acrylic acid-co-vinyl alcohol-co-butyl acrylate)
(26) poly(acrylic acid-co-vinyl alcohol-co-vinyl methyl ether)
(27) poly(acrylic acid-co-vinyl alcohol-co-vinyl methyl ketone).

3. A method of forming a semi-permeable membrane, which includes depositing a polymer which has carboxylic acid functional groups as well as functional groups other than carboxylic acid groups, and which is selected from the group consisting of:

(i) poly $(CH_2=C(Y_2)(COOH))-co-CH_2=C(Y_3)-(Y_4)))$ wherein
  (a) when $Y_2$ is —H and $Y_3$ is —H, $Y_4$ is —$OCH_3$, —$OC(O)CH_3$ or —OH;
  (b) when $Y_2$ is -halogen and $Y_3$ s —H, $Y_4$ is —$OCH_3$, —$OC(O)CH_3$ or —OH;
  (c) when $Y_2$ is —$OCH_3$ and $Y_3$ is —H, $Y_4$ is —$OC(O)CH_3$, —OH or —$OCH_3$;
  (d) when $Y_2$ is —OH and $Y_3$ is —H, $Y_4$ is —$OCH_3$, —$OC(O)CH_3$ or —OH;

(ii) poly $(CH_2=CH\ COOH)-co-(CH_2=CH-OH)-co-(CH_2=CH-(Y_8))$ where
  $Y_8$ is —O—C(O)—$(Y_9)$, $Y_9$ is —$CH_3$ or $+CH_2+_n CH_3$, n=1 to 3 or
  $Y_8$ is —C(O)—O—$(Y_{10})$, $Y_{10}$ is —$CH_3$ or $+CH_2+_n CH_3$, n=1 to 3 or
  $Y_8$ is —C(O)—$CH_3$ or
  $Y_8$ is —O—$CH_3$;

(iii) poly-$CH(COOX_2)-C(X_1)(COOX_3-)$-alt-$CH_2-CH(X_4)$— wherein $X_1$ is H, —$OCH_3$ or —OH, $X_2$ and $X_3$ are each —H, an alkyl group, a cycloaliphatic group, a phenyl, a substituted phenyl group, a polyether or a polyglycol chain of molecular mass 200 to 5000, and $X_4$ is $CH_3 C(O)O-$, —OH, or —$C(O)NH_2$;

(iv) poly —CH(COOX$_2$)—C(X$_1$COOX$_3$)-co-CH$_2$—C(X$_5$)(X$_6$)— wherein X$_1$, X$_2$ and X$_3$ are as defined above, and X$_6$ is —OCH$_3$ when X$_5$ is —H;

(v) the alkali metal salts or partial salts of the above polyacids on a porous artifact, thereby to form a polyelectrolyte layer on the artifact, said membrane having properties for providing salt rejection through both an electrokinetic mechanism provided by charged functional groups and a non-coulombic mechanism provided by non-charged functional groups.

4. A method according to claim 3, which includes, prior to effecting the deposition of the polymer onto the artifact, circulating an aqueous solution of a hydrated metal oxide along and through the porous artifact while supporting the artifact, thereby to coat the artifact with the hydrated metal oxide and form a hydrated metal oxide coated artifact, and thereafter effecting the deposition of the polymer onto the hydrated metal oxide coated artifact by circulating a liquid stream comprising a polymer according to claim 1 in a carrier liquid along and through the hydrated metal oxide coated artifact, while maintaining the hydrated metal oxide coated artifact in supported fashion, thereby to form the polyelectrolyte layer on the hydrated metal oxide coat.

* * * * *

UNITED STATES PATENT AND TRADEMARK OFFICE
CERTIFICATE OF CORRECTION

PATENT NO. : 4,985,145

DATED : January 15, 1991

INVENTOR(S) : Ronald D. Sanderson, Norman A. Dowler
Albert J. Van Reenen

It is certified that error appears in the above-identified patent and that said Letters Patent is hereby corrected as shown below:

Col. 1, l. 5, change "1985" to --1987--.

Col. 1, l. 11, change "form" to --from--.

Col. 1, l. 15, change "these" to --there--.

Col. 1, end of l. 25, change "CH" to --$CH_3$--.

Col. 1, l. 34, delete "13".

Col. 1, l. 38, change "$_{\text{IIs-COOH,Y3}}$" to --is-COOH,$Y_3$-- in normal sized type.

Col. 3, l. 55, after "desalination", insert --test--.

Col. 4, l. 2, change "a" to --of--.

Col. 5, l. 19, delete "with".

Col. 10, l. 19, change "mixtured" to --mixture--.

Col. 10, l. 34, delete the end of the line after "Method (A)" and delete lines 35 and 36 thereafter and insert as a separate line under line 34:
--yield : 4,20g or 98,8% of polymer : PAA/CIAA2--.

Col. 10, l. 34-36, insert as a separate heading after the last instruction --1.5.3.4 2-Propenoic Acid and 2-Methyl-2-Propenoic Acid (Acrylic Acid and Methacrylic Acid)--.

UNITED STATES PATENT AND TRADEMARK OFFICE
CERTIFICATE OF CORRECTION

PATENT NO. : 4,985,145

DATED : January 15, 1991

INVENTOR(S) : Ronald D. Sanderson, Norman A. Dowler, Albert J. Van Reenen

It is certified that error appears in the above-identified patent and that said Letters Patent is hereby corrected as shown below:

Col. 11, l. 32, change "Terepolymers" to --Terpolymers--.

Col. 12, l. 12, change "as" to --at--.

Col. 14, l. 46, change "l.min$^{-1}$" to l.min$^{-1}$--.

Col. 14, l. 55, change "when" to --then--.

Col. 15, l. 41, change "re" to --are--.

Col. 19, in Table 15, change the first entry in the "Polymer" column from "PCI A/VAC-1" to --PCIAA/VAC-1--.

Col. 20, l. 28, change "29" to --28.--.

Col. 21, in Table 19, change the tenth entry in the first "9,0" column from "S3,0" to --53,0--.

Col. 21, in Table 19, change the thirteenth entry in the second "9,0" column from "8310" to --8340--.

Col. 22, l. 13, after "containing", delete "to".

Col. 22, l. 20, change "slid" to --solid--.

Col. 22, l. 24, change "temperature" to --temperatures--.

UNITED STATES PATENT AND TRADEMARK OFFICE
CERTIFICATE OF CORRECTION

PATENT NO. : 4,985,145

DATED : January 15, 1991

INVENTOR(S) : Ronald D. Sanderson, Norman A. Dowler
Albert J. Van Reenen

It is certified that error appears in the above-identified patent and that said Letters Patent is hereby corrected as shown below:

Col. 24, l. 33, after "reference", insert --MA-1--.

Col. 25, l. 7, change "Solutions" to --Solution--.

Col. 25, l. 33, change "diozane" to --dioxane--.

Col. 25, l. 55, after "weight", change "of" to --at--.

Col. 27, l. 16, after "mixtures", insert --were--.

Col. 29, l. 46, change "0.53" to --0.853--.

Col. 30, l. 22, change the dash (-) before the open parenthesis [(] to an equal sign (=).

Col. 30, l. 63, change "Robs'$(1-^C p/C^f) \times 100\%$ to --Robs = $(1 - ^{Cp}/_{Cf}) \times 100\%$--.

Col. 31, l. 67, change "closed" to --close--.

Col. 32, l. 27 and 28, after the period (.) after "made", transfer "2.7.3.2 Dynamic Membrane Formation" to a line of its own.

Col. 33, l. 28, change "the" to --that--.

UNITED STATES PATENT AND TRADEMARK OFFICE
CERTIFICATE OF CORRECTION

PATENT NO. : 4,985,145

DATED : January 15, 1991

INVENTOR(S) : Ronald D. Sanderson, Norman A. Dowler Albert J. Van Reenen

It is certified that error appears in the above-identified patent and that said Letters Patent is hereby corrected as shown below:

Col. 33, l. 54, delete "29 to 34" and substitute --29a, 29b, 30a, 30b, 31a, 31b, 32a, 32b, 33a, 33b, 34a and 34b--

Col. 34, l. 36, change "2.7.3 to --2.7.3.4--.

Col. 35, l. 41, change "41" to --38--.

Col. 37, last footnote to Table 29, change "$dm^{-3}$" (all super-script) to --$dm^{-3}$--.

Add Figures 8-28, 29a,, 29b, 30a, 30b, 31a, 31b, 32a, 32b, 33a, 33b, 34a, 34b and 35-40 as in the Patent and Trademark files and in the attached sheets.

Signed and Sealed this

Twenty-fourth Day of January, 1995

Attest:

BRUCE LEHMAN

Attesting Officer   Commissioner of Patents and Trademarks

IV vs Figure of merit for MA/VA membranes

IV vs Figure of merit for MA/VOH membranes

IV vs Figure of merit for MA/AA membranes

IV vs Figure of merit for MA/IA membranes